(12) United States Patent
Skogstad

(10) Patent No.: US 12,400,148 B2
(45) Date of Patent: *Aug. 26, 2025

(54) SYSTEM AND METHOD FOR REAL-TIME ARTIFICIAL INTELLIGENCE SITUATION DETERMINATION BASED ON DISTRIBUTED DEVICE EVENT DATA

(71) Applicant: Daniel Sadeghi Skogstad, Oslo (NO)

(72) Inventor: Daniel Sadeghi Skogstad, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,031

(22) Filed: Oct. 30, 2023

(65) Prior Publication Data

US 2024/0078474 A1 Mar. 7, 2024

Related U.S. Application Data

(63) Continuation of application No. 17/491,466, filed on Sep. 30, 2021, now Pat. No. 11,836,587.

(60) Provisional application No. 63/240,331, filed on Sep. 2, 2021, provisional application No. 63/227,882, filed on Jul. 30, 2021, provisional application No. 63/174,526, filed on Apr. 13, 2021.

(51) Int. Cl.
*G06N 20/00* (2019.01)
(52) U.S. Cl.
CPC .................... *G06N 20/00* (2019.01)
(58) Field of Classification Search
None
See application file for complete search history.

(56) References Cited

U.S. PATENT DOCUMENTS 10,672,389 B1 * 6/2020 Abeloe ............... G06N 3/088
2019/0114537 A1 * 4/2019 Wesolowski ........ G06N 3/084

OTHER PUBLICATIONS

Xiao, Shuai, et al. "Joint modeling of event sequence and time series with attentional twin recurrent neural networks." arXiv preprint arXiv:1703.08524 (2017). (Year: 2017).*

* cited by examiner

*Primary Examiner* — Daniel T Pellett
(74) *Attorney, Agent, or Firm* — Cognition IP, P.C.; Edward Steakley

(57) ABSTRACT

Various embodiments of methods and systems, including computer programs encoded on computer storage media described herein are directed to real-time situation determination based on distributed event data. According to various embodiments, the system receives event data from one or more computing devices. The system provides a machine learning model configured to use a plurality of interconnected check-point evaluators to evaluate the received event data and determine an occurrence of a situation. The system evaluates event values, via one or more check-point evaluator of the plurality of interconnected check-point evaluators, whether the event values meet criteria for one or more situation indicators. Based on the evaluation of the event values the system determines the occurrence of the situation.

22 Claims, 36 Drawing Sheets

Computer Diagram

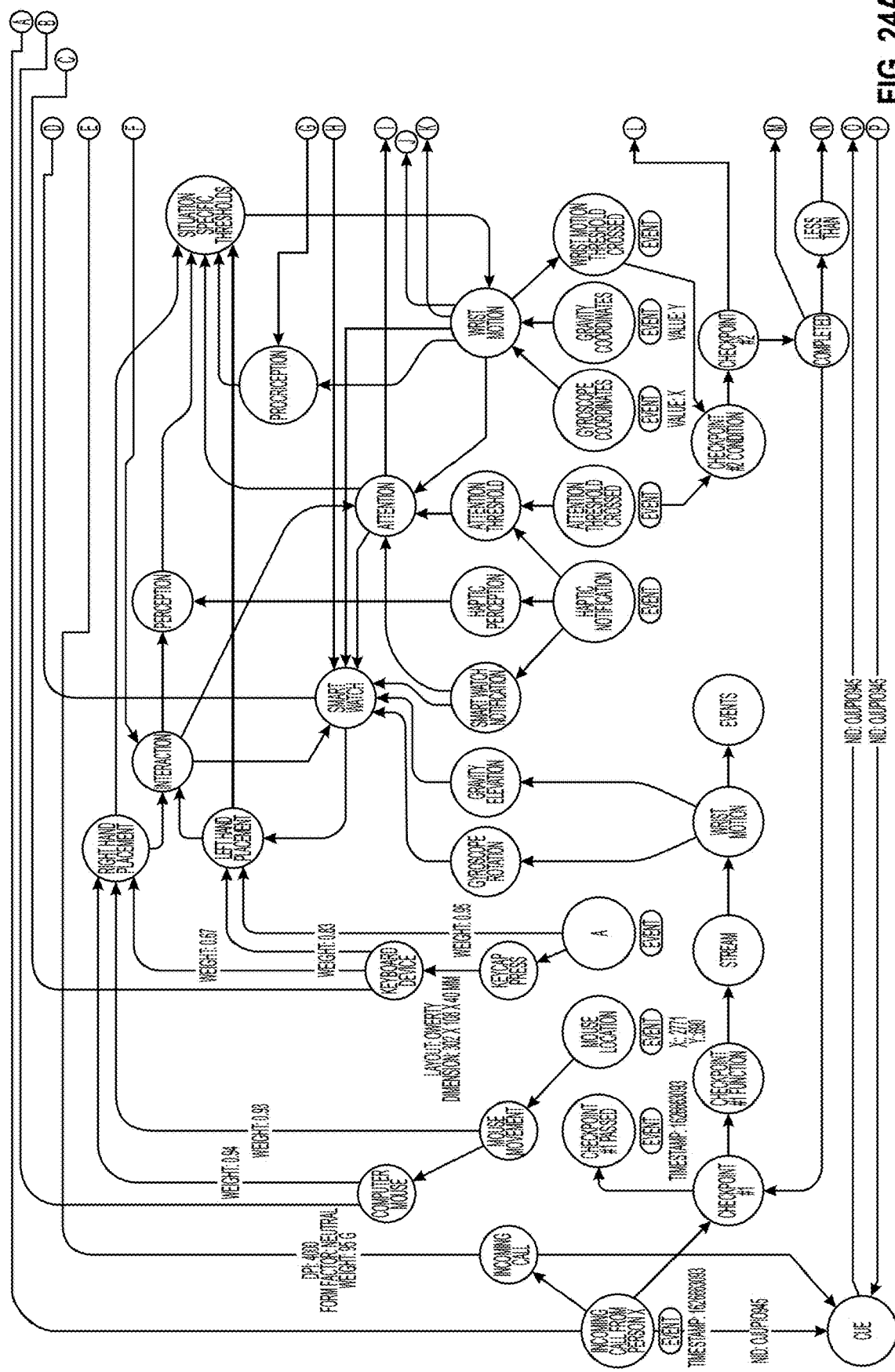

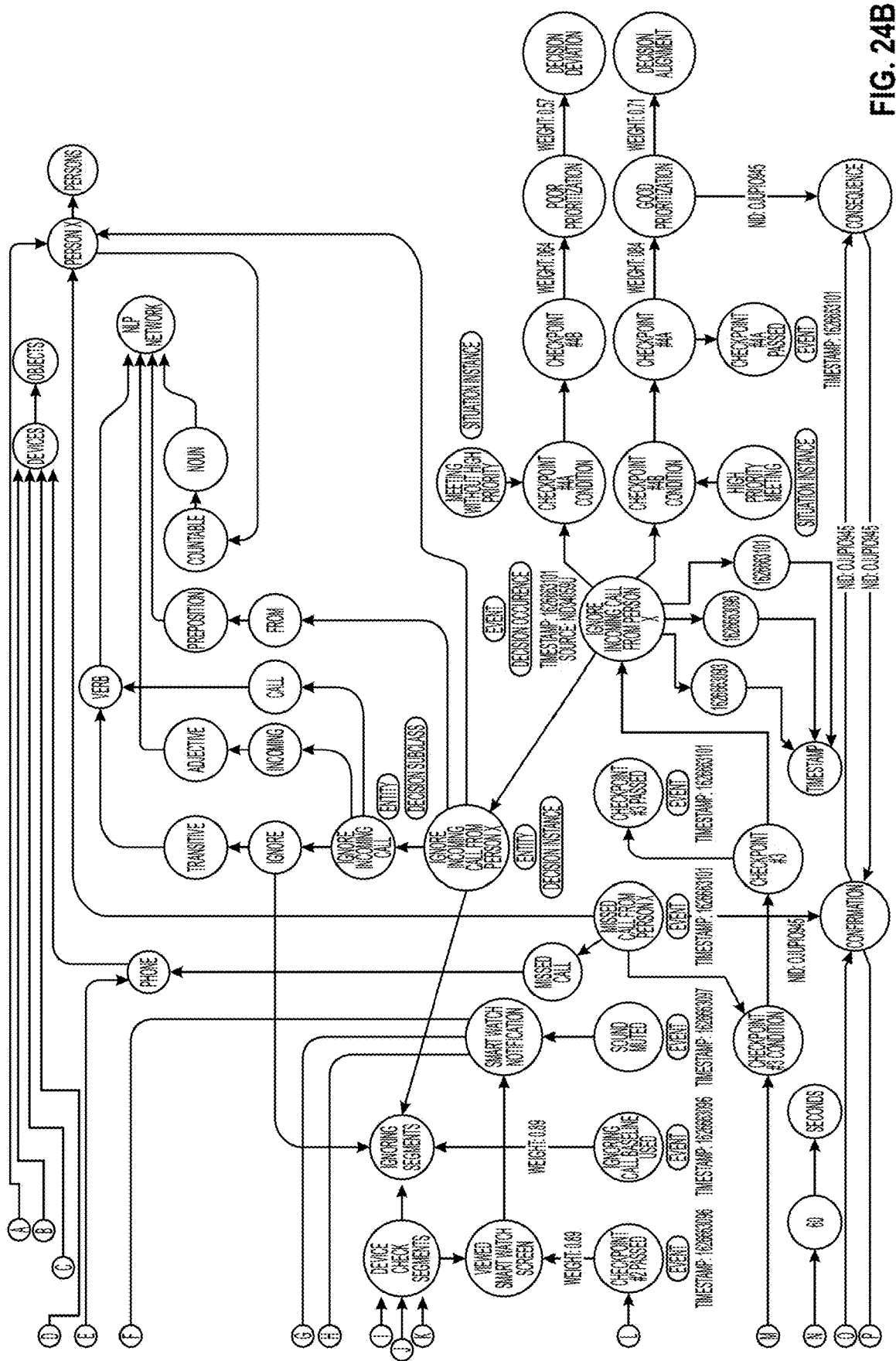

SYSTEM AND METHOD FOR REAL-TIME ARTIFICIAL INTELLIGENCE SITUATION DETERMINATION BASED ON DISTRIBUTED DEVICE EVENT DATA

CROSS-REFERENCE TO RELATED APPLICATIONS

This application is a continuation of U.S. application Ser. No. 17/491,466, filed Sep. 30, 2021, which relates to and claims the benefit of U.S. Provisional Patent Application, No. 63/174,526, filed Apr. 13, 2021, claims the benefit of U.S. Provisional Patent Application, No. 63/227,882, filed Jul. 30, 2021, and claims the benefit of U.S. Provisional Patent Application No. 63/240,331, filed Sep. 2, 2021, each of which are hereby incorporated by reference its entirety.

BACKGROUND

This application relates to artificial intelligence decision-making system, and more specifically a Decision Support Platform relating to computational methods and systems for distributed device decision-making analysis using artificial intelligence processing. In the field of computer science, artificial intelligence ("AI") networks, such as neural networks and deep learning networks, are being increasingly employed to solve a variety of tasks and problems. The Decision Support Platform combines cognitive bias reduction technology with decision intelligence tools to reduce decision noise by detecting and correcting decision noise in real-time, thereby providing real-time personal decision support in any situation.

Currently, there are no widely used technical solutions for reducing cognitive biases in people's daily lives. Some solutions have narrowed decision support into specific situations, such as presenting ideas during meetings. These solutions however only reduce cognitive biases for a specific decision, in a specific situation. While there are a vast amount of decision support or decision intelligence tools, few are behavioral-oriented. In other words, these decision intelligence tools are focusing on helping the user to make better decisions often in specific business environments or situations instead of focusing on supporting the user to become a better decision-maker overall. Moreover, by ignoring the behavioral element of a decision, one of the most fundamental aspects of decision making is not accounted for.

The Decision Support Platform involves an artificial intelligence (AI) framework addressing the challenges above. Current technological development has progressed to a point where it is now possible to monitor human behavior in real-time. This is possible due to the widespread use of user devices such as cell phones, personal computers, wearable technology, etc. The current system is aimed towards mapping a user's data to the user's decisions. The current system has a deliberate focus on human judgment coupled with a modular design applied to the user interface elements. The user interface elements may be in the form of modular and movable widgets, which may be snapped together like blocks. Modularity makes it possible to provide a familiar user experience. Hence, the Decision Support Platform will appear in a familiar manner and designed to run on operating systems, fluid interfaces, implant-based brain-machine interfaces, and mind-controlled technologies.

SUMMARY

Described herein is an innovative system and methods directed toward artificial intelligence decision-making software. More specifically, the Decision Support Platform relates to computational methods and systems for distributed device decision-making analysis using artificial intelligence type software. Various embodiments of the Decision Support Platform are directed to nudging the user to cultivate metacognition and mitigating cognitive bias. Metacognition is "cognition about cognition," or "thinking about thinking."

The Decision Support Platform implements systems and methods to improve decision-making and the fundamental understanding of the user's behavior and cognitive bias and processes through neural pathway engines, decision alignment, and situational response engines. The Decision Support Platform may predict situational responses at all times. To do so, the Decision Support Platform may understand the situation, the individual user, and the individual user's actions. This is achieved by allowing the user to standardize their decision-making through the creation of neural pathways. The decision alignment component of the system allows the user to understand their own behavior and make better decisions. The situational response engine component of the Decision Support Platform provides personal decision support for any decision.

Further, for decision support to occur real-time, the user requires decision support before a mistake is made. The Decision Support Platform may train a machine learning module or Prediction Machine Learning Network to detect consequences of events logged and make a prediction on the user's behavior before the next event occurs. Therefore, an analysis of the sequence of events logged in combination with tags input by either the user or the machine learning module are important to determining autonomous real-time decision support.

The various embodiments described herein provide improvements and advantages over conventional systems by, for example, implementing machine learning techniques to predict user behavior and nudge the user to become a better decision-maker. According to various embodiments, the Decision Support Platform receives user data from one or more user devices, where user data is based on one or more device and/or user actions and filters the user data as input into a database, where each event corresponds with a timestamp. In some embodiments, the Decision Support Platform may provide a trained machine learning model that has been trained on previous user data of the first user. The Decision Support Platform may utilize at least a portion of the received user data as input to a Prediction Machine Learning Network, comprising a trained machine learning model, where the Prediction Machine Learning Network may be configured to determine a current stimulus response and a next stimulus response of the first user. In some embodiments, the Decision Support Platform may determine a current stimulus response of the first user for a particular decision support intervention based in part on the Prediction Machine Learning Network. In some embodiments, based on the decision support intervention, a decision support prompt may be generated for a first user. In some embodiments, the decision support prompt may be an automatic action performed by the Decision Support Platform, a haptic prompt, audible prompt, and/or visual prompt to indicate a suggested action to be performed by the user.

In some embodiments, there is a system, non-transitory computer media and a computer-implemented method of providing real-time personal decision support. The system receives a plurality of event data, the event data comprising event values and having a timestamp of the particular event. The system creates in a data management system, one or more relationships of the event data to other previously stored event data and/or one or more relationships to other entity previously created in the data system. The data management system wherein the data management system is a database or machine learning network, or other suitable data management system. The relationships of the event data may include a weight, score, text or other properties indicating a strength of a relationship. The system may interpret (for example via an artificial intelligence system) a sequence of the event data and use various indicators to determine the occurrence of a cue, confirmation and/or a consequence. For example, a cue indicates what causes a process to start, a confirmation indicates when a process has started, and a consequence indicates the consequence of a process. In other words, a cue indicates what process is to be expected based on interpreting the sequence of events, and the confirmation indicates that the process to be expected has occurred.

In some embodiments, there is a system, non-transitory computer media and a computer-implemented method of providing real-time personal decision support. The system may be configured to perform the method comprising the operations of receiving data from one or more computing devices, where the data relating to information about a user, the data includes inner user data and outer user data. A machine learning network may be trained to predict or classify the occurrence or likely occurrence of a situation. The system determines the occurrence of a situation based on input of received data into the trained machine learning network.

In some embodiments, there is a system, non-transitory computer media and a computer-implemented method of determining situations and decisions. The system provides a machine learning network that includes a plurality of interconnected check-point nodes, a plurality of decision nodes and a plurality of situation nodes. The check-point nodes are configured to establish a pathway to another check-point node, establish a pathway to a decision node and/or establish a pathway to a situation node. A first plurality of the interconnected check-point nodes evaluate for conditions and/or criteria of event values as compared to one or more decision indicators, and select a decision node where the conditions and/or criteria are met. A second plurality of the interconnected check-point nodes evaluate for conditions and/or criteria of event values as compared to one or more situation indicators, and select a situation node where the conditions and/or criteria are met. A situation indicator assesses event values to determine a likelihood that a situation has occurred. A decision indicator assesses event values to determine a likelihood that a user has made a decision.

The event values may comprise any one or more values, by way of illustration, but not limitation, some of the values include a location value, a computer device movement value, values indicating a change in course of the user, a user heart rate value, a user blood pressure value, a user mobility value, a user EEG value, a user EMG value, an accelerometer value, a temperature value.

The system may determine a baseline pattern of activity by evaluating previously received event values and determine whether the baseline pattern of activity has changed. The system may determine that a decision has been made and/or a situation has occurred where the baseline pattern of activity has changed. By way of illustration, but not limitation, the system may determine the baseline pattern of activity has been determined to change based on any one or more of the following changes: change in a movement of a device; change in a course or location of a device; change in a user heart rate; change in a user blood pressure; change in a user EEG activity; change in a user EMG activity; change in computational activity of a computing device; change in location of a computing device; change in a temperature; change in computer device usage by a user; change in a light value; change in accelerometer values; change in audio signals; change in usage of a software application; change in sending and/or reading of electronic communications, comprising email messages, text messages; change in usage of calendaring applications; change in power consumption of electric devices; a change in check-point node; a change in a decision node; and/or a change in a situation node.

Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 24A is the left half of a diagram illustrating an example of operation of an exemplary embodiment.

FIG. 24B is the right half of a diagram illustrating an example of operation of an exemplary embodiment.

DETAILED DESCRIPTION

Figure 1A:
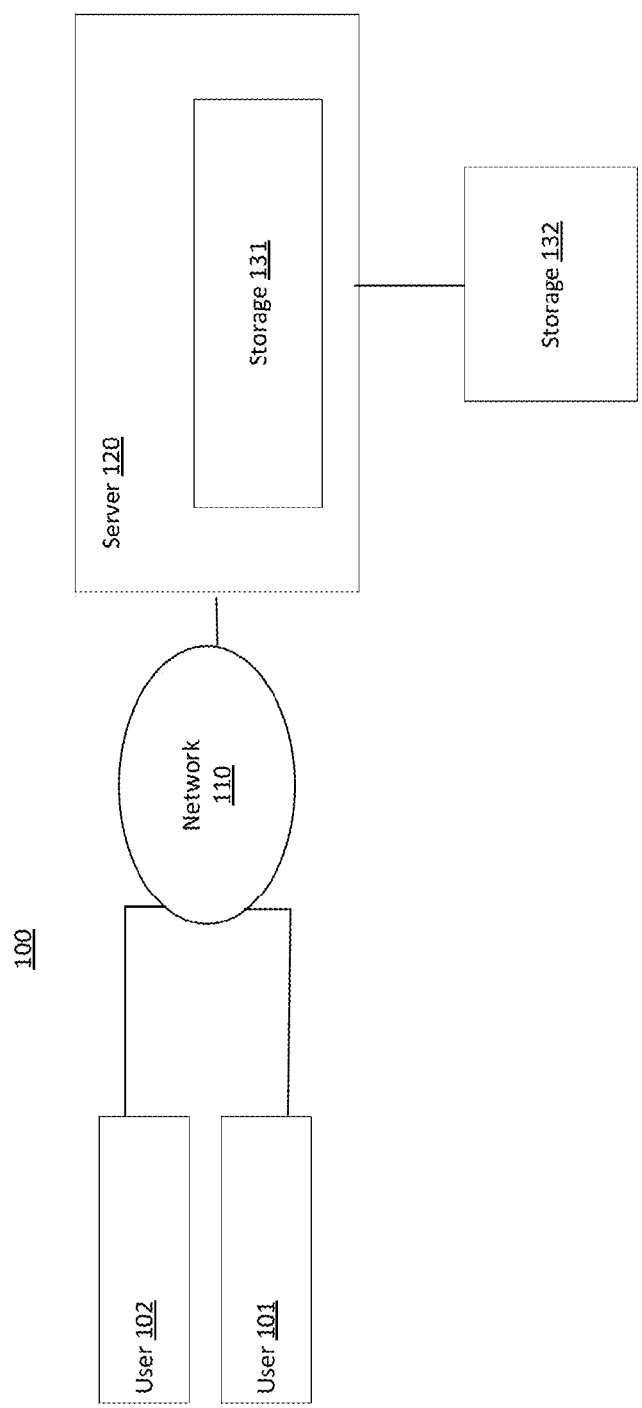
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however, it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the Decision Support Platform. The Decision Support Platform may be practiced without some or all of these specific details. In addition, well-known features may not have been described in detail to avoid unnecessarily obscuring the invention.

In addition, it should be understood that steps of the exemplary methods set forth in this exemplary patent may be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

A diagram of an exemplary network environment in which embodiments may operate is shown in FIG. 1A. In the exemplary environment 100, two users, 101, 102 are connected over a network 110 to a server 120 having local storage 131. Users 101, 102 and servers 120 in this environment may be computers or other various user devices. Server 120 may be configured to handle requests from users. Server 120 may be implemented as a number of networked server devices, though it is illustrated as a single entity. Communications and transmissions between a base station and one or more control centers as described herein may be executed similarly as the users 101, 102 requests.

In an embodiment, one or more users 101, 102 may store a file in the storage 131, 132. This may be accomplished via communication over the network 110 between the user 101, 102 and server 120. For example, the client may communicate a request to the server 120 to store a file with a specified name in the storage 132. The server 120 may respond to the request and store the file with the specified name in the storage 132. The file to be saved may exist on the user side 101, 102 or may already exist in the server's local storage 131.

In accordance with the above, embodiments can be used to store a file on local storage such as a disk or removable medium like a flash drive, CD-R, or DVD-R. Furthermore, embodiments may be used to store a file on an external storage device connected to a computer over a connection medium such as a bus, crossbar, network, or other interconnect. In addition, embodiments may be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service (SaaS), platform-as-a-service (PaaS), infrastructure-as-a-service (IaaS), and similar features. In a cloud computing environment, a user may store a file in the "cloud," which means that the file is stored on a remote network resource though the actual hardware storing the file may be opaque to the user.

Figure 1B:
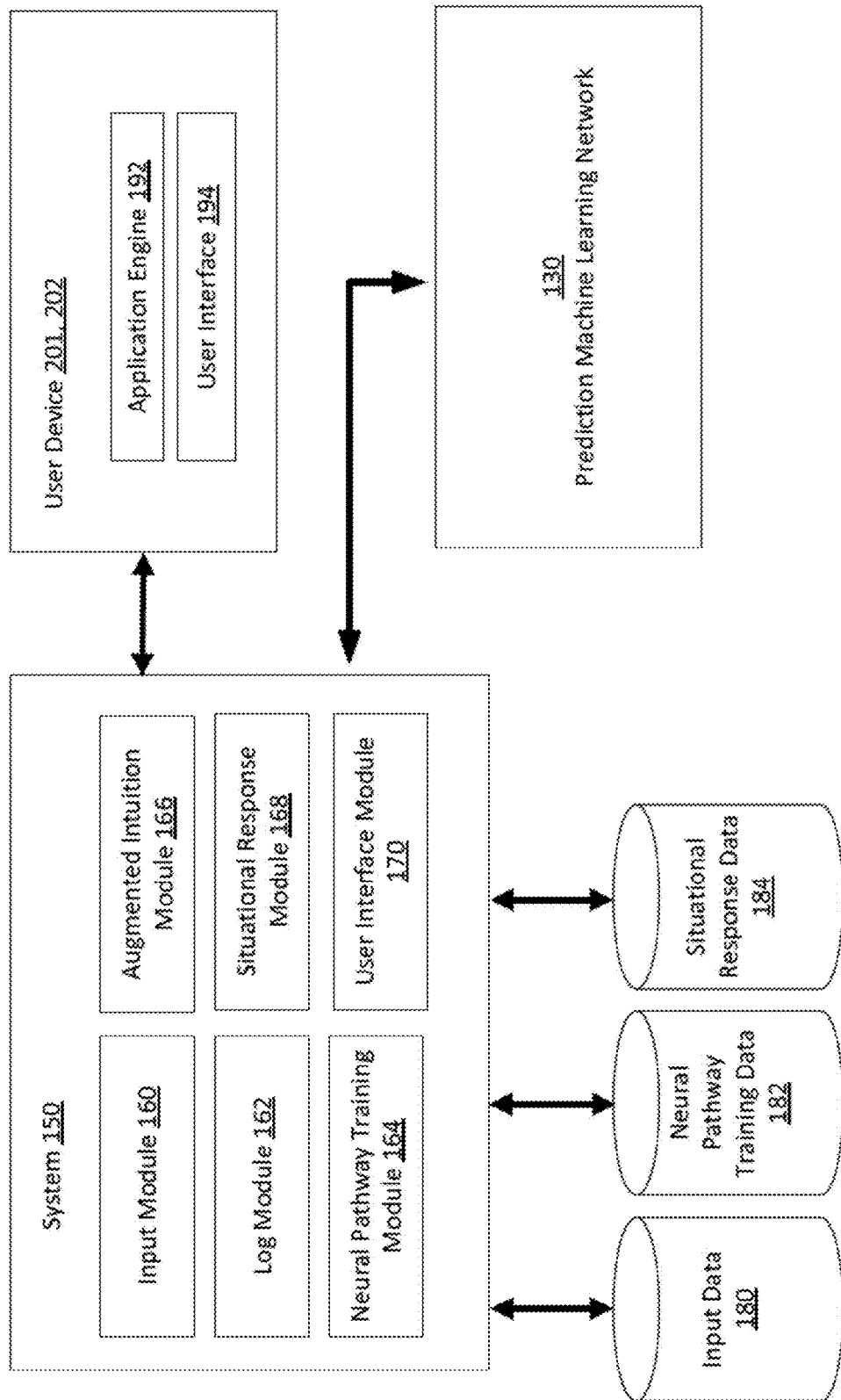
FIG. 1B is a diagram illustrating an exemplary environment in which some embodiments may operate.

FIG. 1B illustrates a block diagram of an exemplary system 140 for a Decision Support Platform that includes an Input Module 160, a Log Module 162, a Neural Pathway Training Module 164, an Augmented Intuition Module 166, a Situational Response Module 168, and a User Interface (U.I.) Module 170. The system 140 may communicate with one or more user devices 201, 202 to display output, via a user interface 194 generated by an application engine 192.

The Prediction Machine Learning Network 130 may communicate with the system 100, and each module, including an Input Module 160, Log Module 162, Neural Pathway Training Module 164, Augmented Intuition Module 166, Situational Response Module 168, and a user interface (U.I.) module 170. The Decision Support Platform has a deliberate focus on human judgment coupled with the modularized concept (modular design applied to the user interface (U.I) module 170). The user interface elements of the user interface (U.I.) module 170 may be in the form of modular and movable widgets, which may be snapped together like blocks. Modularity makes it possible to provide a familiar user experience. Hence, the Decision Support Platform will appear in a familiar manner and designed to run on operating systems, fluid interfaces, implant-based brain-machine interfaces, and mind-controlled technologies. The modules listed above are all aspects that are particularly targeted to train specific cognitive abilities (metacognition), induce structural neurological changes (neuroplasticity) while mimicking an augmented intuition. In one embodiment, the Decision Support Platform may directly interface with a user's thoughts using a fluid interface, implant-based brain-machine interfaces, and mind-controlled technologies.

In one embodiment, system 150 may interface with databases comprising input data 180, neural pathway training data 182, and situational response data 184. While the databases 180, 182, and 184 are displayed separately, the databases and information maintained in a database may be combined together or further separated in a manner that promotes retrieval and storage efficiency and/or data security.

Figure 2:
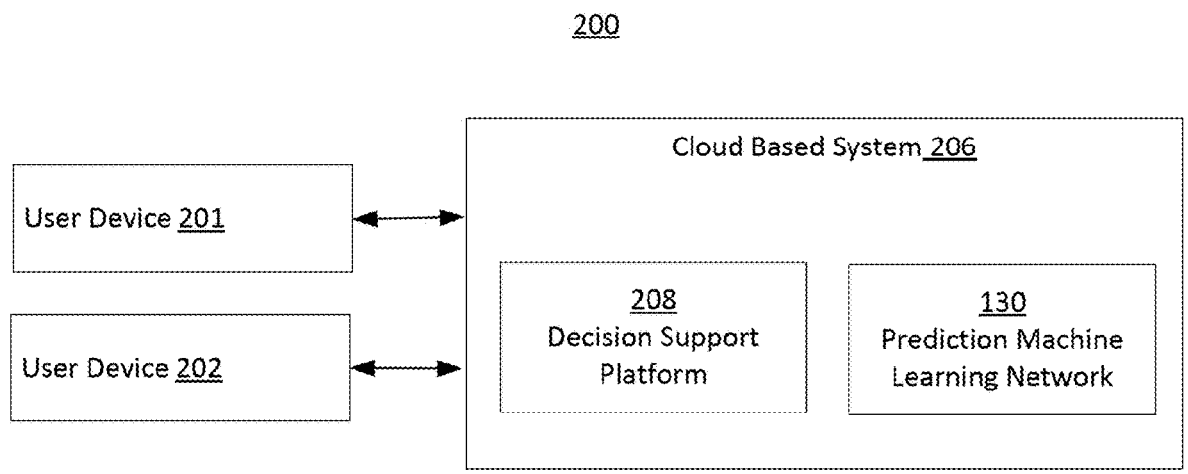
FIG. 2 is a diagram illustrating an exemplary environment in which some embodiments may operate.

The Input Module 160 of the system 150 may perform functionality as illustrated in FIG. 2. For example, FIG. 2 illustrates the cloud-based system 206 receiving data from user devices 201, 202. The cloud-based system 206 may include the Decision Support Platform 208 and the Prediction Machine Learning Network 130.

Figure 3:
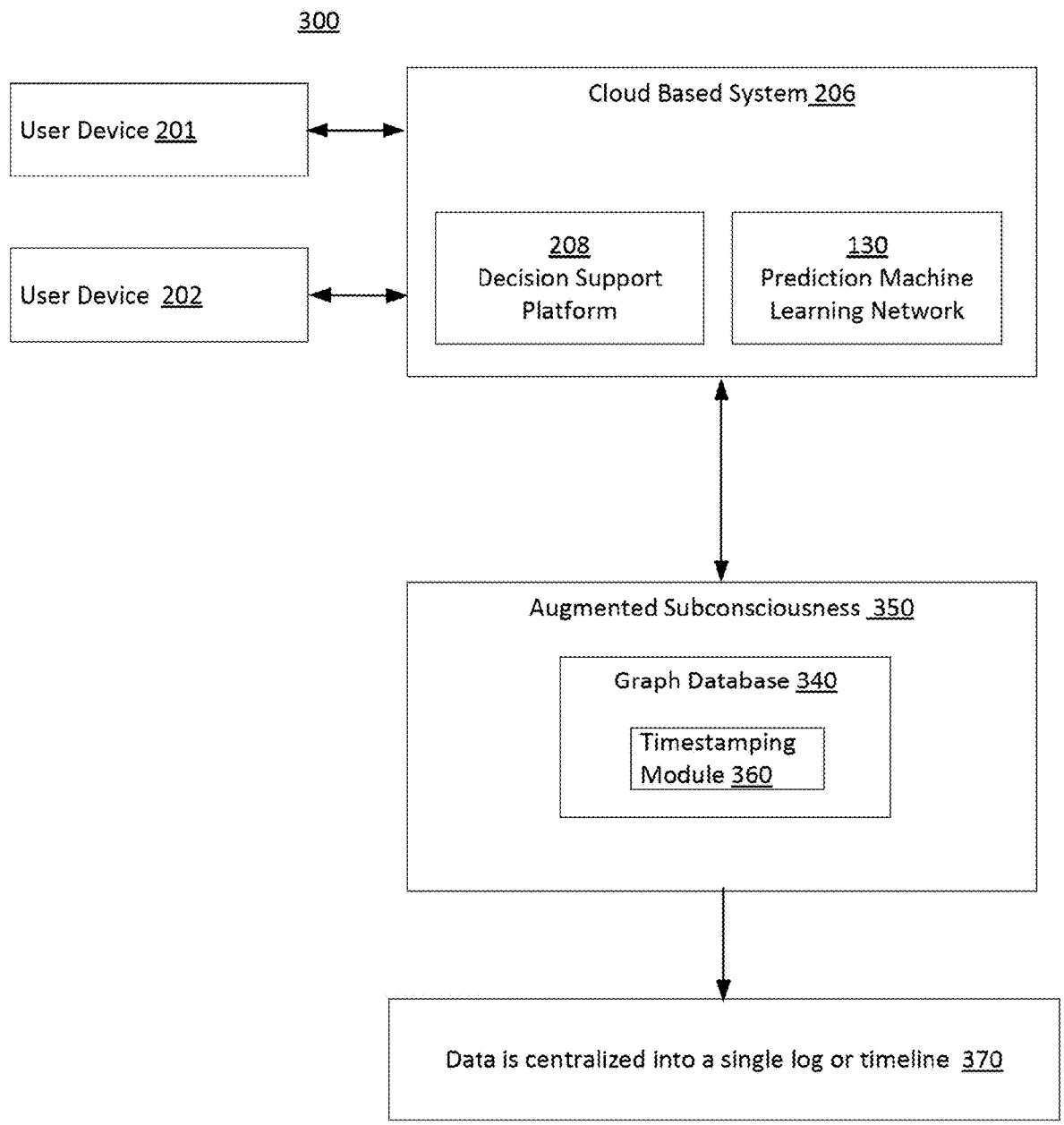
FIG. 3 is a diagram illustrating an exemplary environment in which some embodiments may operate.

The Log Module 162 of the system 150 may perform functionality as illustrated in FIG. 3. For example, the cloud-based system 206 as described in FIG. 2 may interact with an augmented subconsciousness system 350 which may include a graph database 340 and a time-stamping module. Data may be centralized into a single log or a timeline 370.

Figure 4:
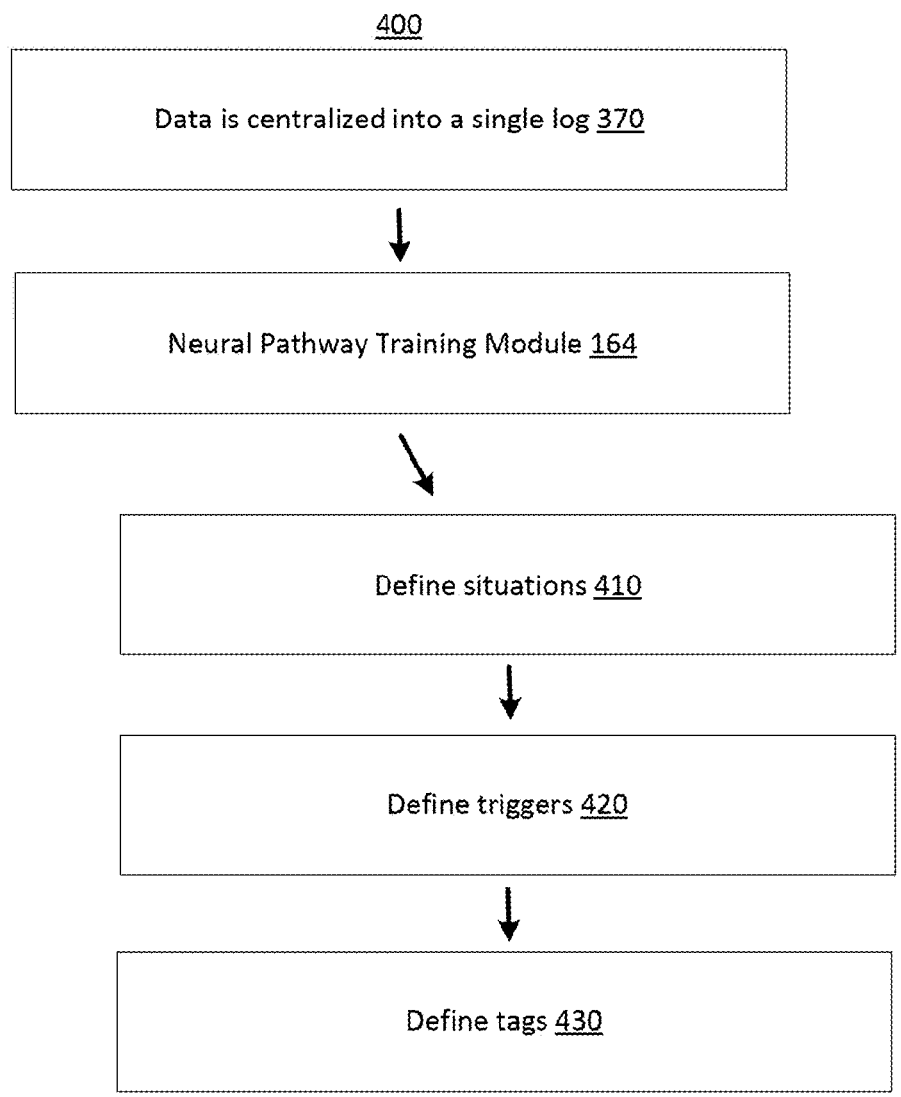
FIG. 4 is a flowchart illustrating an exemplary method that may be performed in which some embodiments may operate.
Figure 9:
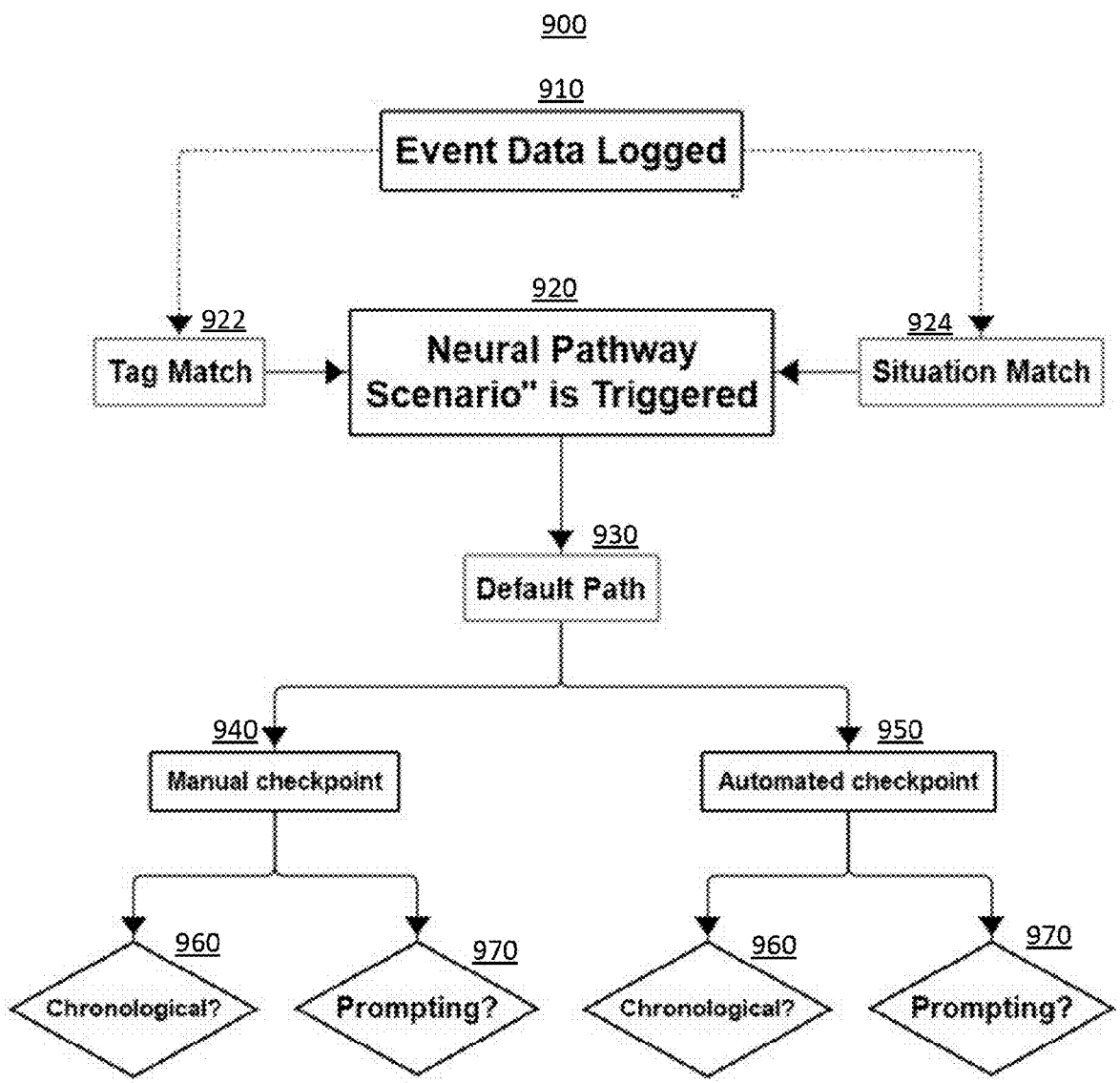
FIG. 9 is a diagram illustrating an exemplary method that may be performed in which some embodiments may operate.
Figure 10:
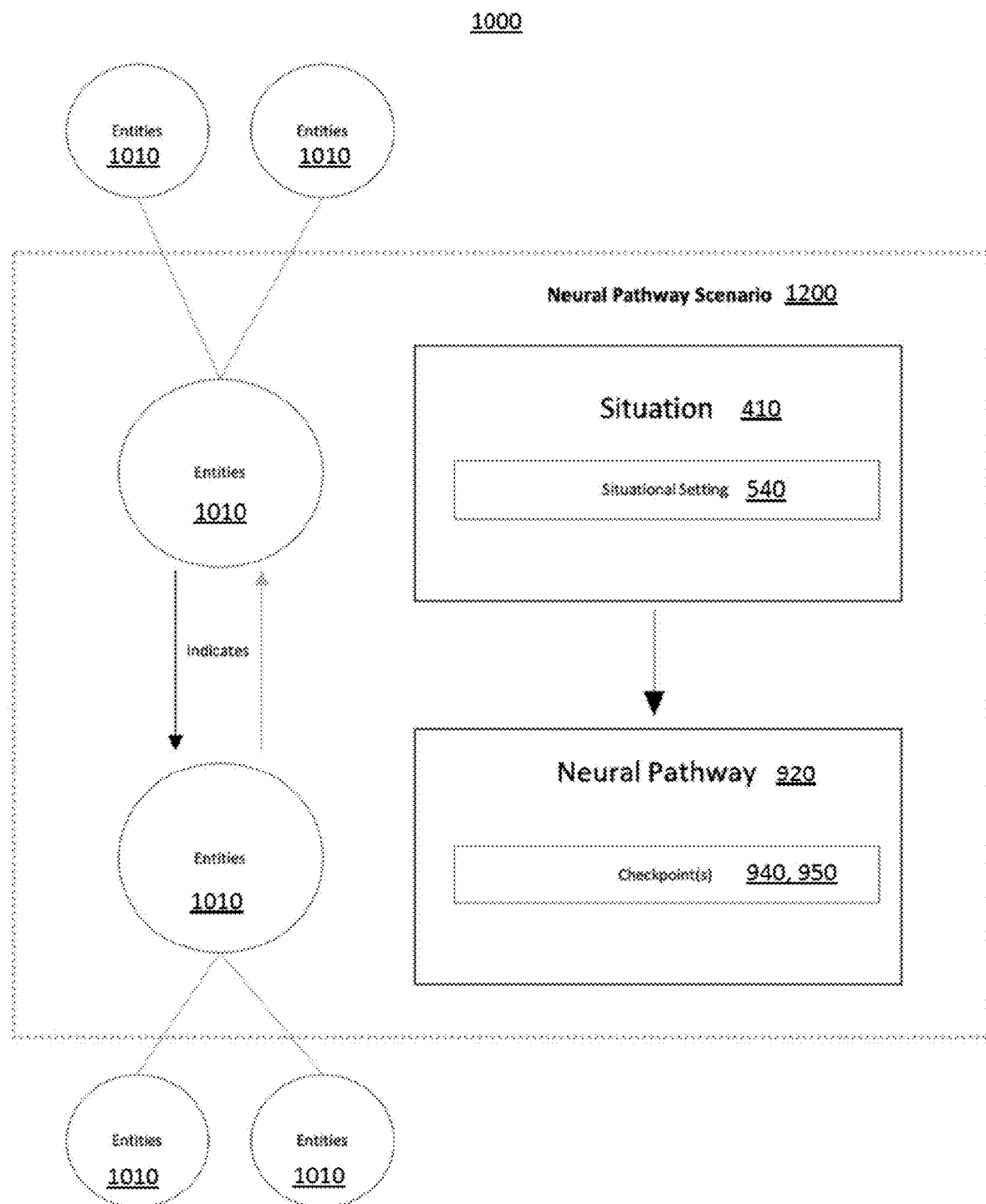
FIG. 10 is a diagram illustrating an exemplary method that may be performed in which some embodiments may operate.

The Neural Pathway Training Module 164 of the system 150 may perform functionality as illustrated in FIGS. 4, 9, and 10. For example, FIG. 4 illustrates data being centralized into a single log 370. The data is provided to the Neural Pathway Training Module 164. The Neural Pathway Training Module may define situations 410, triggers 420 and/or tags 430.

Figure 11:
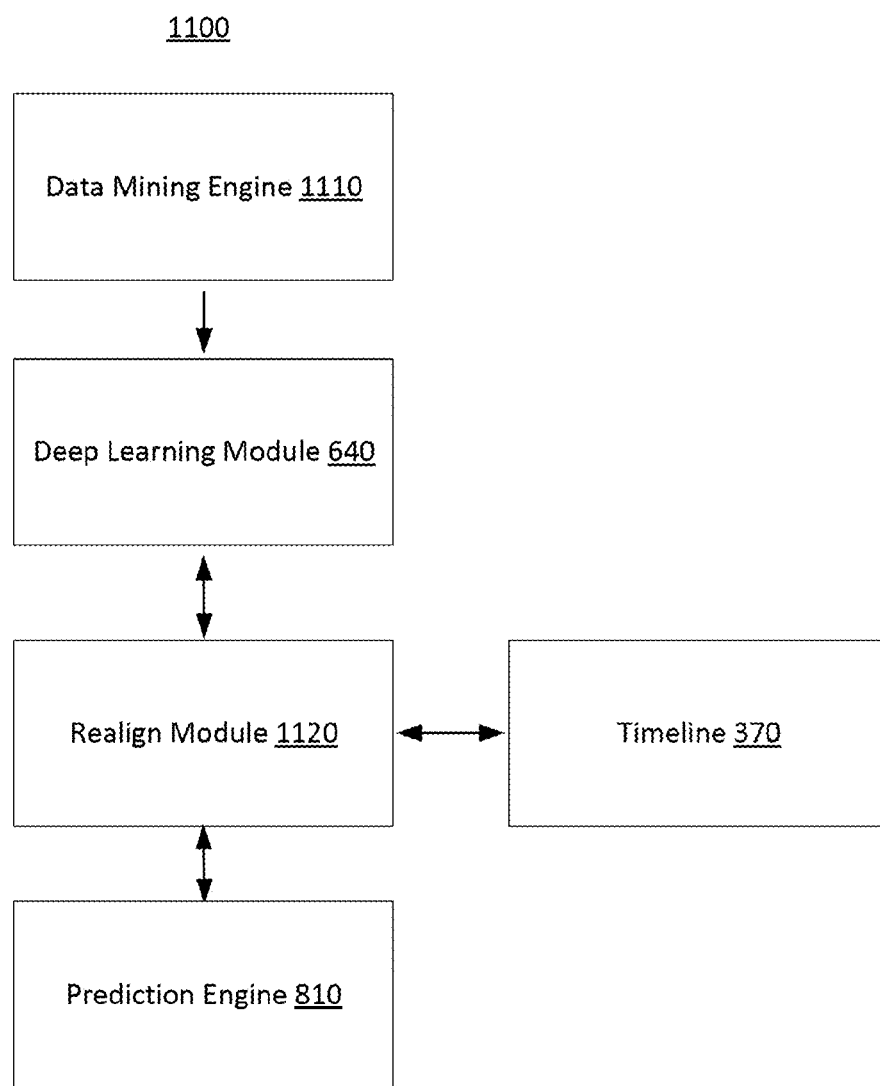
FIG. 11 is a diagram illustrating an exemplary environment in which some embodiments may operate.

The Augmented Intuition Module 166 of the system 150 may perform functionality as illustrated in FIG. 11.

Figure 6:
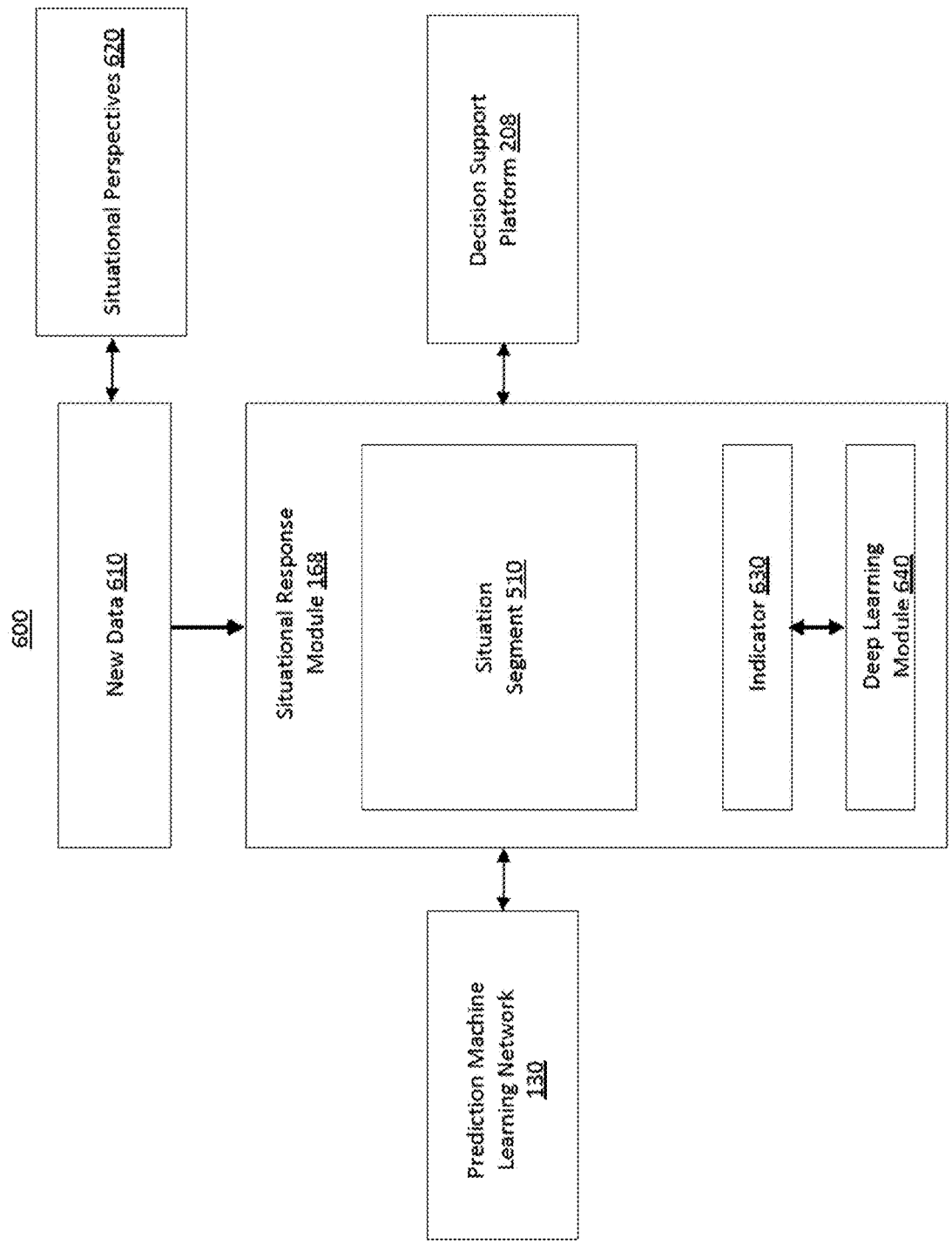
FIG. 6 is a diagram illustrating an exemplary method that may be performed in which some embodiments may operate.
Figure 8:
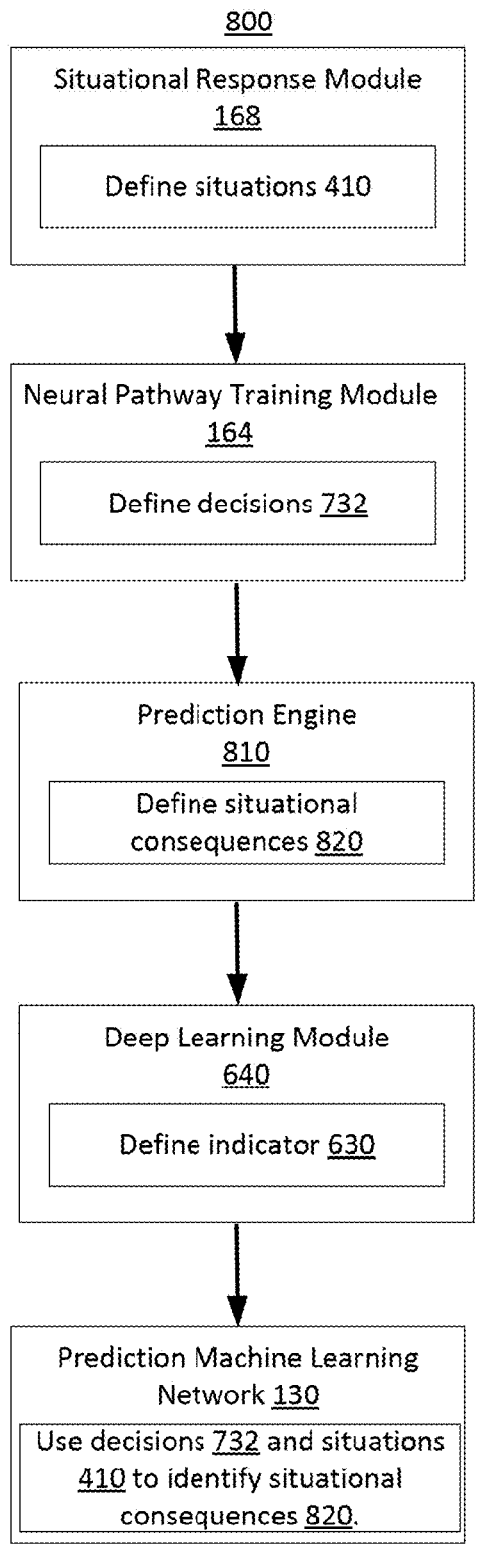
FIG. 8 is a flowchart illustrating an exemplary method that may be performed in which some embodiments may operate.

The Situational Response Module 168 of the system 150 may perform functionality as illustrated in FIGS. 6 and 8.

The User Interface Module 170 of the system 150 may display information based on functionality as illustrated in FIGS. 2-20.

As shown in FIG. 2, diagram 200 illustrates an exemplary environment in which the Input Module 160 may operate. In the exemplary environment 200, user devices, 201, 202 are connected to a cloud-based system 206. User devices 201, 202 in this environment may be computers or other various user devices. In some embodiments, the Decision Support Platform may receive updates from user devices 201, 202. Thus, the Decision Support Platform may receive data from connected user devices 201, 202.

The type of received data received by the system may include, but is not limited to, individual keystrokes, mouse movements, finger movement, gyroscope events, calendar data, time data, location data, activity data, heart rate data, blood sugar level data, hydration data, blood pressure data, sleep data, weather data, genome data, and neurotechnological data such as electroencephalography ("EEG") data, magnetoencephalography ("MEG") data, and functional near-infrared spectroscopy ("fNIRS") data. Data may be received by devices including, but not limited to, a personal computer ("PC"), a tablet PC, a Personal Digital Assistant ("PDA"), a cellular telephone, a wearable device, a neurotechnological implant device, and internet of things ("IoT") devices.

In one embodiment, the Decision Support Platform may be installed on the user device 201, 202. The Decision Support Platform may be installed and run as a native application, hybrid application, progressive web application, widget, plugin, software, API, browser based website, browser extension, streamed service, single page application, web application, application run on blockchains, decentralized application ("DApp"), fluid interfaces, implant-based brain-machine interfaces, mind-controlled platforms, and brain-computer interfaces.

In one embodiment, data received by user devices 201, 202 may be normalized and categorized by the Prediction Machine Learning Network 130 described in detail below. In one embodiment, at least a portion of the user data may be input into a database wherein each event corresponds with a timestamp. In one embodiment, data received by user devices 201, 202 may be categorized by the user. By way of example, some user devices may be mobile phone, laptop or desktop computer, wearable smart monitors, watches and devices, implants, ingestible smart device or pill and/or non-invasive neurological headsets.

Data received by the system may be processed and categorized by the Prediction Machine Learning Network 130 into categories and subcategories based on data type, value, relationship to other data, date, timestamp, universally unique identifier ("UUID"), and/or network identification ("NID"). In one embodiment, one or more NID's may be assigned at the time a datasource is categorized by either the user 101, 102 or the Prediction Machine Learning Network 130. Further, the NID may trigger functions inside one or more graph databases, Prediction Machine Learning Network 130, or cloud management system. In one embodiment the user may assign a category, subcategory, data type, and unit to the data received. For example, if the data received was genomic data, the user may be prompted to assign the data type as "genomic sequence." Captured data may then be input into a schemaless database, such a NoSQL database (e.g., a graph database), as will be further described in detail below.

In one embodiment, the Decision Support Platform may log interactions between the user and the user device 201, 202, including, but not limited to keystrokes, mouse movements, and touch interactions. In one embodiment, the Decision Support Platform may include a keylogging keyboard designed to track user activity and interaction across all application-based platforms. In one embodiment, the system by keylogging may determine a baseline of the user's activities. For example, the system may determine a baseline of the ratio between "A-Z" and "backspace" keystrokes. In this example, if the user demonstrates behavior outside of baseline behavior, such as an increased "backspace" keylogging, the Decision Support Platform may interfere and/or interact with the user-based determination of a deviance from the baseline activity.

In one embodiment, the Decision Support Platform may utilize a portion of received user data as input to a Prediction Machine Learning Network, where the Prediction Machine Learning Network is configured to determine a current stimulus response and next stimulus response of the user. In some embodiments, the Prediction Machine Learning Network may be trained on previous user data collected by the Decision Support Platform.

In one embodiment, the Decision Support Platform may process or evaluate the user data to capture indicators for a user's emotional, physiological, and subconscious behavioral factors. For example, by way of illustration, some user data related to the user's physiological state comprises data values for blood pressure, heart rate, HRV, and body temperature.

The Decision Support Platform may be designed to run on fluid interfaces, implant-based brain-machine interfaces, and mind-controlled technologies. Though user devices 201 and 202 are illustrated as only two user devices, in practice there may be more or fewer user devices. The user device 201, 202 generates data based on one or more actions executed on the user device 201, 202. The user device 201, 202 sends the data to a cloud-based computing system 206. For example, the cloud-based system 206 may include (or host) the Decision Support Platform 208 which may further include access to a respective Prediction Machine Learning Network 130 for each user device 201, 202. It is understood that the Prediction Machine Learning Network 130 and/or the cloud-based computing system 206 may be part of the Decision Support Platform 208. Various embodiments may provide for the Prediction Machine Learning Network 130 situated internal to or external to the cloud-based computing system 206.

As shown in FIG. 3, diagram 300 illustrates an exemplary environment in which the Log Module 162 may operate. The Decision Support Platform centralizes and processes personal and traceable data from available data sources or user devices 201, 202. In one embodiment users may install the decision support platform 208 on their user devices 201, 202 which may log activity from the user as time-stamped events. The user's interaction and activity then become centralized in conjunction with all other available user data. In the exemplary environment 300, user devices 201, 202 are connected to a cloud-based system 206. Users in this environment may be computers or other various user devices.

Though user devices 201 and 202 are illustrated as only two user devices, in practice there may be more or fewer user devices. The user device 201, 202 generates data based on one or more actions executed on the user device 201, 202. The user device 201, 202 may send the data to a cloud-based computing system 206. For example, the cloud-based system 206 may include (or host) the Decision Support Platform 208 which may further include access to a respective Prediction Machine Learning Network 130 for each user device 201, 202. It is understood that the Prediction Machine Learning Network 130 may include, but is not limited to transformers, Attention based Neural Networks, Recurrent Neural Networks ("RNN"), Convolutional Recurrent Neural Networks ("CRNN"), Spiking Neural Networks ("SNN"), Evolutionary computation, Evolutionary algorithms and/or neural networks, Attention-based algorithms ando/r Neural Networks, Graph Neural Networks ("GNNs"), Convolutional Neural Networks ("CNN"), Graph Convolutional Neural Networks ("GCNNs"), Deep Neural Networks ("DNN"), Relational Graph Convolution Neural Network ("R-GCNs"), and Scaling Graph Neural Networks ("SGNNs"). Various embodiments of the Prediction Machine Learning Network 130 may be performed in parallel or sequentially. Other suitable machine learning networks may be used to perform the functionality and processing as described herein.

It is understood that the Prediction Machine Learning Network 130 and/or the cloud-based computing system 206 may be part of the Decision Support Platform 208. Various embodiments may provide for the Prediction Machine Learning Network 130 situated internal to or external to the cloud-based computing system 206. The cloud-based computing system 206 may be connected to an Augmented Subconsciousness 350 system. For example, the Augmented Subconsciousness 350 may log data in the form of a graph database 340. In computing, a graph database (GDB) is a database that uses graph structures for semantic queries with nodes, edges, and properties to represent and store data. The graph relates the data items to a collection of nodes and edges, the edges representing the relationship between the nodes. Graph databases leverage a seamless design and speed which ease the data capturing and query process. Graph databases also follow a multi-dimensional structure which in turn optimizes the tagging process which will be described in detail below. It is understood that the timestamping module 360 may be part of the graph database 340. Timestamps performed in the timestamping module 360 may be in a time format, such as a UNIX/Epoch time format. The centralized nature of the data in the graph database 340 in addition to the timestamping module 360 allow users to view a time-constrained version of the Augmented Subconsciousness system 350 in the form of a timeline, or a single log 370. The timeline may be one of several modular widgets the user may interact with, functioning as a filtered version of their personal master log 370, where each event is captured. The timeline 370 component of the Decision Support Platform may be a default component, functioning to sync the user's calendar and other task managers.

As shown in FIG. 4, flowchart 400 illustrates an exemplary environment in which the Neural Pathway Training Module 164 may operate. In an exemplary environment 400, the user data is centralized into a single log 370. The log 370 may be connected to a Neural Pathway Training Module 106. In an exemplary environment, the Decision Support Platform may utilize at least a portion of the received user data as input to a Prediction Machine Learning Network 130, wherein the Prediction Machine Learning Network 130 may be configured to analyze data in real-time to determine a user's current stimulus response and next stimulus response. In some embodiments, the current stimulus response of a user for a particular decision support intervention may be determined in part by a Prediction Machine Learning Network.

In one embodiment, a Prediction Machine Learning Network 130 may be trained to determine a situation based on a set of received user data logged for a particular time frame or for a particular sequence. The active situation segment of a user may be based on identified event sequence, which may be a pre-identified event sequence or an event sequence identified in real-time. An active situation segment may be based on Indicators 630 for user data 530, situational setting 540 and situational conditions 520. Situational conditions 520, may comprise event data related to objects that would represent an environment in a situation 410. The situational setting 540 may be determined based the sequence of events logged.

It is understood that where the current need 1210 may not be determined by current user data, the stimulus response may be determined by a crowd-sourced machine learning model where the prediction score is below a threshold. In some embodiments, next response 1220 of a user 101, 102 may be based on the determined current need 1210, based in part on a Prediction Machine Learning Network 130. Determining the next response 1220 may be based on a second set of received user data logged for a particular time frame, or in a particular sequence, where the second set of received user data may be received by the Prediction Machine Learning Network.

The Prediction Machine Learning Network may analyze the determined current need 1210 and next response 1220 to determine a decision support intervention. Determining decision support intervention may be based on one or more Indicators 630 of a data relationship where the second set of received user data is similar or correlated to historic user data.

In one embodiment, the one or more indicators may comprise a labeled set of data, or entities 1010 (as referred to in FIG. 10) having weighted relationships. Indicators will be described in further detail in later sections. Entities 1010 may include, but are not limited to, an event, state, decision, condition, action, situation 410, neural pathway, tag 430, value, data type, date, activity, user device 201, 202, or person. It is understood that a machine learning algorithm may weigh relationships between entities 1010. In some embodiments, a decision support prompt based on the determined decision support intervention may be displayed to the user 101, 102. In some embodiments, the decision support prompt may be an automatic action performed by the system, a haptic prompt, an audible prompt, and/or a visual prompt to indicate a suggested action to be performed by the user. The decision support prompt may comprise a list of one or more actions to be performed by the user, wherein the list of actions may be either predetermined actions to be performed by the user or dynamically generated actions to be performed by the user. It is understood that the Decision Support Platform 208 may determine that the suggested action was performed by the user by receiving input from the user confirming the action was performed, or by determining based on device events that the suggested action was performed. In some embodiments, the Decision Support Platform 208 may receive indicator output from the Prediction Machine Learning Network and display that indicator output from the Prediction Machine Learning Network as a decision support prompt for a user.

The Neural Pathway Training Module 164 creates an algorithm for new neural pathways. The user 101, 102 may link decisions to purpose through a series of indicators, including but not limited to situations 410, triggers 420, and tags 430. It is understood that tags 430 may be grouped with other tags 430. In one embodiment, the user 101, 102 may set a trigger to run under various circumstances. As the Decision Support Platform 208 monitors the user's interaction in conjunction with the rest of the available data, the user 101, 102 may set the conditions of a trigger 420 to run if certain stress requirements are met, such as unusual keyboard typing, data on a lack of sleep, or a genetic predisposition to not be focused in certain situations 410. For example, if the user 101, 102 has specific protocols to follow in a meeting, the user 101, 102 may select the protocol source, such as a software or protocol template as an action. This process would be done in the path widget installed on the user device 201, 202. Because the Decision Support Platform 208 tracks the user's 101, 102 activity, the user 101, 102 would only need to select a "register path" button, open the protocol source, and the Decision Support Platform 208 may prompt the user 101, 102 to assign the source as an action. The program is now linked to the trigger the user assigned. For example, when the user has a meeting scheduled on the calendar with a specific person, the Decision Support Platform 208 may open protocol software automatically. A tag 430 is one or more entities that the user 101, 102 has labeled or tagged as something specific. A tag 430 may be an event or a decision. A situation 410 is defined as a set of events happening and the conditions that exist during that particular time and place. Situations 410 may be classified into categories or subcategories, where the situation 410 would be the single instance or unique "situation" within a category. It is understood that a situation 410 may be generated either by the Prediction Machine Learning Network 130, or by the user 101, 102. The Prediction Machine Learning Network 130 may generate a situation 410 automatically based upon user data entering the system, while the user 101, 102 may generate a situation 410 through interacting with various modules and assigning one or more tag(s) 430 to data.

Figure 5:
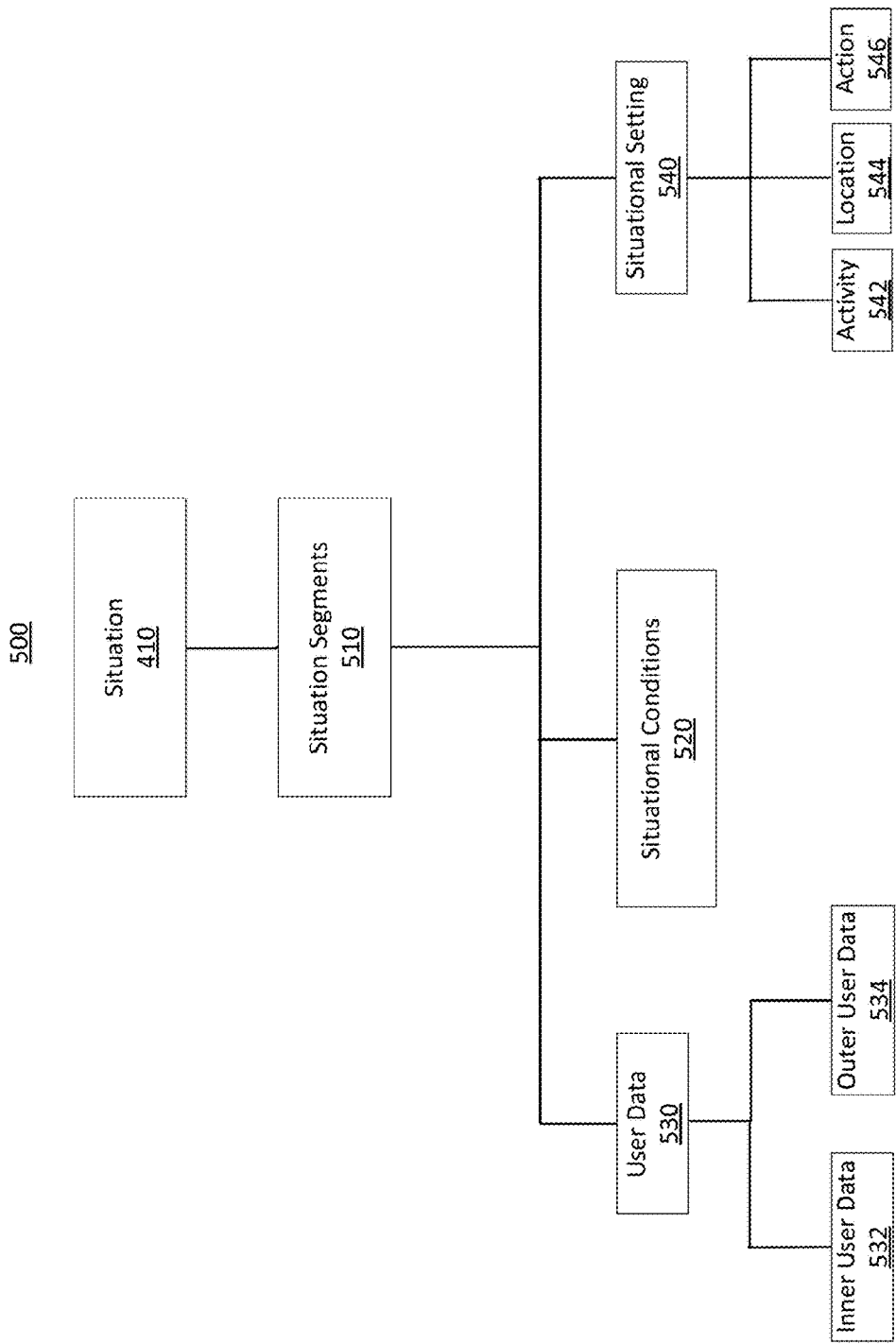
FIG. 5 is a diagram illustrating an exemplary method that may be performed in which some embodiments may operate.

As shown in FIG. 5, diagram 500 illustrates an exemplary environment in which a situation 410 is determined in the Decision Support Platform 208. As outlined in FIG. 4, a situation 410 is identified by the Decision Support Platform 208 as a set of events and the conditions that exist during that particular time and place. In some embodiments, the Situational Response Module 168 may classify situations 410 into categories or subcategories, referred to as situation segments 510. Situation segments 510 may be an event logged by the user 101, 102 or triggered by the Decision Support Platform 208 that represent the specific occurrence of a situation 410. While a situation segment 510 is active, all data collected from user devices 201, 202 may have a relationship to the situation segment 510. Situation segment(s) 510 are further disclosed in FIG. 10B.

The Situational Response Module 168 may change the situation segment 510 based on how the Situational Response Module 168 senses or determines the situation 410 in real-time. In another embodiment, the Prediction Machine Learning Network 130 may segment the situation 410 in part with the Situational Response Module 168.

In some embodiments, the Situational Response Module 168 may sense how the user 101, 102 is experiencing the situation 410 from different situational perspectives 620 within the situation 410 based on the data that enters the system in real-time. A situational perspective 620, as further disclosed in FIG. 6, may be defined as different lenses or views under which the Decision Support Platform 208 understands the situation(s) 410, decision(s) 732, and user(s) 101, 102. Further, in some embodiments, the Situational Response Module 168 may change the situational perspective 620 based on how the Situational Response Module 168 senses the user's 101, 102 perception of the situation 410 as it develops.

In some embodiments, the Situational Response Module 168 may or may not make predictions. In some embodiments, the situation segments 510 may comprise user data 530, information about situational conditions 520, and information about situational settings 540. User data may comprise inner user data 532 and outer user data 534. Inner user data 532 may represent data from inside the body of the user 101, 102 and include, for example, data related to heart rate or blood pressure. Outer user data 534 may be data representing factors outside the body of the user 101, 102 and include, for example, data related to (weather, time, temperature).

For example, the system may receive data from one or more computing devices where the data relates to information about a user. As described above the received data may be categorized as to inner user data 532 and outer user data 534. By way of illustration, but not limitation, examples of inner user data may comprise: data describing measurements obtained from a user's body, data describing activity of a user's body, and/or data describing activity of a user's brain. By way of illustration, but not limitation, examples of outer user data may comprise: data describing activity of electronic devices used by the user, data describing activity of the movement of a user, data describing activity of the movement of a portion or part of the user, data describing measurements or aspect of an environment where a user is positioned, and/or data describing locations of where electronic devices are used.

As described herein, the system may provide a trained machine learning network, where the trained machine learning network has been trained to predict or classify the occurrence or likely occurrence of a situation. The system may input to the trained machine learning network the received inner user data 532 and/or outer user data 534 to determine the occurrence of a situation. For example, the situation may include a predicted situational setting comprising an activity, location and/or action. An activity may comprise a process occurring in the situation. A location may comprise a geo-spatial location or place where the situation would occur. An action comprises a user interaction with the determined situation.

Situational conditions 520 may be defined as the specific set of data which, in conjunction with the situational setting 540, distinguishes one situation 410 from another. In some embodiments, the situational setting 540 may comprise data related to activity 542, location 544, and action 546.

As described herein, the system may provide a situational response module that is in data communication with the trained machine learning network. The situational response module may determine a situation segment. For example, the situation segment may represent a single or repeating occurrence of the situation.

As described herein, the system may provide a prediction engine that is in data determining, by the prediction engine, one or more predicted situational consequences. For example, the one or more predicted situational consequences represents a sequential relationship between the data within or across situations.

As described herein, the system may determine the occurrence of one or more decisions based on input of the received data into the trained machine learning network. For example, a decision may comprise one or more actions that are made with an intention (e.g., goal-oriented decisions, conscious decisions, unconscious decisions). A decision may comprise a sequence of determined events to be performed. The sequences of events may be performed by one computing device to another computing device, a computing device of a user, and/or events performed by a user with monitoring and/or feedback sensors communicatively coupled with the user.

A decision may comprise a sequence of determined events to be performed. Each event 910 in the event sequence for a decision may also comprise a relationship to a single or multiple neural pathway checkpoints 940, 950 generated by the user 101, 102 or the neural pathway training module 164. The sequences of events may be performed by one computing device to another computing device, a computing device of a user, and/or events performed by a user with monitoring and/or feedback sensors communicatively coupled with the user.

Figure 16:
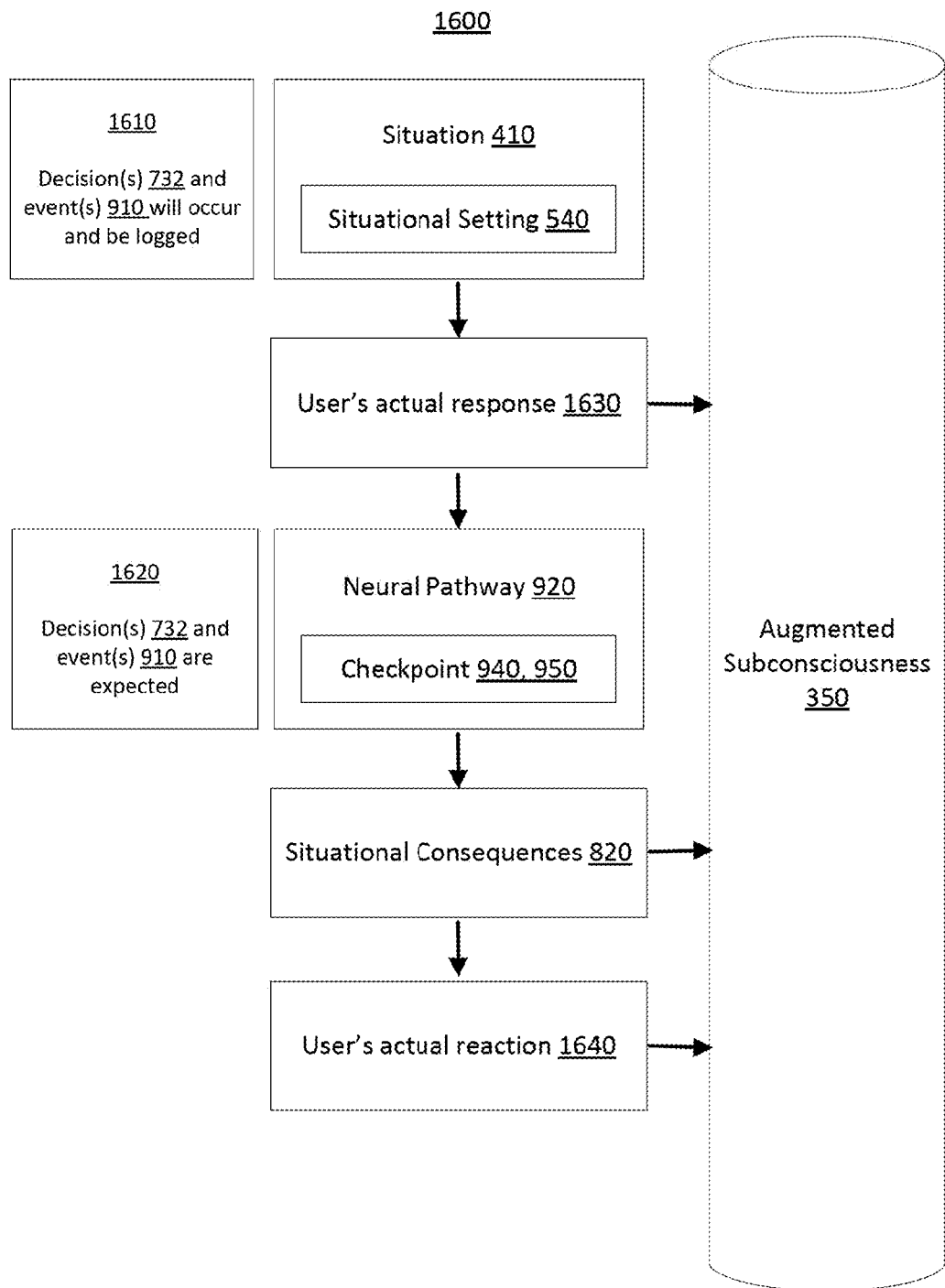
FIG. 16 is a diagram illustrating an exemplary environment in which some embodiments may operate.
Figure 17:
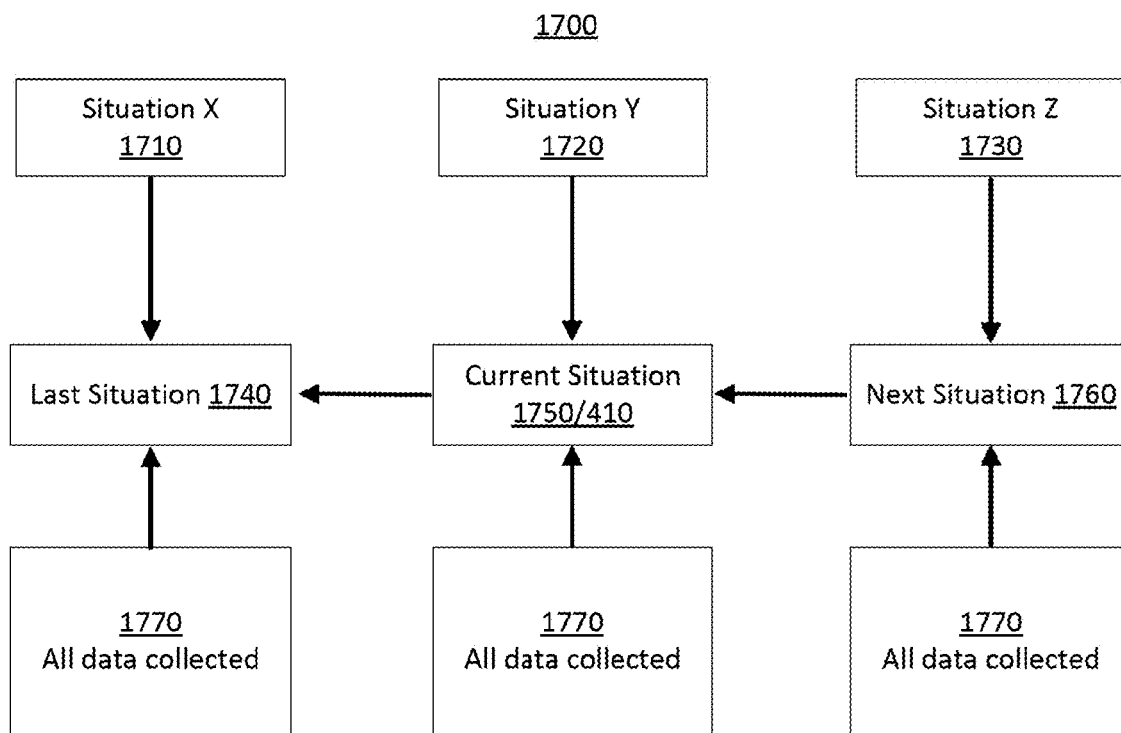
FIG. 17 is a diagram illustrating an exemplary environment in which some embodiments may operate.

As shown in FIG. 16, the user's 101, 102 decision making pattern is continuously mapped. Furthermore, as outlined in FIG. 17, a neural pathway 920 scenario may serve as a reference point for events 910 to be logged in the future. For example, there may be a user who is a venture capitalist investor and spends a majority of their working hours in meetings evaluating new companies in which to invest. This is also an example of a situation 410. As shown in FIG. 17, events 910, situations 410, and indicators 630 are systematically linked and the Prediction Machine Learning Network 130 determines baselines for different events 910 based on the sequences of events logged.

As shown in FIG. 6, diagram 600 illustrates an exemplary environment in which the Situational Response Module 168 operates. In one embodiment, new data 610 may enter the system and directly interface with the Situational Response Module 168. In some embodiments, the Situational Response Module 168 may contain situational segments 510, which may include all data that entered the system during the situation segment 510. The Situational Response Module 168 may utilize one or more indicators 630 to sense the situation 410 and the user(s) 101, 102 from different perspectives. For example, for the Decision Support Platform 208 to better understand the situation 410, decisions 732, and the user(s) 101, 102, the Situational Response Module 168 may dynamically adjust the weight of one or more indicators 630 as new data 610 enters the system. As discussed in FIG. 4, indicators 630 comprise a labeled set of data having weighted relationships.

Further, situational perspectives 620 may change based on the sequence of data that enters the system, or on how the data, values, and relationships between data and values change within the situation 410. In some embodiments, the Situational Response Module 168 may change the situational perspective 620 based on how the Situational Response Module 168 is currently sensing the user(s) 101, 102 perception of the situation 410 as it is developing. The situation segment 510 may comprise all data that entered the system during that particular situation segment 510. The Situational Response Module 168 may also comprise indicators 630 and Deep Learning Module 640. In some embodiments, the Situational Response Module 168 communicates with the Prediction Machine Learning Network 130, which further initiates changes in other modules in real-time based on situational response data within the Situational Response Module 168. Moreover, the situation segment 510 also illustrates how the Prediction Machine Learning Network 130 may be trained on identifying related prediction criteria every time new data 610 enters the system. The Situational Response Module 168 may train the Prediction Machine Learning Network 130 to identify data that comprise a situation 410. The Situational Response Module 168 may also train the Prediction Machine Learning Network 130 on actions 546 or decisions 732 that may lead to changes in situational consequences 820.

It is understood that indicators 630 and the Deep Learning Module 640 may directly interface with each other. In some embodiments, the Deep Learning Module 640 may generate new indicators 630 based on results from the Situational Response Module 168. Further, in some embodiments the Situational Response Module 168 may be in direct communication with the Prediction Machine Learning Network 130 and Decision Support Platform 208.

Figure 7:
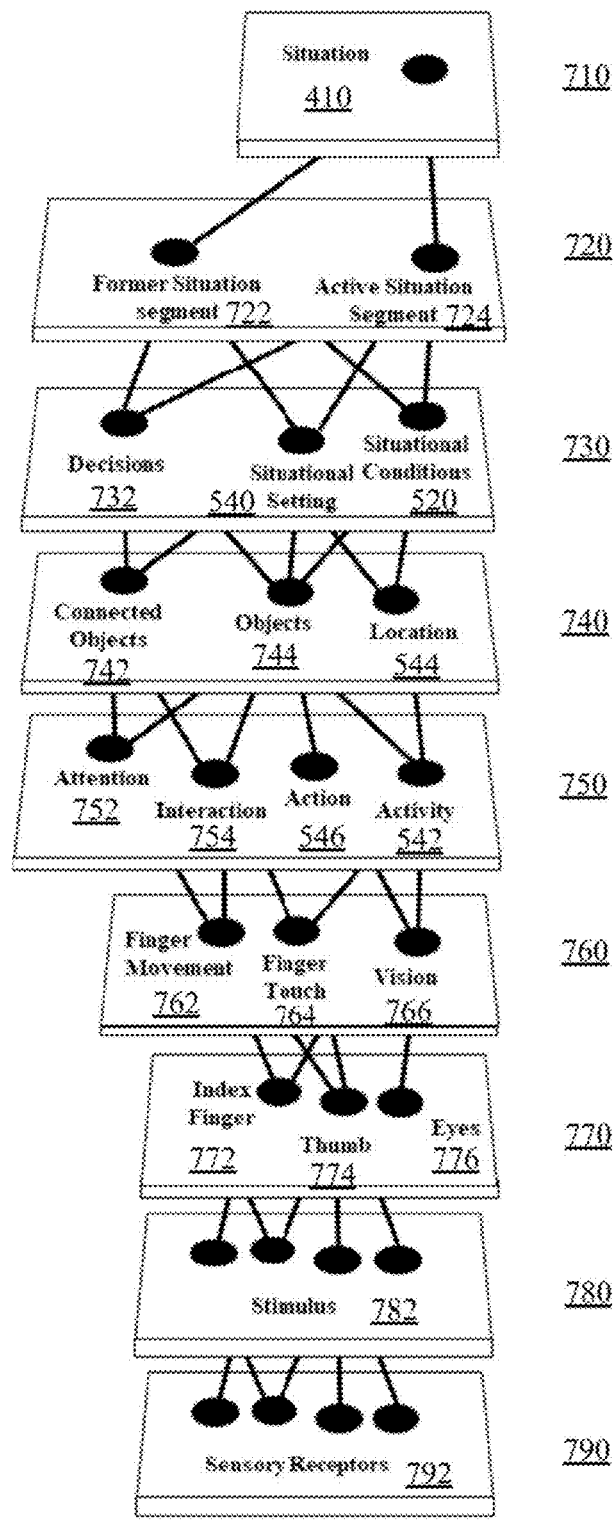
FIG. 7 is a diagram illustrating an exemplary environment in which some embodiments may operate.

As shown in FIG. 7, diagram 700 illustrates an exemplary environment in which situational perspectives 620 may be generated with indicators 630. An application engine (such as a software program) may be installed on one or more user devices. The application engine 192 may be executed or run on the devices and the application engine collects/monitors activity on the device. The application engine for example, may determine or collect information about applications or processes running on the respective user devices. For example, various input devices (i.e., input source), by way of illustration, but not limitation may include a keyboard, mouse, pen device, touch screen and/or microphone. The application engine logs event data associated with the input source used by the user. The application engine transmits the information to a service (such an Internet-accessible server), the service may include a machine learning model (such as those described herein) trained to evaluate event data. Based on the transmitted information, the service via the machine learning model may determine one or more situational perspectives. When the application engine receives the, the application engine may assign properties and/or associate data to the received information. For example, the system may assign properties indicating that a user is focusing attention on the input device; the system may associate information about a particular program or window being interacted with by the input device. The application may determine what the user is viewing and/or where the user's attention on the screen is placed in real-time. The application engine may register one or more indicators of a situation, where the indicators relate to the user's interaction with an input device.

In some embodiments, layer 710 may comprise situation 410. The situation 410 may interface with a former situation segment 722 and an active situation segment 724 in layer 720. The former situation segment 722 comprises data on one or more past situations 410. The active situation segment 724 may interface with actions occurring in real-time, such as decisions 732, situational setting(s) 540, and situational conditions 520 in layer 730. In some embodiments, the application engine 192 may detect components in layer 740, including connected objects 742, objects 744, and location 544. For example, screen layout and keyboard layout on a personal computer ("PC") may be defined as objects 744, while a smartwatch, mixed reality headset, or neurotechnological devices may be defined as a connected object 742. Objects 744 may then be used to sense environmental dimensions. Depending on the user device 201, 202, a logged keystroke may represent various data from the user 101, 102. For example, the application engine 192 may detect the user 101, 102 typing on a keyboard as an object 744. The device 201, 202, or object the keylogging event takes place on may correspond to another connected object 742. Through objects 744 and connected objects 742, users 101, 102 may connect several objects 744 in their environment to the application engine 192. In some embodiments, a neurotechnology headset may interface with both the user's 101, 102 brain, thoughts and other devices where actions 546 are initiated. In this example, the application engine 192 may be installed on the neurotechnological device, and the application engine 192 may use data from the connected objects 742 and the user device 201, 202 where the application engine 192 is installed. Location 544 may be represented in real-time by geographic coordinates in sync with connected objects 742.

In some embodiments, the application engine 192 may assign properties to events or an activity 542 in layer 750. For example, the instance of the user 101, 102 typing on a keyboard may correspond to attention 752, indicating that the user 101, 102 is viewing, or focusing attention 752 on the screen or device 201, 202 while typing. Further, the program information, window information, and application information may be extracted from the user device 201, 202 by the application engine 192. The application engine 192 may identify what the user 101, 102 is viewing, or where their attention on the screen is placed in real-time. Attention 752 would then be registered as an indicator 630 for the situation. In one embodiment, keylogging by the user 101, 102 may be registered as an interaction 754 and/or action 546.

Layer 760 contains examples of data the application engine 194 may identify from the user 101, 102. For example, depending on the keyboard layout which the application engine 194 has identified, keylogging may correspond to finger movement 762 involved in the activity 542 of typing. Finger touch 764 may be logged on a touch screen user device 201, 202, and vision 766 may be identified and logged by a neurotechnological device. In a further embodiment, if the user device 201, 202 is a desktop computer with a corresponding keyboard, the keystroke "CTRL ALT" may be sensed as being logged by the user's thumb 774, while the keystroke "E" may be sensed as being logged by an index finger 772. If the user device 201, 202 is a neurotechnological device, the keylogging may be logged by the user's eyes 776 as displayed in layer 770.

In some embodiments, the Decision Support Platform 208 may map objects 744 and connected objects 742 to sensory receptors 792 by identifying the object type as it is added as a new data source 610. As demonstrated in layers 780 and 790, the Decision Support Platform 208 may automatically map stimulus 782 to sensory receptors 792 involved in the activity 542, action 546, and/or interaction 754. A keystroke, for example, may be classified as an object 744, interaction 754, or an event, described in further detail below.

In some embodiments, the system performs a method of providing real-time personal decision support. For example, the system may generate a series of one more events with the events including event values. The system may use a machine learning network that has multiple interconnected check-point nodes that form multiple pathways to decision nodes. The system may input the event information via the machine learning network to determine a decision node. The check-point nodes may receive event values and evaluate for conditions and/or criteria of the received event values as compared to one or more decision indicators. Based on the evaluation of the event values and the one or more decision indicators, the check-point nodes follow a path from one check-point node to another check-point node until the decision node is reached. There may exist multiple pathways from one check-point node to many other check-point nodes, where each of the various pathways may lead to the same decision node. In some instances, the machine learning network may only need to enter one check-point node and then reach a decision node. In other instances, the machine learning network may follow a path of entering and exiting multiple check-point nodes to then reach a final decision node. For example, up 2 to 100 check-point nodes may be utilized as part of the pathway depending on the context of the event and type of decision to be made. The foregoing range of the number of check-point nodes is not meant to limit the total number of check-point nodes that may be used by the machine learning network to reach a decision node.

As used herein, a more general function of a check-point evaluator may be used in place of a check-point node. Also, as described herein, a check-point node may be considered to be a check-point evaluator. The function of the check-point evaluator may be a separate function used as part of or in place of a check-point node. The machine learning network may perform the check-point evaluator to evaluate received event data. For example, the system may receive data from one or more computing devices where the data comprises a series of one or more events including event values. The system provides a machine learning model configured to use a plurality of interconnected check-point evaluators to evaluate the received data and determine an occurrence of a situation 410. The system evaluates event values, via one or more check-point evaluators of the plurality of interconnected check-point evaluators, whether the event values meet criteria for one or more situation indicators. Based on the evaluation of the event values determining the occurrence of the situation 410. A check-point evaluator may be a check-point node and a situation may be a situation node of the machine learning model.

A machine learning model may be trained to use check-point evaluators to further determine a situation 410 based on a set of received user data logged for a particular time frame or in a particular sequence. Check-point evaluators may process a series of one or more events including event values, where the set of interconnections between the events may be pre-identified or determined in real-time. A machine learning model, for instance a prediction engine 810, may predict the sequential occurrence of user data 540 as new data 610 is received. The prediction engine 810 may further communicate with one or more machine learning models, for instance a Prediction Machine Learning Network 130. The sequential interconnections between checkpoints may further be pre-identified or identified in real-time through segmentation, for instance cue, confirmation, consequence segmentation. One or more machine learning models in communication with the Prediction Machine Learning Network 130 may further use the pre-identified interconnections between check-point evaluators and user data 530 received in real-time to predict the likelihood and/or determine the occurrence of a new situation. For example, the sequential passing or validation of the check-point evaluators may be used in to determine when a current situation 410 or active situation segment 510 should change.

Decision nodes may be predetermined decision nodes that exist as part of the machine learning network prior to the events being generated and evaluated by the check-point nodes. Moreover, the decision nodes of the machine learning network are dynamically generated dynamically based on continued received events. In some embodiments, a decision node may comprise a decision process. For example, a decision process or function may be performed when the decision node is reached to evaluate the event data or other data stored by the system and the machine learning network determines one or more decisions to be made. When the decision node is reached, the system may wait to receive additional event data to have additional information that may be needed so that the machine learning network may determine a decision.

The decision indicators are used by the machine learning network to determine whether the event values satisfy conditions and/or criteria to move from a then current check-point node to a decision node and then moving to the decision node, and if the criteria is not satisfied, then moving to another check-point node. In some examples, the one or more decision indicators for a particular check-point node have weighted values and the weighted values change over time based on events being evaluated. In additional examples, the weighted value indicates a strength of relationship of a particular decision indicator to another decision indicator.

When a decision node is reached the system may perform various operations and functions. For example, when the decision node is reached, then an event may be logged as a decision. In another example, when the decision node is reached, then the system may link an event to another decision node thereby connecting a decision to a situation segment.

The machine learning network may include entities having multiple different entity classes and an entity may include a relationship to one or more other entities. Each of the different entity classes may have one or more entity subclasses. An event may be an occurrence of an entity subclass. As a subclass of a parent entity class, an event may inherit the properties, data, values and/or other characteristics of its parent entity class.

In some embodiments, the system may determine an entity class (e.g., a situation classification, a decision classification) of received event data from one or more computing devices where the event data includes date and time information. The system may determine an instance of the entity class. The system may determine an event (e.g., a situation segment) that represents an occurrence of an instance of an entity class (e.g., the situation classification, decision classification, etc.). While an event (e.g., a situation segment) is active, the system may receive additional event data and associate the received event data to the event.

As shown in FIG. 8, flowchart 800 illustrates an exemplary environment in which various modules interact with the Prediction Machine Learning Network 130. Each module of the Decision Support Platform 208 may interact with the Prediction Machine Learning Network 130 to make predictions in real-time, communicate with the Decision Support Platform 208, and adapt sensing of the situation 410. In one embodiment, the Situational Response Module 168 may define situations 410. In some embodiments, the Situational Response Module 168 may interact with the Neural Pathway Training Module 164, which may define decisions 732. Decisions 732 and situations 410 are key to the prediction process as the Prediction Machine Learning Network 130 may use decisions 732 and situations 410 as input or reference for predicting situational consequences 820 in real-time. In one embodiment, situational consequences 820 may be identified in the prediction engine 810. Situational consequences 820 may be defined as a set of data comprising a clear connection to a former situation 722. The prediction engine 810 may interact with Deep Learning Module 640 to define indicators 630. The Situational Response Module 168, Neural Pathway Training Module 164, prediction engine 810, and Deep Learning Module 640 may interact in sequence or individually as input to the Prediction Machine Learning Network 130, which may use decisions 732 and situations 410 as reference to identify situational consequences 820.

As shown in FIG. 9, diagram 900 illustrates an exemplary environment in which the neural pathway 920 scenario may be triggered. It is understood that when a neural pathway 920 scenario is triggered to start, event 910 data logged may connect across different situations 410. In one embodiment, event 910 data may be logged by one or more user devices 201, 202. The Decision Support Platform 208 may categorize event 910 into a tag match 922 or situation match 924. The tag match 922 and situation match 924 may be used as input to trigger the neural pathway 920. In some embodiments, the tag match 922 may be created by or indicated by the user 101, 102, while the situation match 924 may be created by the Decision Support Platform 208. In one embodiment, the user 101, 102 may have access to default and suggested tags 430 identified by the Decision Support Platform 208, thus nudging the user to tag 430 their own behavior, and thus cultivating metacognition. "Nudge" specifically refers to a so-called "debiasing" technique to reduce the effect of or mitigate cognitive biases. The situation 410 may be mapped automatically based on several highly reliable indicators 630, such as location data 544 and keylogging. In some embodiments, a user 101, 102 may generate a situation 410 through tags 430 or interactions with modules.

When the event 910 data logged triggers a neural pathway 920 scenario to run, the Decision Support Platform 208 expects that subsequent events 910 may be in accordance with the default path 930 the user selected. If this is not the case, the Decision Support Platform 208 may interfere with the user 101, 102 based on the settings of the default path 930.

The neural pathway 920 may have two types of checkpoints, manual checkpoints 940 and automated checkpoints 950. Manual checkpoints 940 refer to any action that may be done by the user 101, 102 in order to complete the checkpoint, for example, manually opening a software program. Automated checkpoints 950 are any action that the Decision Support Platform 208 has automated, for example, opening a software program when the path is triggered. Given the Decision Support Platform's 208 ability to interact with the user 101, 102, the Decision Support Platform 208 may turn the current user situation 410 into a "trigger" in an "if function," referred to as the neural pathway 920. In one embodiment, the user 101, 102 has an option to add a combination of AND, OR, NOT, etc. Turning a situation 410 into an "if" statement may standardize the outcome. As a result, the user 101, 102 may then practice metacognition while simultaneously utilizing an existing neural pathway 920 or creating a new one. Both the automated 950 and manual 940 checkpoints may be assigned properties, such as chronological order 960 or prompting 970. In one embodiment, if the user 101, 102 does not wish to be prompted 970, the neural pathway scenario 920 may adapt user behavior and only interfere when the prediction algorithm has identified enough indicators 630 to calculate that the user is about to deviate from the default path 930. In some embodiments, checkpoints 940, 950 may include a filter function. In some embodiments, the checkpoints 940, 950 may be set as obligatory to complete. For example, the user may have the option to set certain checkpoints 940, 950 to require only partial completion to proceed to the next checkpoint 940, 950. In some embodiments, the Decision Support Platform 208 may interfere with the user 101, 102 if the user's decision deviates from the default path 930 at a specific checkpoint 940, 950. It is understood that setting an interference behavior may or may not be obligatory.

As shown in FIG. 10, diagram 1000 illustrates an exemplary environment in which the neural pathway 920 interacts with various components. Neural pathway scenario 1200 demonstrates the relationship between entities 1010, situation(s) 410, and the neural pathway 920. In some embodiments, situation 410 may consist of at least a situational setting 540. The situational setting 540 may categorize data into the following categories: activity 542, action 546, response, and location 544. For example, interactions captured through keylogging may represent data such as an activity 542. As previously discussed, the situation 410 may be mapped automatically based on several reliable indicators 630 such as location data 544. In one embodiment, situation 410 may be defined as a time-stamped event 910 corresponding to a location 544 and the conditions that exist during that particular time and place. In one embodiment, the Prediction Machine Learning Network 130 may map situation 410 to indicate a decision 732. In some embodiments, a situation 410 may also have a relationship to situational consequences 820. Situational consequences 820 may comprise a relationship between data or an event sequence within and/or across situations 410 or situation segments 510. The situation 410 may be further comprised of situation segments 510 to represent repeating occurrences of a situation 410. In some embodiments, a situation 410 may represent an entity 1010, where a situation segment 510 is an event 910 representing a specific situation entity 1010.

In one embodiment, the neural pathway 920 may include checkpoint(s) 940, 950. It is understood that checkpoint(s) 940, 950 may be manual or automatic checkpoints. As outlined in FIG. 9, checkpoints 940, 950 may contain one or more interference or decision deviation conditions. It is understood that checkpoints 940, 950 may be set to be completed in a specified order by the user 101, 102.

Entities 1010 may include, but are not limited to, an event 910, decision 732, condition, action 546, situation 410, neural pathway 920, tag 430, value, data type, date, activity 542, device 201, 202, or person. Each entity 1010 may have a relationship in the form of a link to another entity 1010. Entities 1010 may be grouped together to receive a tag 430. In some embodiments, the relationship or link between entities 1010 may be weighted by a machine learning algorithm. The relationship between entities 1010 may be directional, as illustrated by an arrow, from a source entity to a target entity. The strength of the weight between entities 1010 may indicate strength of the relationship between the entities 1010 or the strength of the link from the source to the target entity. In some embodiments, entities 1010 may also have unique identifiers. In some embodiments, an entity 1010 may also serve as a category or subcategory. This may be achieved by linking an entity 1010 to a subcategory and linking a subcategory to a category. In some embodiments, entities 1010 are visually represented as nodes in the graph database 340.

As shown in FIG. 11, diagram 1100 illustrates an exemplary environment in which the Augmented Intuition Module 166 may operate. The Augmented Intuition Module 166 component of the Decision Support Platform 208 may encompass aspects of metacognition, self-actualization, and algorithmic decision-making. The metacognition aspect of the Decision Support Platform 208 may relate to an individual user's 101, 102 memory, spatial reasoning, and problem-solving skills. In some embodiments, the Augmented Intuition Module 166 may encompass a data mining engine 1110. As discussed in FIG. 6, The data mining engine 1110 may communicate with one or more Deep Learning Modules 640 to generate new indicators 630 to ultimately generate decision alignment and decision deviation based on the Prediction Machine Learning Network 130. Further, Deep Learning Modules 640 may communicate with the data mining engine 1110 to identify a user's genome as indicators 630 that are matched with identified data in real-time to develop correlating patterns in the current data, and also assign a weight to the situation or the user's 101, 102 individual response.

In an exemplary embodiment, the interactions between the Deep Learning Module 640 and Realign Module 1120 may train the prediction engine 810. Prediction engine 810 may be trained with deep learning through the process of continuously defining criteria of "good" decisions. Prediction engine 810 may comprise three things, a decision alignment score, a decision deviation score, and an interference threshold. It is understood that prediction engine 810 may communicate with deep learning modules 640, data mining engine 1110, and Prediction Machine Learning Network 130 which may be trained by the Neural Pathway Training Module 164.

The prediction engine 810 may use every data point collected by the Realign module 1120 and Deep Learning Modules 640 as an indicator 630. In the Decision Support Platform 208, indicators 630 allow for relationships between one or more entities 1010 to be weighed. The relationship between two or more entities 1010 may be directional. When a relationship is weighed, the algorithm of the Decision Support Platform 208 may interpret the source as an indicator 630 for the target entity 1010. In one embodiment, a Realign Module 1120 may be integrated into the timeline 370. The Realign Module 1120 may map a user's behavioral and decision-making pattern in the context of a timeline 370. The Realign Module 1120 may prompt the user to review the agenda for an upcoming day of tasks and rank the tasks that require the most purposeful decisions. The user 101, 102 then may lock in decisions, and create an automated neural path, thereby training the Decision Support Platform 208 on how to trigger in the case of a decision deviation.

Figure 12:
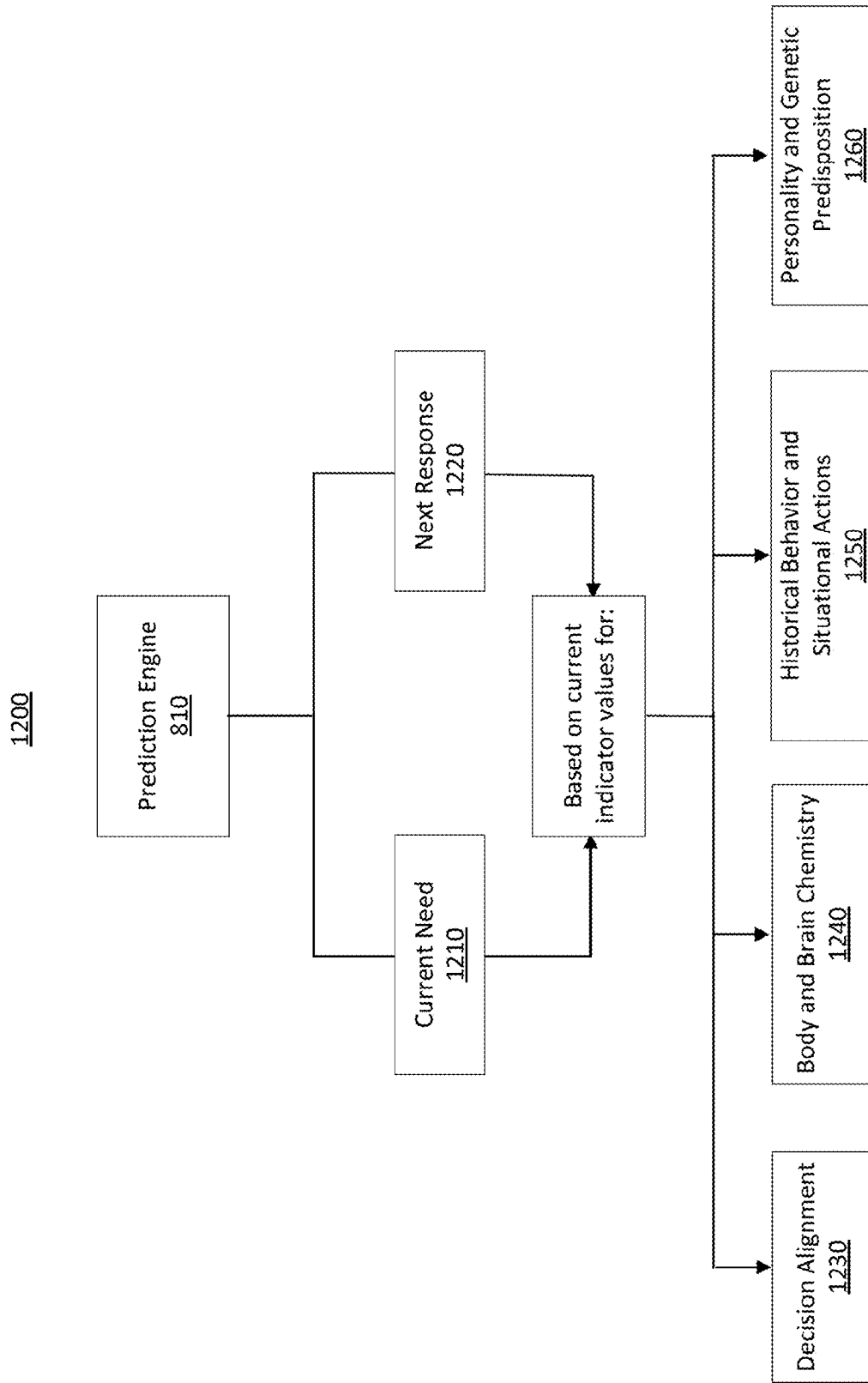
FIG. 12 is a diagram illustrating an exemplary environment in which some embodiments may operate.

As shown in FIG. 12, diagram 1200 illustrates an exemplary environment in which the prediction engine 810 may operate. In some embodiments, the current need 1210 and next response 1220 may be input for indicator 630 values. Indicator(s) 630 may consist of decision alignment 1230, body and brain chemistry 1240, historical behavior and situational actions 1250, and/or personality and genetic predisposition 1260. In some embodiments, the prediction engine 810 may map the user's current need 1210 and the user's next response 1220 at all times. Current need 1210 may be summarized down to the following two requirements: 1) is the user's need for decision support above or below the interference threshold, 2) what specific decision intervention or interventions will most likely address the user's current need. Decision intervention may be defined as any form of assistance the Decision Support Platform 208 provides to the user 101, 102. By focusing on the decision-makers' current need 1210 and next response 1220 in all situations, the prediction engine 810 may be trained for every event 910 logged. Next response 1220 may be utilized to predict the log of subsequent events 910 based on the current situation 410. It is understood that the Decision Support Platform 208 may identify the user's current need 1210 to determine a situational response in the Situational Response Module 168 for the user 101, 102.

Figure 13:
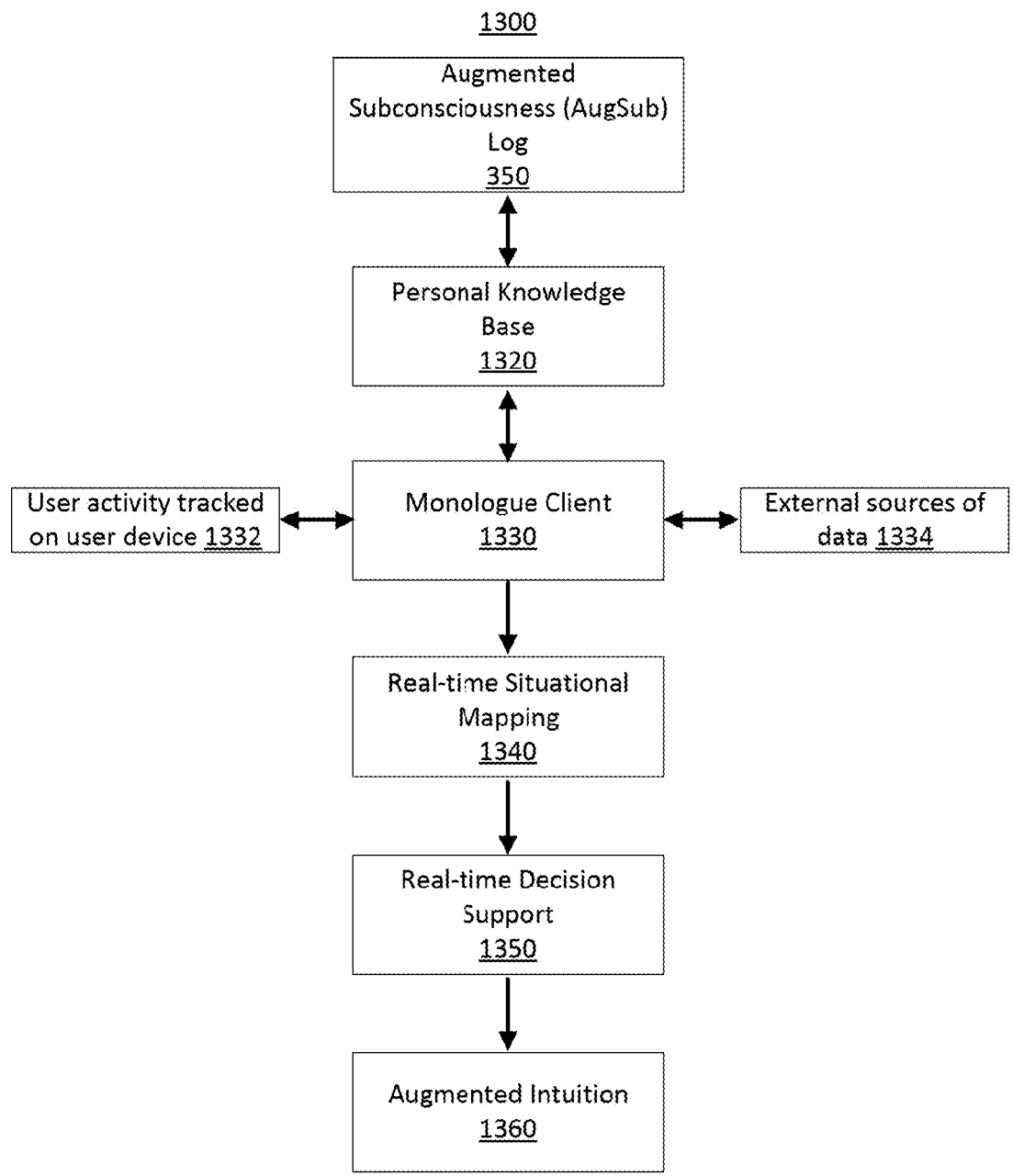
FIG. 13 is a flowchart illustrating an exemplary method that may be performed in which some embodiments may operate.

As shown in FIG. 13, diagram 1300 illustrates an exemplary environment in which augmented intuition 1360 may operate. The Augmented Subconsciousness 350 may correspond to a log, which may interface with the personal knowledge base 1320 of the user 101, 102. In some embodiments, the user's personal knowledge base 1320 may interact with Monologue client 1330. User activity tracked on the user device 1332 and external sources of data 1334 may be input to the Monologue client 1330. The Decision Support Platform 208 may then use the data input from Monologue client 1330 to perform real-time situational mapping 1340. The real-time situational mapping may correspond to real-time decision support 1350. Real-time decision support 1350 may be dynamically tailored to the specific situation 410, decision 732, and individual. Real-time decision support 1350 may ultimately be used as input into the Augmented Intuition 1360. Augmented Intuition 1360 may additionally retrieve data from Log Module 162 and Neural Pathway Training Module 164 to train specific abilities such as metacognition and induce structural neurological changes (neuroplasticity). As discussed above, the metacognition aspect of the Decision Support Platform 208 may relate to an individual user's 101, 102 memory, spatial reasoning, and problem solving skills.

Figure 14:
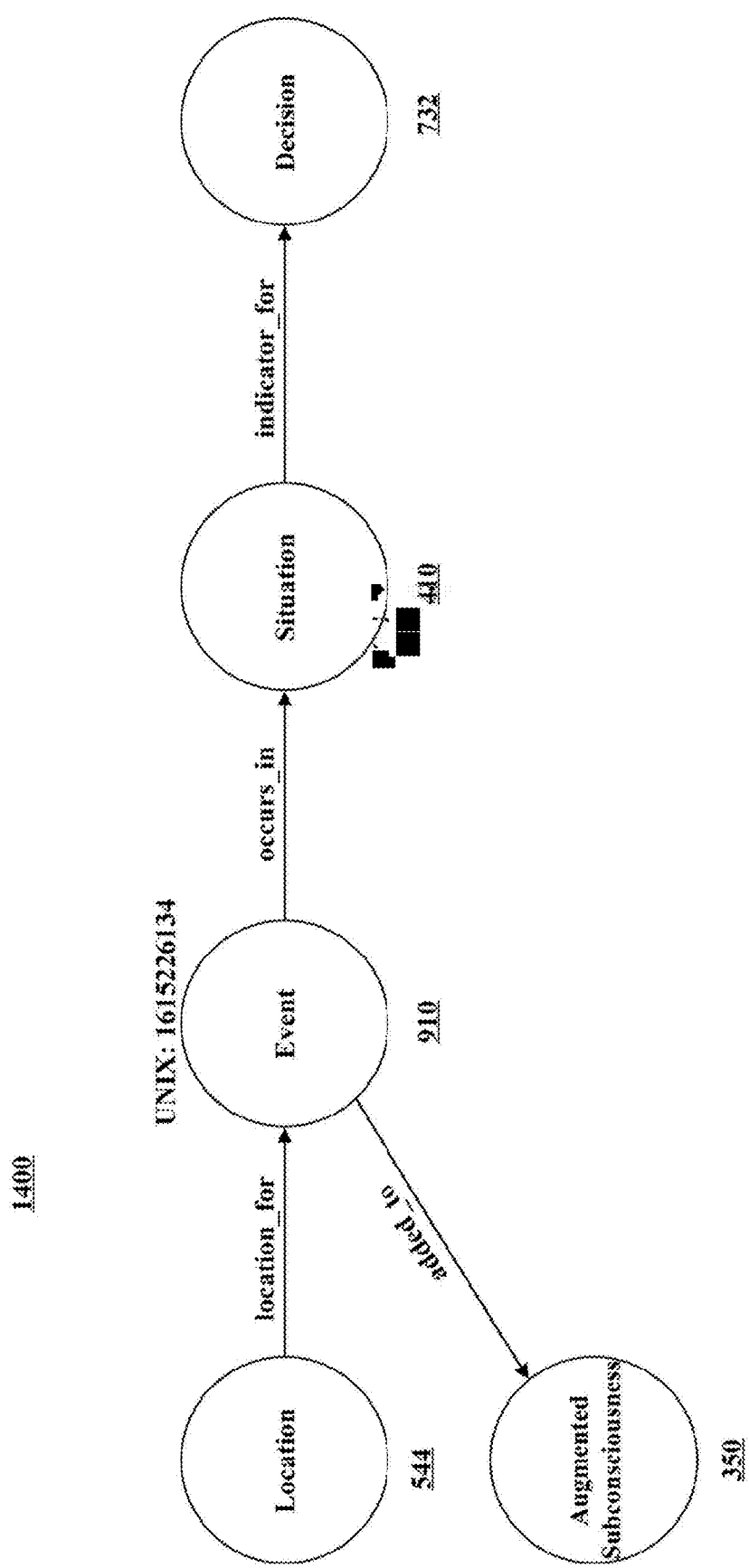
FIG. 14 is a diagram illustrating an exemplary environment in which some embodiments may operate.

As shown in FIG. 14, diagram 1400 illustrates an exemplary environment in which Augmented Subconsciousness ("AugSub") 350 may operate. In some embodiments, the AugSub 350 is a centralized log that captures events 910, coupled with timestamps, into a single database. In some embodiments, the centralized log 370 may additionally comprise widgets. In a preferred embodiment, the database may be a schemaless graph database 340. AugSub 1310 may also run Prediction Machine Learning Networks 130 inside the database 340, meaning the Prediction Machine Learning Network 130 may be trained as new entities 1010 enter into the system. In some embodiments, location 544 data may be input into an event 910. The event 910 then corresponds to a situation 410 and decision 732. In one embodiment, time-stamped event 910 data may be added to the Augmented Subconsciousness 350 to determine situational conditions 520 that exist during a particular time and place.

Figure 15:
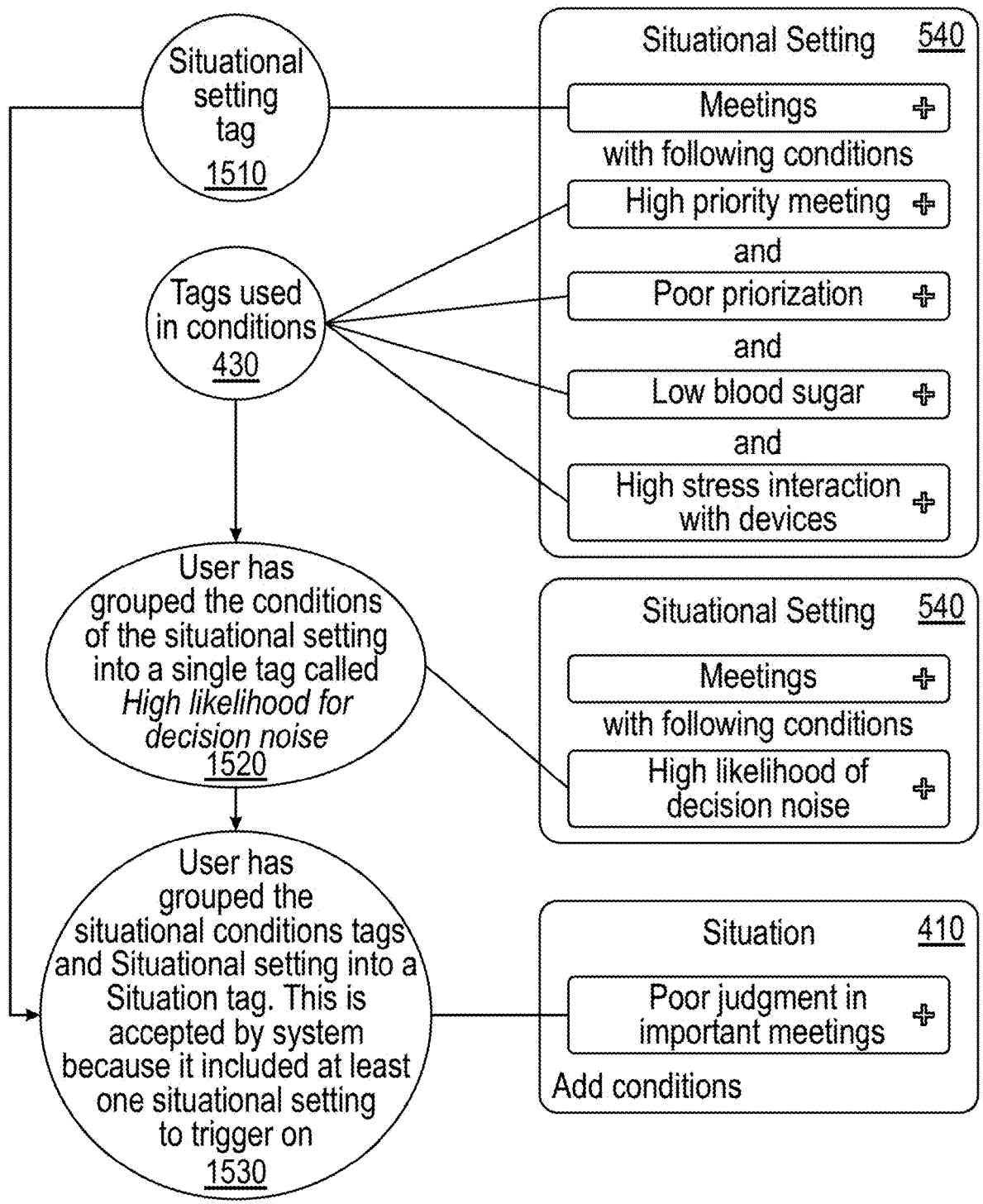
FIG. 15 is a diagram illustrating an exemplary environment in which some embodiments may operate.

As shown in FIG. 15, diagram 1500 illustrates an exemplary environment in which situational settings 540 may operate. In one embodiment, situational setting tags 1510 are grouped into situational conditions 520 and situational settings 540. Situational conditions 520 may be represented as a specific data set, which in conjunction with the situational setting 540, distinguishes one situation 410 from another. Tags 430 used in conditions communicate with the situational setting 540. In the example outlined in FIG. 15, tags 430 used in the conditions within the situational setting 540 are a high priority meeting, poor prioritization, low blood sugar, and high stress interaction with devices.

Next, the user 101, 102 has grouped the situational condition(s) 520 tags 430 into a single tag labeled "high likelihood for decision noise" 1520, which corresponds to the situation 410 within the situational setting 540. Lastly, a situation 410 may be generated. In one example, the situation 410 indicates "poor judgement in important meetings," which the user has grouped situational conditions and situational settings into a situation tag 1530. In this example, the situational tag 1530 is accepted by the system due to including at least one situational setting 540 to trigger on.

As shown in FIG. 16, diagram 1660 illustrates an exemplary environment in which various components of the Decision Support Platform 208 may interact. In some embodiments, situation 410 and the situational setting 540 communicate with the user's actual response 1630. It is understood that decision(s) 732 and event(s) 910 that have occurred and been logged, as represented by 1610, correspond to situation 410 and situational setting 540. The user's 101, 102 actual response 1630 may then communicate to the Augmented Subconsciousness 350 machine learning model, which may be trained on a user's 101, 102 decision making pattern as new entities 1010 are logged as events 910. Expected decision(s) 732 and event(s) 910, as represented as 1620, communicate with the neural pathway 920 and pass through checkpoints 940, 950. The neural pathway 920 and embedded checkpoints 940, 950 may communicate with situational consequences 820 and the user's 101, 102 actual reaction 1640 to further train the Augmented Subconsciousness 350.

As shown in FIG. 17, flowchart 1700 demonstrates an embodiment in which a last, current, and next situation may operate. In one example, Situation X 1710 corresponds to the last situation 1740, and all data collected 1770 during the last situation 1710. The last situation 1710 may be defined as a situation 410 directly previous to the current situation 1750, also referred to as the situation 410 throughout this document. In this example, Situation Y 1720 corresponds to the current situation 1750/410 and all data collected 1770 during the current situation 1750/410. Situation Z 1730 may correspond to the next situation 1760 and all data collected 1770 during the next situation 1760. Next situation 1760 may be defined as a situation 410 that has yet to occur, but will occur directly after the current situation 1750/410. Because situations 410 are continuously mapped, the events 910 logged may be connected to the situation 410. Further, the indicators 630 used during the situation 410 may also connect to the situation 410. When the situation 410 changes, the new situation may be linked to the old situation. This leads to a systematic linking process between events 910, situations 410, and indicators 630. Based in part on this systematic linking process between events 910, situations 410, and indicators 630, the Prediction Machine Learning Network 130 may map baselines for different events 910 based on the sequences of events 910. This mapping or sensing serves as a sort of memory or Augmented Subconsciousness 350 for the user 101, 102. It is understood that there may be additional transitional stages between each situation 410, for example, between Situation X 1710 and Situation Y 1720.

Figure 18:
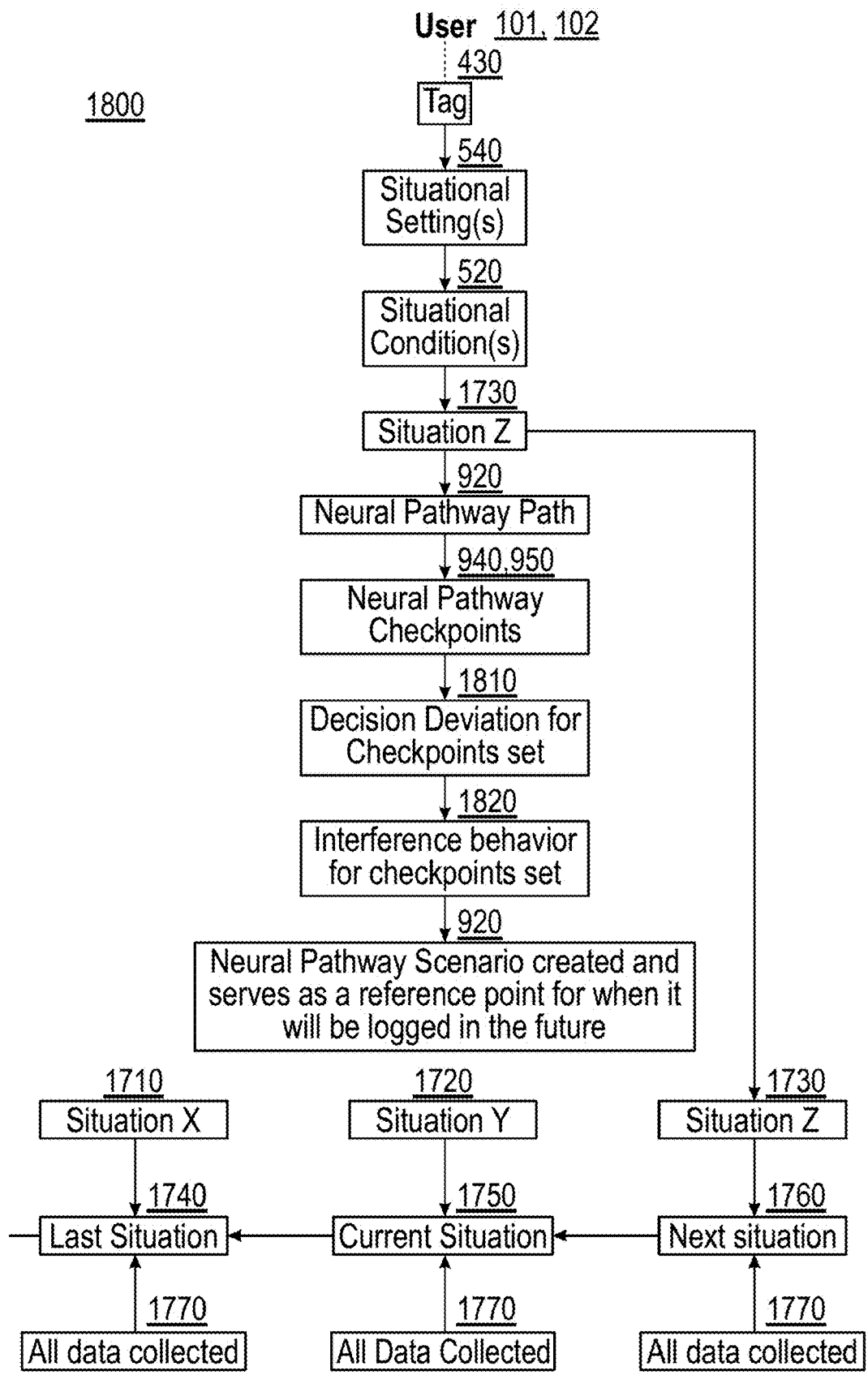
FIG. 18 is a diagram illustrating an exemplary environment in which some embodiments may operate.

As shown in FIG. 18, flowchart 1800 demonstrates an embodiment in which multiple components may interact with a situation. In one embodiment, user 101, 102 may interact with a user device 201, 202. In some embodiments, the user 101, 102 may manually tag 430 an activity 542. The tag 430 then assists the Decision Support Platform 208 in determining one or more situational setting(s) 540. Information about the situational setting(s) 540 may be input for the Decision Support Platform 208 in determining corresponding situational conditions(s) 520. One or more situational condition(s) 520 may be used as input to determine Situation Z 1730, corresponding to the next situation 1760, or a situation 410 that has yet to occur. As outlined in FIG. 17, Situation X 1710 corresponds to the last situation 1710, and all data collected during the last situation 1770. The last situation 1710 may be defined as a situation directly previous to the current situation 1750, also referred to as the situation 410 throughout this document. In this example, Situation Y 1720 corresponds to the current situation 1750/410 and all data collected 1770 during the current situation 1750/410. Situation Z may correspond to the next situation 1760 and all data collected 1770 during the next situation 1760. The next situation 1760 may be defined as a situation 410 that has yet to occur, but will occur directly after the current situation 1750/410. In some embodiments, the Decision Support Platforms 208 prediction of Situation Z 1730 may be input into a neural pathway 920, composed of neural pathway checkpoints 940, 950. Decision deviation 1810 may then be performed for the checkpoints 940, 950, and interference behavior 1820 set. A neural pathway 920 scenario is thus created and serves as a reference point for events 910 to be logged in the future.

Figure 19:
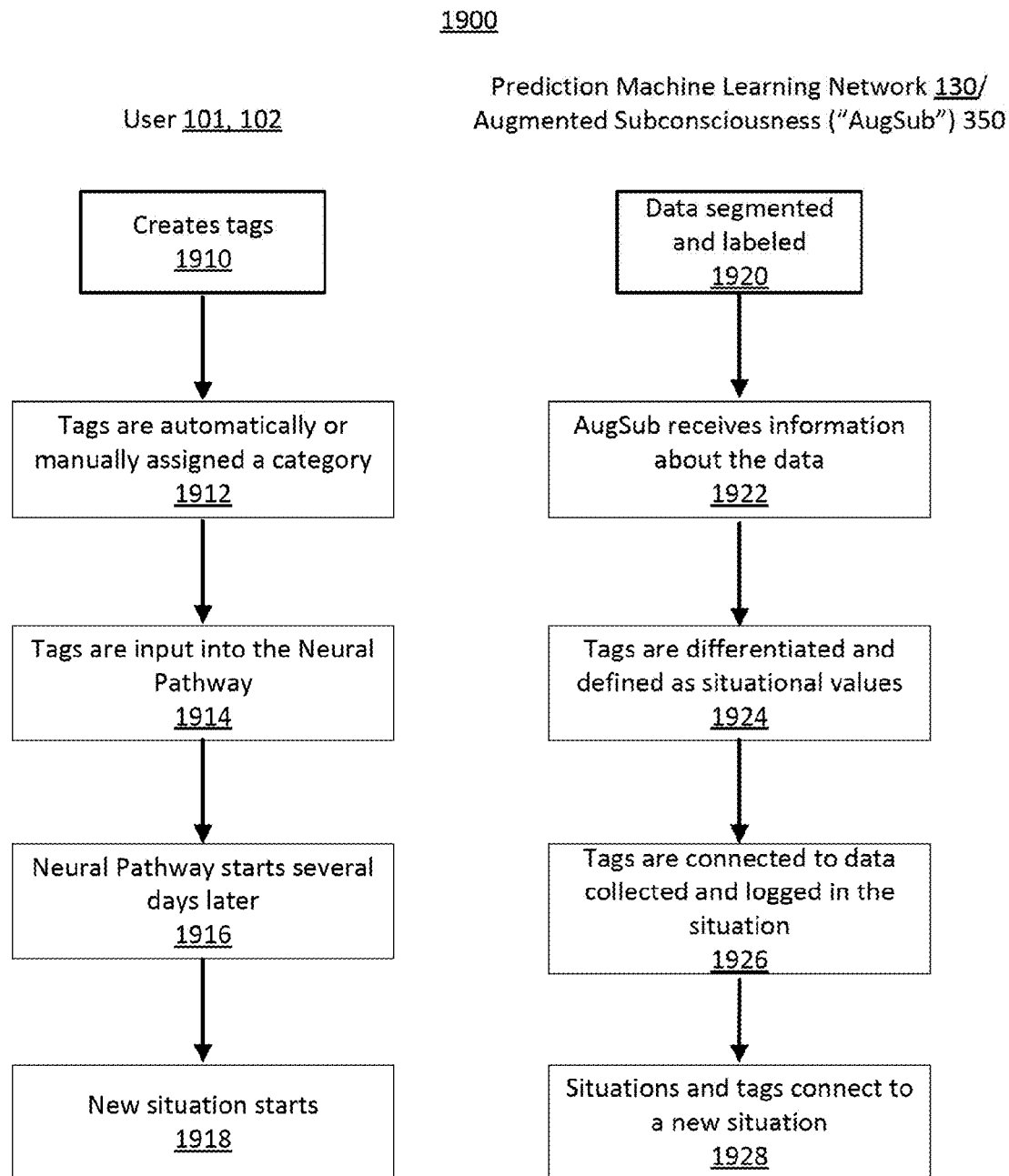
FIG. 19 is a flowchart illustrating an exemplary method that may be performed in which some embodiments may operate.

As shown in FIG. 19, flowchart 1900 demonstrates an embodiment in which the user and Prediction Machine Learning Network 130/Augmented Subconsciousness 350 may segment and label data. In some embodiments, the user 101, 102 may manually input information into the Decision Support Platform 208 and trigger a sequence of steps. For example, in step 1910, the user 101, 102 may manually create tags 430. In step 1912, the tag(s) 430 may be automatically or manually assigned to a category. The user 101, 102 may then use the tag 430 in the Neural Pathway Training Module 164, as demonstrated in step 1914. In step 1916, The Neural Pathway 920 process may start several days later, in which the new situation 410 may start in step 1918. It is understood that in step 1918, the new situation 410 starts after the neural pathway 920 situation.

In some embodiments, the Prediction Machine Learning Network 130 and/or Augmented Subconsciousness ("AugSub") 350 may automatically input and categorize information into the Decision Support Platform 208 to trigger a sequence of steps. In step 1920, the Prediction Machine Learning Network 130 and/or AugSub 350 may segment and label data input into the Decision Support Platform 208. In step 1922, AugSub 350 may receive information about the data. This information may include, but is not limited to, events 910, activity 542, and location 544. In step 1924, the tags 430 may be differentiated and defined as various situational values. Next, in step 1926, the tags 430 may be connected to data collected and logged in the situation 410. Finally, in step 1928, the situations 410 and tags 430 may connect to a new situation 410, or next situation 1760.

Figure 20:
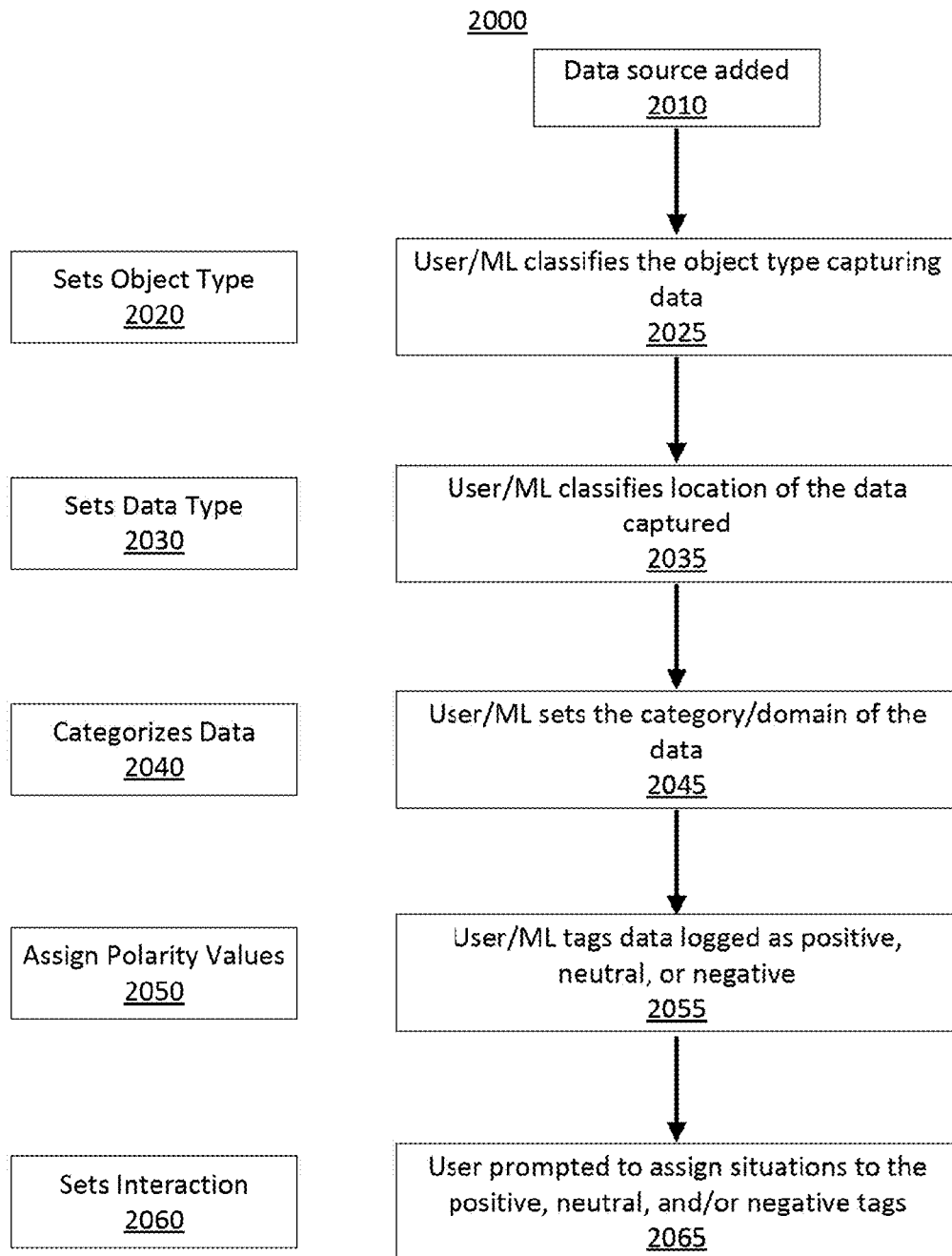
FIG. 20 is a diagram illustrating an exemplary environment in which some embodiments may operate.

As shown in FIG. 20, diagram 2000 demonstrates an exemplary environment in which the Prediction Machine Learning Network 130 may operate. In step 2010, data from various data sources may be added. Next, in step 2020, the user 101, 102 and/or the Prediction Machine Learning Network 130 may set the object 744 type. Corresponding to step 2020 is step 2025, in which the user 101, 102 and/or Prediction Machine Learning Network 130 may classify the object 744 type capturing the data. An example of the object 744 type may be a smartwatch worn on the user's 101, 102 wrist.

In step 2030, the Prediction Machine Learning Network 130 may set the data type. Corresponding to step 2030 is step 2035, in which the user 101, 102 and/or Prediction Machine Learning Network 130 may classify the location 544 of the data captured. For example, the user's 101, 102 pulse may be capturing heart rate, or data from the user's 101, 102 heart. In step 2040, the Prediction Machine Learning Network 130 may categorize data. Corresponding to step 2040 is step 2045, in which the user 101, 102 and/or Prediction Machine Learning Network 130 may set the category and/or domain of the data.

Next, in step 2050, the Prediction Machine Learning Network 130 may assign polarity values to the data. Corresponding to step 2050 is step 2055, in which the user 101, 102 and/or the Prediction Machine Learning Network 130 may tag the data logged with either a positive, neutral, or negative value. A positive polarity value may be defined as data logged and perceived as positive by the user 101, 102. Negative polarity values may be defined as data logged and perceived as negative by the user 101, 102, and neutral polarity values may be defined as data logged and perceived as neither positive nor negative by the user 101, 102. In step 2060, the Prediction Machine Learning Network 130 may set an interaction. Step 2065 corresponds to step 2060, in which the user may be prompted to assign one or more situation(s) 410 to the positive, neutral, or negative tags.

Figure 21:
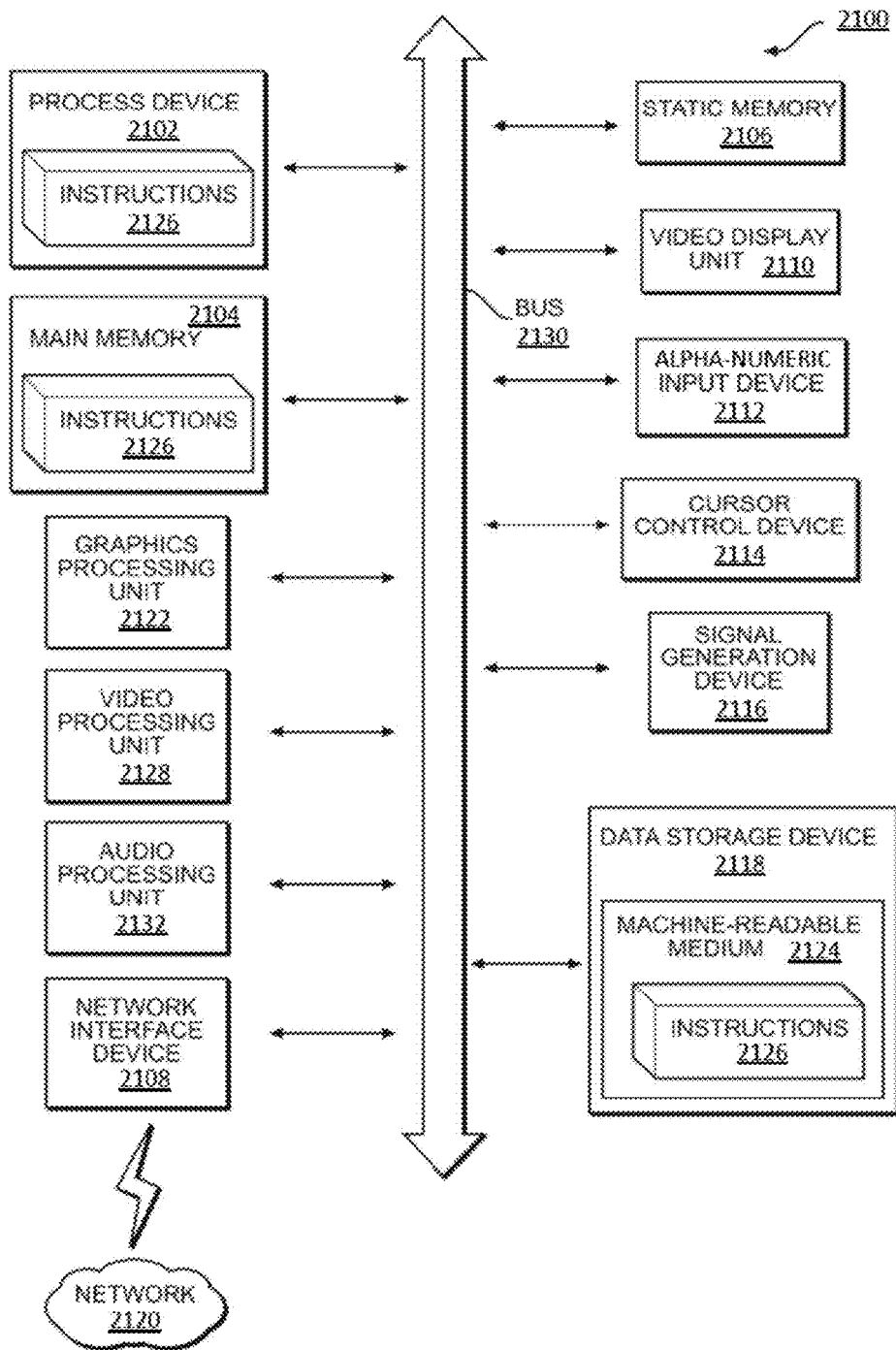
FIG. 21 is a diagram illustrating an exemplary environment in which some embodiments may operate.

FIG. 21 illustrates an example machine of a computer system within which a set of instructions, for causing the machine to perform any one or more of the methodologies discussed herein, may be executed. In alternative implementations, the matching may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, when a single machine is illustrated, the term "machine" shall also be taken to include any collection of machines that individually or jointly execute a set (or multiple sets) of instructions to perform any one or more of the methodologies discussed herein.

The example computer system 2100 includes a processing device 2102, a main memory 2104 (e.g., read-only memory (ROM), flash memory, dynamic random access memory (DRAM) such as synchronous DRAM (SDRAM) or Rambus DRAM (RDRAM), etc.), a static memory 2106 (e.g., flash memory, static random access memory (SRAM), etc.), and a data storage device 2118, which communicates with each other via a bus 2130.

Processing device 2102 represents one or more general-purpose processing devices such as a microprocessor, a central processing unit, or the like. More particularly, the processing device may be complex instruction set computing (CISC) microprocessor, reduced instruction set computing (RSIC) microprocessor, very long instruction word (VLIW) microprocessor, or processor implementing other instruction sets, or processors implementing a combination of instruction sets. Processing device 2102 may also be one or more special-purpose processing devices such as an application-specific integrated circuit (ASIC), a field-programmable gate array (FPGA), a digital signal processor (DSP), network processor, or the like. The processing device 2102 is configured to execute instructions 2126 for performing the operations and steps discussed herein.

The computer system 2100 may further include a network interface device 2108 to communicate over the network 2120. The computer system 2100 also may include a video display unit 2110 (e.g., a liquid crystal display (LCD) or a cathode ray tube (CRT)), an alphanumeric input device 2112 (e.g., a keyboard), a cursor control device 2114 (e.g., a mouse), a graphics processing unit 2122, a signal generation device 2116 (e.g., a speaker), video processing unit 2128, and audio processing unit 2132.

The data storage device 2118 may include a machine-readable storage medium 2124 (also known as a computer-readable medium) on which is stored one or more sets of instructions or software 2126 embodying any one or more of the methodologies or functions described herein. The instructions 2126 may also reside, completely or at least partially, within the main memory 2104 and/or within the processing device 2102 during execution thereof by the computer system 2100, the main memory 2104 and the processing device 2102 also constituting machine-readable storage media.

In one implementation, instructions 2126 include instructions to implement functionality corresponding to the components of a device to perform the disclosure herein. While the machine-readable storage medium 2124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall also be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read-only memory ("ROM"), random access memory ("RAM"), magnetic disk storage media, optical storage media, flash memory devices, etc.

Examples of Decision Determination

Figure 22:
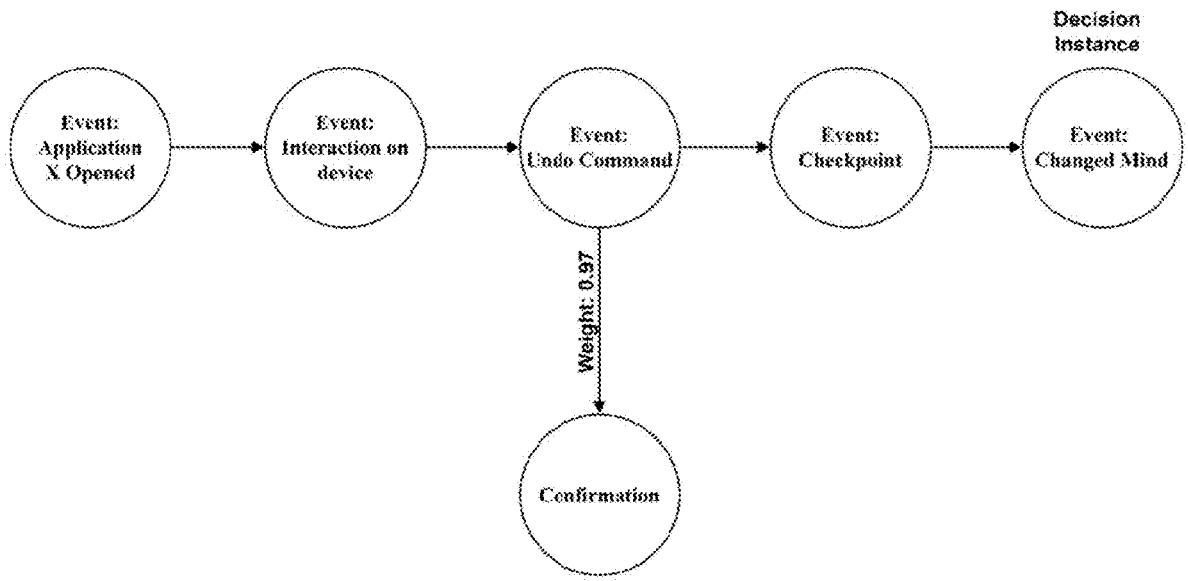
FIG. 22 is a diagram illustrating an example of operation of an exemplary embodiment.

Referring now to FIGS. 22-26, further embodiments of the system are described. These examples further provide context as to the operation of the above-described system. As shown in FIG. 22, entities may have a weighted relationship with regard to another entity. For example, when entities receive a weighted relationship to another entity, the relationship may be used as an indicator (such as a decision indicator or a situation indicator). Weighted relationships may also be negative. For instance, a source entity may be strongly associated with a target entity and thereby receive a relationship with high and positive weight. In other instances, the same source entity may disassociate with another target entity, thereby receiving a negative weight.

Cue, confirmation and consequence may be entity classes. These entities may be used to create indicator relationships and generate events (inheriting their relationships). Events may be linked to these entities as reference points within the system. For example, when a Cue event is logged and the cue event is linked to an entity that has a strong indicator relationship to a confirmation event, the system may have a reference of what, when and how subsequent events may be logged.

In FIG. 22, the various event data is received and evaluated by the system. For example, events received include an event of a particular software application is opened or initialized, an event of an interaction with a device (such as a user inputting commands or text via a keyboard), and an event of an undo command (such as the software application performing an undo command to undo text input into the software application). The system may evaluate the received events and determine that conditions are met (e.g., where checkpoint conditions are linked to different entity classes or via a check-point node). Where the conditions are met then the system may determine that a decision has been made (e.g., a decision node has been reached). In this example, the system has determined that a decision of a user is that the user has changed her mind to do something different.

In this example, the undo command is an event that has a weighted relationship to a confirmation event. For example, a weight of 0.97 of the undo command to a confirmation event. The confirmation event serves as a reference point to understand where in a sequence an event belongs within the sequence of events. The system, for example, may evaluate the undo command and determine a relationship to another pre-existing entity class.

Figure 23:
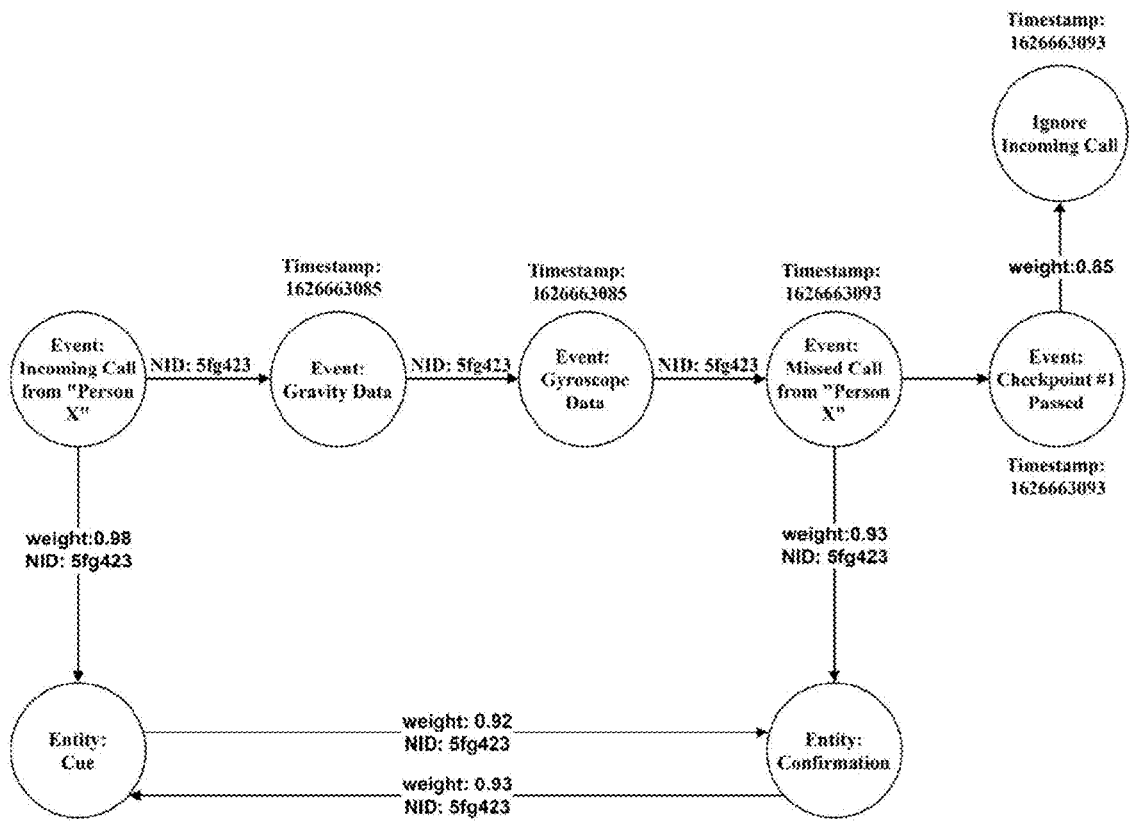
FIG. 23 is a diagram illustrating an example of operation of an exemplary embodiment.

In FIG. 23, a further example of an event sequence leading to a decision is described. This example illustrates there is only 11 seconds between three first events. Also, the gravity event (phone pickup event) in between illustrates the user saw the call but made the decision not to take the call. The source property confirms the same device generated all three events. This leads to a checkpoint being passed. Relationship called "weight" is the weighted relationship, in other words, cue is an indicator for confirmation and confirmation is an indicator for cue.

The various event data is received and evaluated by the system. For example, the event data may include (1) an event of an incoming call from a particular person, the event having a time-stamp and an event source identifier, (2) an event of a device interaction (such as unlocking the device screen, a gyroscope elevation event suggesting the phone was lifted moved by the user), the event having a time-stamp and an event source identifier, (3) an event indicating a missed call from the particular person as recorded by the device (such as a missed call log entry on the device), the event having a time-stamp and an event source identifier.

The system may evaluate the received events and determine that conditions are met (e.g., where checkpoint conditions are linked to different entity classes or via a check-point node). Where the conditions are met then the system may determine that a decision has been made (e.g., a decision node has been reached). In this example, the system has determined that a decision of a user is that the user decided to ignore an incoming call. Here the system is able to assess that a particular known contact was calling and based on the interaction with the device (such as picking up the mobile phone and looking at the caller information), but not answering the call, the system may determine that the user decided to ignore the incoming call. In other words, based on the evaluation of the received event data, the system may determine a decision of not answering the call was made. Also, the system may determine a particular situation in which the decision was made. For example, the system may determine that a situation occurred where the user was in a video conference meeting and was not able to answer the call.

FIG. 23 also illustrates an NID (i.e., network identifier) reference for a source of an event class ("NID34059u") and an NID reference for a pathway for the events ("NID5fg42"). For example, the event for an incoming call from a contact may have a NID source identifier of "NID34059u." Here the value "NID34059u" represents a particular event class relationship and/or internal command or function. The event may inherit the properties of the particular event class to which it is related.

FIG. 23 further illustrates a weighted relationship of the events to a cue and confirmation class. For example, the event for the incoming call from a contact name has a weighted relationship of 0.98 to the cue class. The event for the missed call from a contact name has a weighted relationship of 0.93 to the confirmation class. The cue class and the confirmation class may also have a weighted relationship to one another. For example, the cue class may have a weighted relationship of 0.92 to the confirmation class. The confirmation class may have a weighted relationship of 0.93 to the cue class. The pathway between the cue class and the confirmation class may be the same pathway as between the events, that is having an NID reference of "NID5fg423".

Example of Event Evaluation, Checkpoints and Determining a Decision and/or Situation In one embodiment, the system provides device event evaluation, checkpoint evaluation, situation evaluation and decision evaluation. As will be explained with regard to FIG. 24A and FIG. 24B below, the system may determine a plurality of checkpoints for a decision-making sequence. The same process described in FIG. 24A and FIG. 24B may further be used to identify the occurrence of process for example a situation 410. The system may receive a first series of device event data. Based on the received first series of device event data the system may determine when a first checkpoint has been reached or passed. The system may receive a second series of device event data. Based on the received second series of device event data, the system may determine when a second checkpoint has been reached or passed. The system may continue to evaluate whether n additional checkpoints have been reached or passed. The checkpoints may be a predetermined set of checkpoints that are evaluated for a particular type of decision and/or situation. The system may then determine the occurrence of a situation 410 and/or decision 732 as each of the predetermined checkpoints are each been reached or passed. In some instances, the system may require that a checkpoint to be reached or passed must have a required or specified data value in the device event data. In other instances, the system may determine that a checkpoint has been reached or passed based on a user baseline of an activity, and whether that baseline of activity has occurred again as indicated by the device event data. In other instances, the system may require that a checkpoint is based on an aggregate or average group of user baselines for an activity. In other instances, a checkpoint criteria may change for the user over time. In other words, the criteria to pass or reach the checkpoint may be different when the checkpoint is evaluated at a first time period and when the first checkpoint is evaluated at a second time period. In other instances, a checkpoint may occur for a situation class or a situation instance. In other instances, a checkpoint may occur during a cue, confirmation or consequence of a situation or decision.

Referring now to FIG. 24A and FIG. 24B, the figures illustrate a more complex example of processing by the system of events and determining a decision. The process described below may be applied to determining a situation. The use of the checkpoints are further described in the illustrated example. While not shown, each checkpoint node may have an NID reference to specify the pathway or interrelations between the events and checkpoints. This example can be read from the events left to right.

The first node is an incoming call from Person X, and this first node has a relationship to an incoming call node, an instance of a phone class. A relationship from the Incoming call From Person X node to a a Person X node can also be seen, showing how both Person X may have a plurality of relationships to data in the system from former situations 410 and how the system is able to identify deeper relationships from a single event data node. Such relationships may further impact the way the 130 Prediction Machine Learning interprets other data at any situation in real-time.

The incoming call from Person X node is also related to a Checkpoint #1 node, in this particular case. To help one understand this example and lower its complexity, the number factors that may impact checkpoint conditions have been limited. For instance, a checkpoint condition may be dependent on both the situation 410, certain event sequences or checkpoints (for example checkpoints 940, 950 as described with regard to FIG. 9), NID references, node properties, property values, relationship properties and/or functions in order to pass the checkpoint 940, 950. This is also why the event links directly to the Checkpoint #1 940, 950 node. As the Checkpoint #1 940, 950 node is not dependent on any conditions, a direct relationship between the checkpoint 940, 950 and an event or entity may initiate the checkpoint 940, 950 to start. Checkpoint #1 940, 950 has a function, which is linked to STREAM, Wrist Motion, EVENTS (for example an event 910 as described with regard to FIG. 9). In this case, Checkpoint #1 FUNCTION now has initiated the Prediction Machine Learning Network 130 to change the sensitivity on the event logging of wrist motion events, more specifically it has been changed to stream every single event 910 that is classified as Gyroscope Coordinates and Gravity Coordinates on the user's Smartwatch device. These streamed events are not illustrated in this example FIG. 24A and FIG. 24B. It may also be noted how the Gyroscope Coordinates node and gravity Coordinates node is related to the smart watch node. Thus showing how the System 150 knows what device to execute the checkpoint 940, 950 function on and where to change the tracking/logging sensitivity, and lastly where to start streaming the events 910.

Moving to the next event 910, Mouse Location node illustrates the occurrence of the Mouse Movement node which is related to an entity instance represented as Computer Mouse node. Information may also be stored within the properties of nodes or relationships, for instance the node Mouse Location has a X value of 2771 which refers to the X axis placement of the cursor on the computer screen, and has a Y value of 690 which refers to the Y axis placement of the cursor on the computer screen. Additionally, the Computer Mouse node has properties with DPI:4000 which is short for dots per linear inch. The DPI property is a setting that changes the sensitivity of the mouse settings and is used to measure the amount of pixels the mouse will move on the screen. The X and Y axis movement, which may be identified by seeing the event sequence of the mouse location, may in turn be used to signify the movement of the computer mouse within the environment of a situation. Additional properties are weight and form factor: claw. The form factor represents the physical angle, dimension, utilization and form of the mouse, which will be informational for the position and placement of both the hand on the mouse and the mouse as an object in the environment. The Computer Mouse and Mouse Movement nodes are also related to a Right Hand Placement node, furthermore, this relationship has been assigned a weight, illustrating how both the Computer Mouse and Mouse Movement nodes are operating as Indicators 630 for the Right Hand Placement node. The weights are 0.93 and 0.94, and illustrate an example of a strong indicator as this indicator values are close to 1. In turn both the object (computer mouse) and the event (mouse movement) itself are serving as separate Indicators 630 for right hand placement. These Indicators 630 further illustrate the importance of how the disclosed system is utilizing a network of Indicators 630 in real-time in order to sense the user (e.g., inner and outer data associated with the user) and situation 410 in real-time. For instance, instead of assuming that mouse which has a form factor that represents usage from the left side of a keyboard (e.g., a left handed mouse), there are multiple Indicators 630 that work together in order for the system to determine how the user is interacting with the object under any possible circumstance. In other words, the system utilizes information about a node(s) and it's relationship both in isolation (right hand placement nodes relationship to computer mouse, signifying it will be used by the right hand) and in harmony with other nodes (e.g., right hand placement nodes relationship to computer mouse and mouse movement, where the events from the properties from the computer mouse node (DPI) in which if combined with data from mouse movement with it's relationship (Indicator weight 0.93 to right hand placement, in combination with mouse location events) may be informal for what hand the mouse is used by).

Further FIG. 22 illustrates how the smart watch is worn on the left hand, as it is linked to the left hand placement node, while Computer Mouse is linked to right hand placement, accordingly the system has identified what hands the user is using to interact with the physical objects within the environment of the situation. While the event sequence of the mouse location itself may be a weak indicator for movement and placement of an object in an environment, it may become significantly more accurate while comparing it to supporting indicator values such as the gyroscope Coordinates or gravity Coordinates from the smart watch, to identify, for example, whether the user is sitting or standing, further the height of a table the user is sitting or standing behind. This system would process the smart watch data from the left hand, which has identified the placement of a hand above the ground, and may be used as a variable to complement data from other devices, such as the mouse movement from the computer mouse, which would only not include such data. Accordingly, this illustrates a method for real-time sensing where the data from different devices uses each other's data to sense or map a plurality of dimensions the devices themselves are missing data point on. This may also be an example of how Indicators 630 may be generated.

Moving to the next event A. This event represents a keycap press from a certain Keyboard Device. Furthermore it's properties may have a layout value QWERTY which represents the layout of the keyboard on which the key was pressed. In other words, the properties may identify a location of where a particular key is pressed on the keyboard. This information is received by the Application Engine 192 (which may be installed on the computer which this keyboard in this example would be connected to. For example, the Application Engine 192 may receive the model name of the keyboard from the device settings on the computer or from the event logs internally on the computer. Also, based on the model name of the keyboard, the Data Mining Engine 1110 may communicate with the Prediction Machine Learning Network 130 in order to identify the dimension of the keyboard model. The Prediction Machine Learning Network 103 may further store or update the dimensions of an object instance, or the keyboard device node, which has been the case for this example. As the Application Engine 192 has identified layout of the keyboard device 201, 202, and is serving as a keylogger it is also able to identify that a keypress with the letter A would be informal for a left hand placement event based on the location of the keycap on the keyboard. It may also be noted how the keyboard device node has a relationship to both the right-hand placement and left hand placement nodes. As seen in this example keyboard device has a 0.67 weight to right hand placement and 0.83 indicator weight to left hand placement, hence this illustrates how an object, or more specifically a keyboard device, may interrelate with a plurality of other indicators 630 both for a situation 410 and/or decisions 732 occurring within a situation 410. As shown a keyboard device has two relationships which are informal for the position of a user's hands based on previously logged events in conjunction with information that the Data Mining Engine 1110 has assigned in the entity instance's properties. Additionally, there are multiple other Indicators 630 that may be evaluated by the system to identify what hand a device may be used by a user, such as the user's real-time hand placement, location, and interaction. After using a series of more Indicators 630 in real-time, the Prediction Machine Learning Network 130 then identifies the hand that is sensed to be used most dominantly by the user (e.g., a user's tendency to use the left hand rather than the right hand on devices in the situation 410).

Moving to the next event Haptic Notification, a vibration is initiated on the user's smart watch. This event would normally have a relationship to the Incoming call From Person X as the haptic notification and is a direct result of the Incoming call From Person X node. However, to make this example easier to understand for human interpretation this relationship has not been included in FIG. 24A and FIG. 24B. The example illustrates how the haptic notification node is connected to haptic perception, which further is connected to a perception node. This illustrates how the system is sensing the user and different Situational Perspectives 620 in a situation 410. The Haptic Notification events also relate to the attention threshold which identifies where the attention of the user is located at any given time. For example, this may be determined by the system by setting certain conditions for what sequence of events and/or values the events or their relationships need to have in order to cross a threshold value where the system 150 has enough information from different Indicators 630 to pass an Attention threshold crossed node. As shown in this example, the threshold value could be a value in a property of the node (e.g., Value:X or Value:Y). The threshold values may be part of the condition to Checkpoint #2 illustrated by the Checkpoint #2 CONDITION node. This checkpoint condition node may be connected to a Checkpoint #2 node. Another condition found in the Checkpoint #2 CONDITION node may be Wrist Motion Threshold Crossed. This condition may be related to the Gyroscope Coordinates and Gravity Coordinates events and may be related to the Checkpoint #1 FUNCTION as this node started streaming wrist motion events.

It should be noted, however, the relationships between these nodes are not illustrated in this example. It may also be noted that the Gyroscope Coordinates node and the Gravity Coordinates events may also be related to a gyroscope rotation threshold crossed and gravity elevation threshold crossed node, which further belongs to an Situation Specific Thresholds node or in other words entity which is informal for different thresholds conditions that are specific to situations or anything the user is experiencing in real-time at any given moment. This may include stored values, sequences, checkpoints, or variables. In this case it is shown how the system is using both real-time sensing or mapping of the Right Hand Placement and left hand placement in real-time.

Second as a specific event, in this case Incoming call From Person X is logged and is a known cue, the system event also initiates a function which sets situation specific threshold on specific devices based on events occurring in real-time. In other words, if the user's right hand placement and left hand placement would be in a different position which could not have been sensed to devices that was being used at the given moment, in this case a keyboard device and a mouse device then the right hand placement and left hand placement may have initiated a different threshold than what was the case in this example, which in turn demonstrates a fully modular way to tailor threshold to any situation in real-time, as the thresholds may be subject to variables that is dynamically updated based on a plurality of interconnected checkpoints, nodes and weighted relationships.

In this example, a limited number of such variables, or nodes are shown to illustrate this process. As the Gyroscope Coordinates and Gravity Coordinates is leading to the wrist motion threshold crossed and the haptic notification is leading to the Attention Threshold Crossed node, it is shown how the Checkpoint #2 condition Node is passed. Further, the example shows how the Situation Specific Thresholds are interconnected with a plurality of nodes that are constantly being updated based on the events logged. Also the example shows a proprioception, perception and Attention node is connected to Situation Specific Thresholds. Moreover, the example shows the Proprioception, perception and Attention nodes are updated by the events, checkpoints, weighted relationship and the sequence they occur in. The system may continuously serve the Situation Specific Thresholds node with modular variables, and these variables may be updated and relevant in any situation, moreover, with relationships.

The example also illustrates how the passing of the checkpoint itself may be an indicator to other nodes. This is shown in the Checkpoint #2 Passed node where the weighted relationship with the value 0.89 serves as an indicator of the entity instance viewed smart watch screen. The Checkpoint #2 Passed node then also serves as an indicator for occurrence of an event where the user is viewed on the screen of their smart watch. The Smart Watch Notification, could be an event the application engine 140 would log as a result of detecting a new notification on the smart watch, whereas the Viewed Smart Watch Screen node which is connected to a device check segment, could represent internal event sequences that has been sensed or mapped by the system 150. In other words, event Checkpoint #2 Passed and Sound Muted, shows how device events (e.g., Sound Muted), may be utilized as a reference point or confirmation. The event timestamp of the device event sound muted in combination with indicators 630 mapped by the system, both to improve the indicator and checkpoints, but also to combine a plurality of different algorithms on different objects or devices simultaneously to identify relationships and sequences within events logged in the system 150. For instance, decisions and/or situations may be identified as one or more interrelated events in their preliminary, confirmatory and consequential sequence as shown on FIG. 16.

It may be noted that the viewed smart watch screen node would also have a relationship to an interaction, smartwatch, attention, Proprioception node (which is both a limited selection and been intentionally left to simplify the example illustration).

The Checkpoint #2 node is connected to the Checkpoint #2 Passed node that may include a timestamp with the ticker (which illustrates the frequency time is registered) value 1626663096. Moreover, the Checkpoint #2 Passed node timestamp value illustrates that the Sound Muted event with its timestamp value of 1626663098 was logged two ticks or for example two seconds, after the Checkpoint #2 Passed node. In turn, the example shows how the Checkpoint #2 node was able to identify where the user would place their attention before a Sound Muted event thereby confirming the user's attention(s) was on the same smart watch device.

The system provides a method for training a machine learning model/network to continuously detect latency between the occurrence of real-time events outside of the system 150. When the system logs the events as the timeframe between the specific events such as real-time wrist motion events and the viewed smart watch screen event can be analyzed and/or compared to every single former occurrence of the same sequence of events (viewed smart watch screen) within or outside the any situation segment logged. There also is an Ignoring Call Baseline Used event, with relationship to Ignoring Segments a node, where the weight signifies that the baseline for ignoring call may be an strong indicator in this situation. As the Ignoring Call Baseline Used was not a part of any of the checkpoints in this example, this then illustrates one of many ways they system may filter relevant information in real-time that may be generated, tested and utilized by the system at all times. For instance, Ignore segments has a relationship to an decision class called ignoring, thereby helping the system to identify types of decisions, based on event sequences and a plurality of event information within one more event segments. In this example, the system may have decided start sensing of a ignoring baseline at the same time as Incoming call From Person X event was logged as this the situation 410 the event occurred in (High Priority Meeting) may be an known indicator for ignoring incoming calls. Accordingly, the example illustrates that the system will not only rely on a single series of sequence but may also utilize supporting Indicators 630 at the same time that may be generated and initiated by the system based on indicator relationships in real-time. This may be used to support the real-time autonomous situational sensing and decision support, as well as utilize information from a situation 410 to improve internal logic. In this case, the system initiated a process that was unrelated to the checkpoint sequence. Which illustrates how the system continuously will find interconnections between real-time events and internal commands autonomously.

The Prediction Machine Learning Network 130 may then update the score of the weight from the Checkpoint #2 to the Viewed smart watch screen node, which further may increase the weight. Thereby making Checkpoint #2 a stronger indicator for viewed smart watch screen and illustrating one of many ways the prediction engine 810 may be trained for every event 910. Continuing to the next event Missed call From Person X with the property value Timestamp: 1626663101, which has a relationship to a missed call node, which has a relationship to a Phone, further which is connected to a Device node.

Additionally, the Missed call From Person X event node also have a relationship to a Confirmation node which in this case would show that the system has identified that the Missed call From Person X event is the confirmation of the cue, which in this example was the Incoming call From Person X event. The interrelationship between a cue and confirmation node may be identified based on their relationship properties which may include specific NID as shown on FIG. 23. This process has also been illustrated in FIG. 22, as a pathway between the cue event Missed call From Person X and the confirmation event Incoming call From Person X is identified with a pathway NID with the value Ojupio945. It may be noted that NID would be assigned to a plurality of other nodes but has been intentionally left out. It has also been mentioned how this example is illustrating a specific NID pathway, further the inclusion of the NID value Ojupio945 is meant to illustrate how the system may operate with subroutines within a single pathway or checkpoint sequence in real-time, further, it also show how multiple NIDs may be assigned to a single relationship between two entities, or within the properties of an single entity. In turn, any information such as events, internal changes or other data that has occurred from the timestamp of the cue event (Incoming call From Person X, with its timestamp 1626663093) to the confirmation event (Missed call From Person X, with its timestamp 1626663101) now serves as a segment that can be used to identify deeper and more dense interrelated relationships as well as related changes that occurring between or within an identified and unidentified event sequence.

Further, the Missed call From Person X event node also has a relationship to the Checkpoint #3 CONDITION node, which is the condition for a Checkpoint #3 node. It is also show how the Checkpoint #3 CONDITION node, has a relationship to a COMPLETED, LESS THAN, 60, SECONDS node. This COMPLETED node is also related to the completion of Checkpoint #1 and Checkpoint #2, showing how checkpoints may be dependent on each other and may be used in a modular way, where checkpoints are interconnected on each other instead of making a single and duplicate sequential relationship between the checkpoint nodes. The checkpoints may be given modular dependencies through their relationships, where the system uses a NID to identify the validity of the conditions, functions or subroutines for each checkpoint at any given time. The NID may also be stored modularly inside properties that may be located both in the relationships or nodes. As the checkpoint condition for the Checkpoint #3 node is passed due to the timestamp on the passing of the last Checkpoint #1 node, a Checkpoint #3 Passed event with the timestamp value 1626663104 is logged. Further, the Checkpoint #3 node also initiates another event, Ignore Incoming Call From Person X, which for the sake of this example has been explicitly marked as a decision occurrence to illustrate the method of how the system is able to identify the occurrence of decisions in real-time through the sequence of events logged.

To summarize, the sequence of events logged is used in the following way, first Checkpoint #1 is passed as the event Incoming call From Person X is logged, then the same checkpoint changes the sensing mechanism of the situation 410 to detect specific parameters relevant to potential decisions the user may make in real-time. In this case the system starts streaming wrist motion events, the dense information from the user's wrist in real-time captured by the smart watch then passes a Checkpoint #2 which is a strong and reliable indicator for the user to have Viewed Smart Watch Screen. In other words, at this point in time the system already has a reliable indicator for the user both currently receiving a call and that the user has seen it. Following this Sound Muted event is logged, which then illustrates that the user has interacted with their smartwatch. After this a Missed call From Person X is logged. In turn, the system now has enough information to identify that a decision has been made, as the sequence of the events 1) Incoming call From Person X, 2) Viewed Smart Watch Screen 3) Missed call From Person X illustrates that the user got an incoming call (1), saw the call (2), yet did not pick up the phone (3). There are a plurality of Indicators 630 that would be used to determine the call was ignored and not missed. Specific relationships that are not shown in this example are the node relationship to the situation segment, in this example that is High Priority Meeting.

The Checkpoint #3 node also have a relationship to a Checkpoint #3 passed node and a decision occurrence of Ignore Incoming Call From Person X, where the decision occurrence both has timestamp within its properties and a NID source property, NID34059u. The Ignore Incoming Call From Person X event also is related to Incoming Call From Person X, Decision instance, thus showing how a how to segment occurrences or new episodes of a decisions and how a machine learning model may be trained to identify and differentiate repeating event occurrences of a single instance of a decision. The Ignore Incoming Call From Person X node also has relationships to the decision subclass Ignore Incoming Call, and to 1626663093, 1626663096 and 1626663101, which illustrates how timestamps may be stored in node, where it would correspond to the passing of Checkpoint #1, Checkpoint #2, Checkpoint #3. The Ignore Incoming Call From Person X event also relates to Checkpoint #4A and Checkpoint #4B, through their relationship to their corresponding checkpoint conditions. In this case one can see how the Checkpoint #4A CONDITION is related to the decision Ignore Incoming Call From Person X to be logged while an instance of the situation 410 Meeting without high priority is an active situation segment. On the other hand, Checkpoint #4B CONDITION is related an High priority meeting node, which further illustrates the complexity of providing decision support and how integral decision identification is with situational awareness and sensing (initiated in Checkpoint #1) as ignoring a call may be seen as a poor prioritization in certain situations, while in others it may be a good prioritization. This is also why the decision subclass Ignore Incoming Call included a specific instance that related to Person X (Ignore Incoming Call From Person X), as the person who calls, also is data that may be relevant for what the decision that was made within the situation, as well as whether it relates to decision deviation or decision alignment. It has been mentioned how the situation 410 for this example was High priority meeting, thus explains why #Checkpoint #4A was passed. The example also illustrates how Checkpoint #4A may be an indicator (weight: 0.84) of good prioritization, which further is related to a consequence with the same NID as formerly mentioned Cue (Incoming call From Person X) and confirmation (Missed call From Person X), events.

As for determining whether decision support is needed, it would be too late at Checkpoint #4A or #4B because if the Checkpoint #3 is passed, which indicates the decision has been made or confirmed. Hence, why Checkpoint #1 changes the sensing dynamic because the decision is identified in Checkpoint #2. Whereas as Checkpoint #3 trains the machine learning network 140 to identify the latency between the decision point (Checkpoint #2) and the confirmation event (Missed call From Person X), as well as the consequences of the event sequence or decision. In other words, the timestamps from Checkpoint #2 (1626663096) and Missed call From Person X (1626663101) may be used to create and improve segments of event sequences to identify decision Indicators 630, an example is the sound muted event which is timestamped (1626663097) to have occurred a second after Checkpoint #2 passed, but 4 seconds before the Missed call From Person X event was logged. Furthermore, the system autonomously identified a baseline (Ignoring Call Baseline Used) may be a reliable indicator (0.94 weight) for the decision Ignore Incoming Call From Person X, which is confirmed 5 seconds later. Simply put, the checkpoint themselves are also Indicators 630, but for a plurality of interconnected event sequences or pathways, where situation 410 also may be a pathway which further can be used to identify other event sequences. Thus, the system may not always wait for a user to pass through every checkpoint but rather use the subsequent checkpoint in combination with Indicators 630 to determine whether to interfere at any stage of the checkpoint sequence.

The example further shows how ignoring am incoming call decision class also is related to an IGNORE node with deeper connections to a TRANSITIVE node that relates to a VERB node from a NLP node. The NLP node may be a network of NLP or Natural language processing information initiated in the Prediction Machine Learning Network 130. The example then illustrates how words represented by nodes, relationships or properties may be used to identify decisions. Decisions may for instance be identified through event data, both directly (e.g., within the value or properties of a single record, node, or entity) or indirectly (e.g., through the value or properties of the relationship between one or more records, nodes, or entities). As shown, the Decision class Ignoring Incoming Call is related to the Transitive verb IGNORE, the Adjective INCOMING and the verb CALL. While the Ignore Incoming Call From Person X, which is related to Ignore Incoming Call has relationships to FROM and Person X, in turn it is illustrated how words may be used modularly to identify relationship between events and decisions, for instance it is shown how the decision occurrence Ignore Incoming Call From Person X has a relationship to the Person X node, by being linked to the Ignore Incoming Call From Person X decision instance.

Person X also has a relationship to COUNTABLE, which has a relationship to a NOUN, in turn this illustrates how events may be analyzed in a plurality of ways, which may include text. The ability to interpret text also illustrates how the real-time autonomous sensing of situations 410 may continuously improve, as a result of Indicators 630 continuously being generated and updated, in turn this also show how a single prediction machine learning network 140 may include a plurality of machine learning models, that are trained to be specialized one or more disciplines or domains, such as a separate machine learning model that specializes on the text within event data and their relationships, and another network specializing on the sequence events occur. Nodes IGNORE, INCOMING, CALL may be related to a plurality of decision, situation, or other indicator nodes, thereby continuously training a Machine learning model, such as a neural network, to identify how words found in events may relate to each other. As the application engine is keylogging users' interaction on devices, the ability to understand words in the same way humans do may provide the decision support an ability This further makes it possible to. It may be noted that words may have relationships that are directed to illustrate their occurrence, further, words may have relationships to the letters that spell the word, as shown with the keycap press event A from.

There may be one or more Machine learning models that exclusively analyze at words with events. In one embodiment, Machine learning models (e.g., a neural network) may be trained to read events and its data as a word or a sentence. In one embodiment, a Machine learning models (e.g., a neural network may analyze data within events such as timestamps, energy, relationships, NID, weight and other Indicators 630), which further may be used to identify information. For instance, a neural network may use words with relationships to transitive verbs and analyze how identified and/or unidentified checkpoints, segments or event sequences may have second-order (entities relationship through each other through another entity), third-order or nth (infinite) order relationship to other nodes, this may be achieved by using timestamps, indicator relationships, pathways such as checkpoints, NID paths or other identified sequential connections to the events.

Simulation of 3D Environment

The following provides an example of the system generating and determining various simulations. In particular, the system may provide for 3d simulation sensing/simulation and method for quantifying events such as thoughts and decisions of a user.

As mentioned previously, indicator values may be both positive, negative, and neutral, an example of how this may be calculated is to assign +1 (or simply, 1, where 1 is used purely for this example and should not be seen as a limitation for higher numbers) as positive value, 0 as neutral and −1 as negative. When a relationship is assigned a weight of "0.94", the directional relationship may illustrate a strong relationship between the source and the target node. Whereas if the weight of the relationship is close to "0.15" this may illustrate a weak relationship as the score is close to neutral or 0. On the other hand, if the score is "−0.94", the relationship may be informal for a strong bipolar relationship between the source and target node (for instance the real-time distance between two body parts, a body part and an object within an environment, or values used to identify, ratios, wavelengths threshold, and/or baselines). In the case a low negative weight would be assigned (e.g., "−0.08"), then this would indicate a weak, or close to neutral bipolar relationship between the source and target node. This can be an event received from a physical device, like smart-ring (object) or data (e.g., record, node, entity bit or qubit) generated by a machine located in the cloud (object). Indicators may be used for evolutionary, simulation, calculation, algorithmic or prediction purposes. For instance, indicators may be used by the Prediction Machine Learning Network 130 to create its own logic, follow a pre-assigned one or both.

The Prediction Machine Learning Network 130 may also use indicators to generate or update one or more quantifiable measures, for instance, what is referred to as the "weight" in the FIG. 24A and FIG. 24B, could instead be "energy", thus also illustrating how weighted relationship or indicators, go beyond just identifying the strength of a relationship between two nodes. Due to the different types of data collected in real-time (users brain waves, food intake or objects in a situation), new dimensions of relations between data may be identified by comparing the temporal dimension, such as the time or sequence events are logged, with one or more indicator values or relationship from the same timeframe.

Continuing the example of how energy may be used as an indicator, an energy value may then be assigned to the occurrence of an event. This may also be assigned to data relevant to a situation, such as objects within an environment of a situation 410. In other words, an "energy" entity class may be created, where several potential energy (energy stored in an object) or kinetic energy (energy objects in motion) may be an instance. By way of example an event may be logged and connected to the active situation segment. Furthermore, the event may receive a weighted relationship to a device, this may be an instance of an object class. The object class or device instance may also have a weighted relationship to an instance of an energy class, signifying the amount of energy the object.

As the event connects to the situation 410, the situation may contain a plurality of relationship which would signify energy related to objects, the user or persons within the situation 410. The system may also assign energy to events to dimensions which have been seen as unquantifiable such as a situation, decisions, criteria used for making a decision, affection, emotions, thoughts, ideas, reflections, dreams, brain activity during sleep or meditations. As events from these or other relevant entity classes are logged they may be assigned or inherent directional, unidirectional or bidirectional relationship with other entities. For instance, if the user made the decision "Ignore Incoming Call From Person X" as shown in FIG. 24A and FIG. 24B, while the user also was using a User Device 201, 202 that detected brain waves, the brain wave data would be a part of the same checkpoint sequence between "Checkpoint #1", "Checkpoint #2" and "Checkpoint #3". In turn, the system would now have a timestamped event sequence or segment, that lead to an identified process or decision, which also is known to have occurred inside a situation 410. Additionally, the timestamps on the event sequence serve as segments for both the process and all other events logged at the same timeframe, as well as the specific indicator values that were used/present during the passing of the identified checkpoints.

The foregoing discussion further illustrates how event sequences, checkpoints, and values of other indicators also were captured during the same segments. In turn the sequence of brain wave events, which may be an event stream from neurotechnoligcal devices such as non-invasive headsets or invasive implants, also has a specific relationship to the decision through at least the situation, the time the events were logged and the decision checkpoints occurred. The brain wave data may, for instance, be magnetic resonance imaging (MRI), Functional magnetic resonance imaging (fMRI), electroencephalography ("EEG") data, magnetoencephalography ("MEG") Near-infrared spectroscopy or "NIRS" data, Functional near-infrared spectroscopy (fNIRS), time-domain near-infrared spectroscopy (TD-fNIRS), high-density diffuse optical tomography (HD-DOT). As real-time neurofeedback from neurotechnolgical devices often is delivering brain data with frequency based units, such as hertz ("Hz"), the photon energy equation ("E=hv") may be used to identify energy, hence one hertz=h joules. Additionally, calorie data may be converted into the same standardized energy unit, such as. "joule", thus "1 calorie" would then correspond to "4.1858 Joule". (Joule (J)/4.814=calories (cal)). The system 150 may calculate calories burned or consumed relating to an event (for example, if the person is standing, walking, moving head, arms, hands, feet, or legs). Thereby illustrating how indicators may be used to generate Situational Perspectives 620 for real-time and autonomous sensing in any situation 410, moreover how Situational Perspectives 620 may be from dimensions that are not comprehensible for human cognition. It may also be noted that the process described could be applied to data that goes beyond the real-time sensing. By way of example if a former situation segment has occurred, that had the relationship to an event was connected to an object(s) but the object(s) had yet to be connected to an energy instance, the information from the energy instance may now be used in the former situation segment 410. Also, the foregoing discussion shows how former segments and their nth order connections/relationships to train a machine learning model, thus providing a method for filtering or event improving accuracy of past situation segments.

Environmental Object Determination

In some embodiments, the system may use a machine learning model and/or a prediction engine to determine real-world environmental objects. For example, a trained machine learning model may be provided that determines an environmental object that has been interacted with by a user. The system receives event data related to the user. For example, but for limitation, the event data may be generated from: a wearable device by a user, the data events including at least accelerometer and gyroscope data; interaction by the user with a with a mobile device; interaction by the user with touch screen of an electronic device; interaction by the user with an input device, such as a keyboard, mouse; and/or a combination thereof. Based on the received event data, the system may determine that the user interacted with a particular type of environmental object. The environmental object may be a real-world physical object interacted with by the user. The machine learning model may determine a probability or likelihood that the environmental object is a particular type of an environmental object (for example, a type of environmental object may be a container holding a liquid).

Figure 25:
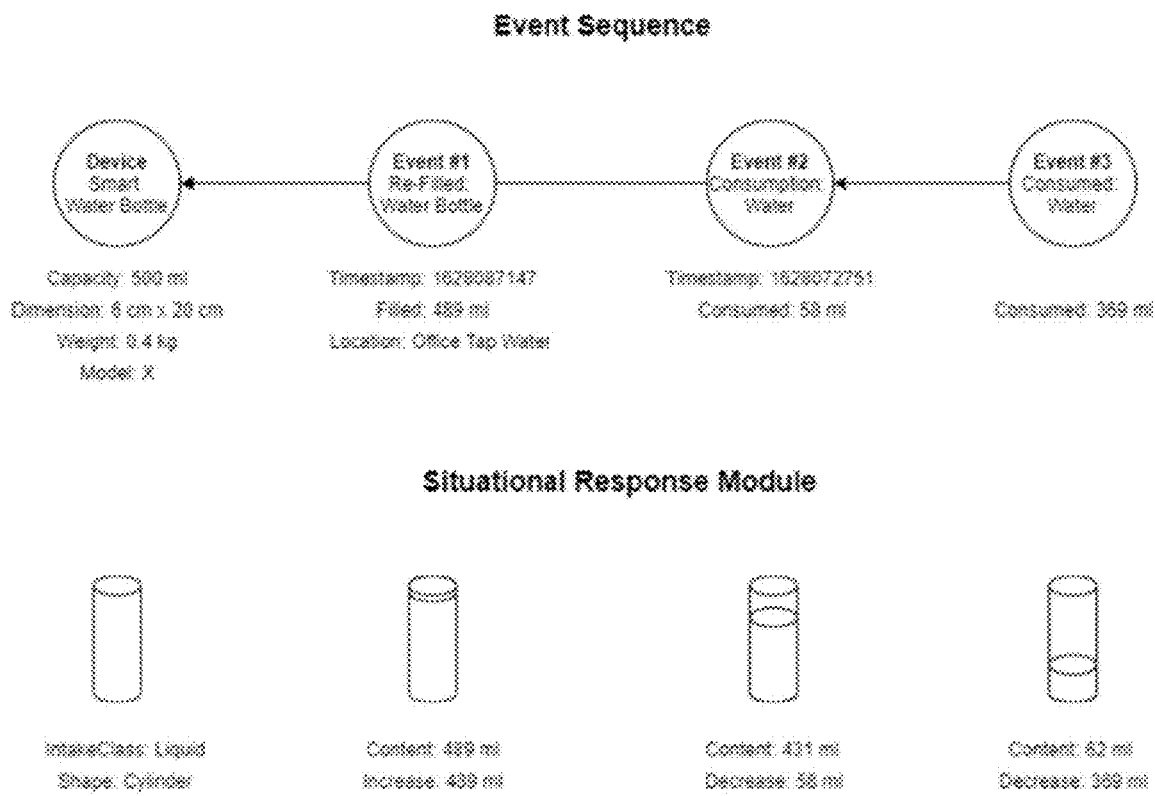
FIG. 25 is a diagram illustrating an example of operation of an exemplary embodiment.

Referring now to FIG. 25, the figure illustrates an event sequence showing water consumption by a user. In the example, the nodes may not be represented with all their properties or relationships. Further properties have been used as the main illustration for data related to a node, and it may therefore be noted that the method disclosed may be used in the same with relationship and nodes. In other words, a timestamp that is exclusively illustrated as a property in FIG. 25 may also be a record(s), entity or relationships.

FIG. 25 illustrates four nodes. A smart water bottle device or an object, with the properties, capacity 500 ml, dimension 6 cm×20 cm, weight 0.4 kg and a model name X. These properties may be an input to the system (e.g., received via a user interface from a user), or determined by the system via a prediction machine learning network 130, where the information such as model X or other manufacturer information of a device (e.g., device information that is possible to access upon the system adding, connecting or communicating with the device). Some properties such as the mentioned model name X may then be used by the prediction machine learning network 130 to identify more detailed information such as the device's dimensional properties for the smart water bottle device.

Moving to Event #1, a re-filled water bottle, with a filled event 489 ml showing the amount of water filled in the water bottle identified by the smart bottle device, as well as a location illustrating where the event took place. How the location was pre-identified will be described below.

Moving to event #2 Consumed: Water, which represents the consumption of 58 ml of water with a Timestamp 1628072751 and another event #3 with a consumption of 369 ml of water, as well as a timestamp of 1628087151, further showing differentiation of 14400 between the event #2 and event #3 timestamp. The prediction machine learning network 130 may comprise one or more machine learning models that may operate with several methods that represent time in a sequential manner. This may further comprise a standalone or experimental sequential and/or temporal identifiable measure to supplement, replace or complement traditional timestamping methods. For simplicity this example illustrates a timestamp shown in seconds. The 14400 timestamp difference between event #2 and event #3 may be seen as 4 hours.

In addition to using indicators to sense a multidimensional environment objects and/or their physical properties in real-time, indicators may also be used to improve the accuracy of the environmental modeling such as the 3D modeling which may be sensed by the situational response module 168. For instance, when a user 101, 102, may be in a travel situation 410 and a threshold may crossed and/or checkpoint passed during an sequence of events logged in the system 140, where the baseline and/or checkpoint may be based in part on a velocity baseline (speed in a direction). Accordingly, the system 140 may also identify that the user's 101, 102 n-th order situational consequences 820, involve a location 544 in another country, in turn the prediction machine learning network 130, which may comprise data mining engines 1100 may then mine data such as geo location, coordinates, shape, dimensions and/or measurements (e.g., size, weight, height, length, depth, width, etc.).

Figure 25A:
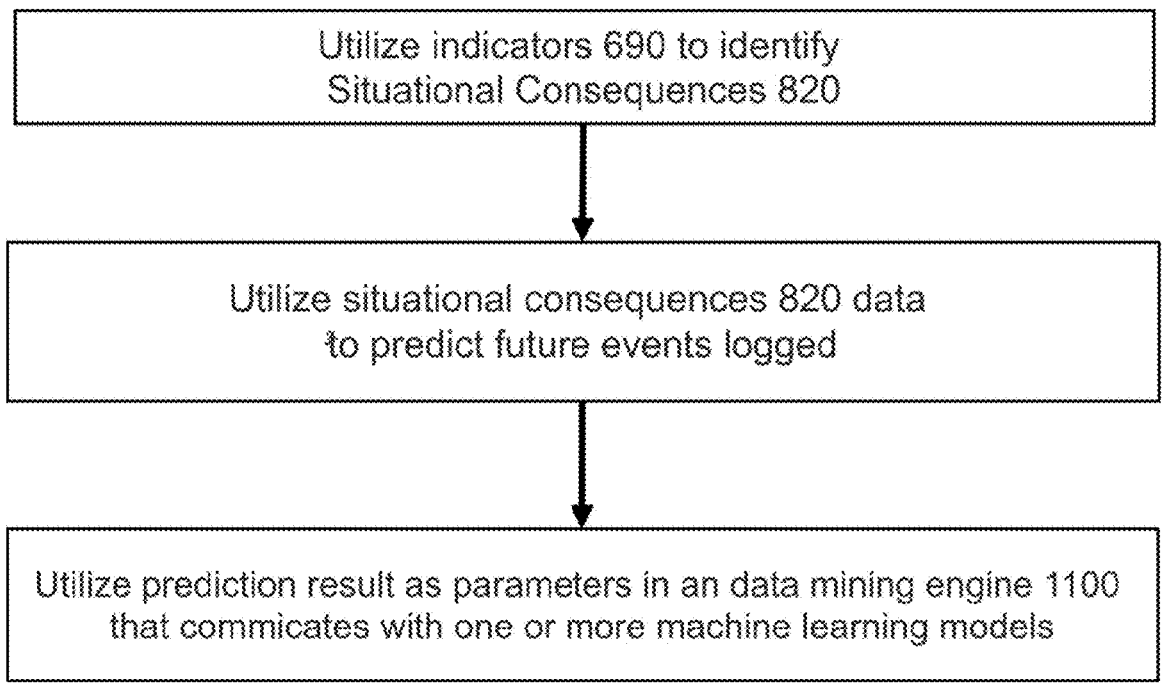
FIG. 25A is a diagram illustrating an example of operation of an exemplary embodiment.

The data mining engines 1100 is then able to provide an output to the prediction machine learning network 130 which would include needed environmental and situational dimensional values before the user 101, 102 would be the situation 410. For example, a user is in the formerly mentioned travel situation 410, and in this case, the data mining engines 1100 would mine location and dimension-based data. Autonomous and real-time sensing of 3D environmental objects may be achieved through mining reliable indicators for specific location parameters such as landmarks (e.g., a statue or sightseeing objects, in other words highly reliable, accurate and detailed data). The mined data would then be stored with an NID in the prediction machine learning network 130, furthermore the 3D dimensions would only be generated when the user's situation 410 included a situational setting 540 where the location 544 has a certain proximity to the data mined indicator, e.g., the location 544. Additionally, as the mentioned landmarks data comprise such reliable data, it may further be used as an reliable indicator in a situation in the same Moreover, the data may also be accessible by all users 101, 102, thus what is disclosed is a method for autonomous situational awareness based on modular, universal, self-assembling and self-improving process as outlined in figure FIG. 25A.

The Situational Response Module determines and/or identifies that the smart water bottle device is an environmental object. The system may make this determination in the situational response module in real-time. The illustration corresponds to the event above and shows how the system 140 may sense the objects within a real-world three-dimensional ("3D") environment. Moreover, the system may determine the environmental objects content, for example, based on information from the environmental object responsible for the event, as well as the values obtained from the event itself. In this example, a device or object existing in the real-world, 3D environment may be sensed by the initial information obtained by identifying additional properties of a device or object such as its dimension and weight. Further, the content of the environmental object, in this case water, or liquid, may be calculated based on the event values impact on the identified physical properties of the environmental object, such as volume, energy, weight and dimension.

Figure 26:
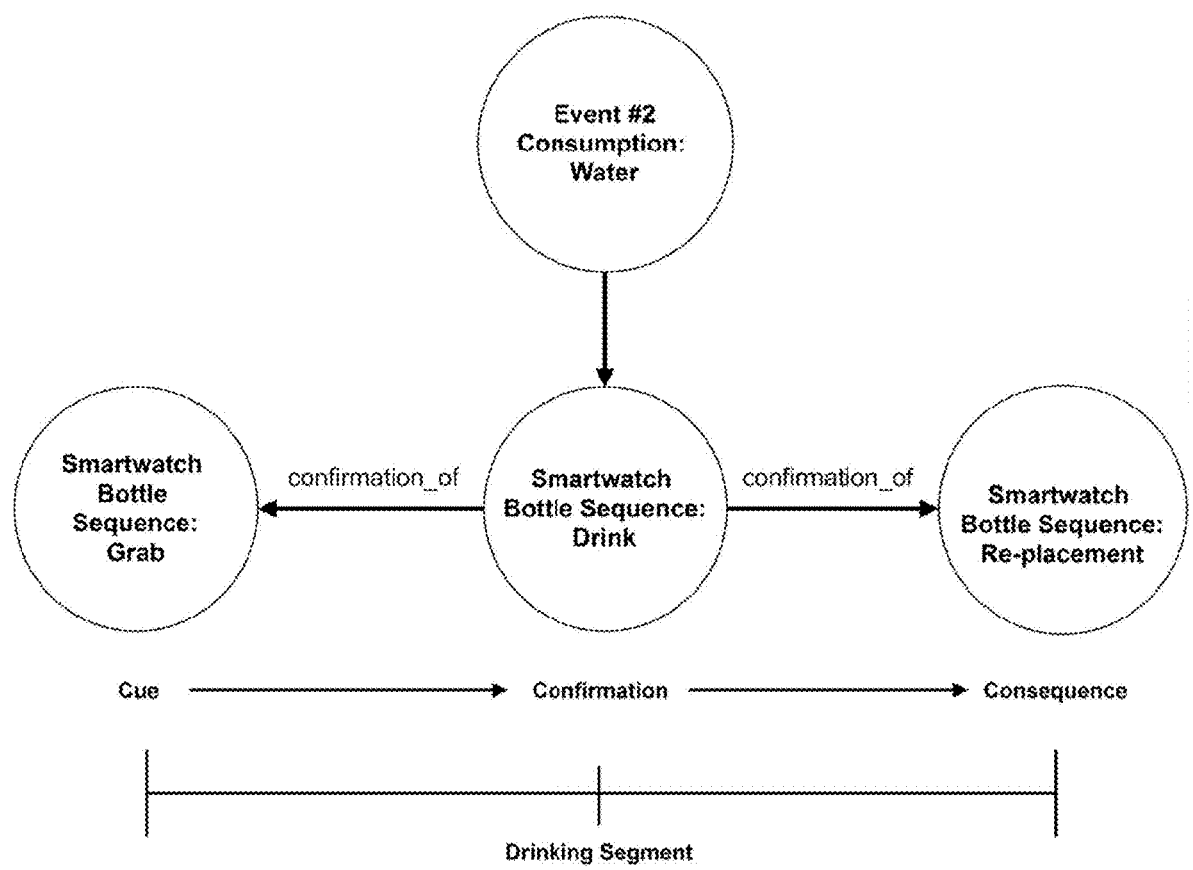
FIG. 26 is a diagram illustrating an example of operation of an exemplary embodiment.

Referring now to FIG. 26, the figure illustrates an event sequence showing a drinking segment. FIG. 26 shows how Event #2 may have a relationship to a confirmation node which may serve as, or in part of, sequence of smartwatch events identifying when a water bottle is in use. By way of example, the confirmation node may further be identified by the system as a smartwatch event, NID path, an entity class, subclass or occurrence of an entity instance, a checkpoint, or a part of a checkpoint condition or function. For instance, as an Event #2 relates to the confirmation node or a case where Event #2 included a NID or other identifier to related to the confirmation node, an algorithm may be initiated, where Event #2's timestamp 1628072751, may be used to segment a temporal and/or sequential region of events which would indicate one of the user's hand locations and gestures at the time Event #2 was logged.

Due to the dynamic latency issue between data collection from different devices, as well as the actual occurrence of an event outside of the system, an additional parameter the algorithm may have used in this case is to look for smartwatch events such as altimeter, gyroscope, accelerometer, gravity, proximity and more, to identify one or more events, event sequences or event segments within the temporal and/or sequential region where the smartwatch data also include its highest elevation, as well as what baselines was broken during this period. The system may determine, test and/or evaluate various baselines (such as baselines for duration, rotation and location of the arm hand identified). The duration may be identified from timestamps and sequences of the events where logged in. By combining the temporal and spatial data from gyroscope, accelerometer, gravity, proximity events, the user's or a person's hand, arm, elbow, shoulder, and corresponding joint, rotation, location and motion data within the environment of a situation may be identified and further serve as indicators for autonomous situational awareness and sensing in real-time. Additionally, one or more latency calculations may be conducted by one or more machine learning models that may communicate with both the prediction machine learning network 130, situational response module 168 and augmented intuition module 166 to identify the time between the occurrence of an event or event sequence is logged within the system 150 and when the event or event sequence occurred outside of the system 150.

Figure 27:
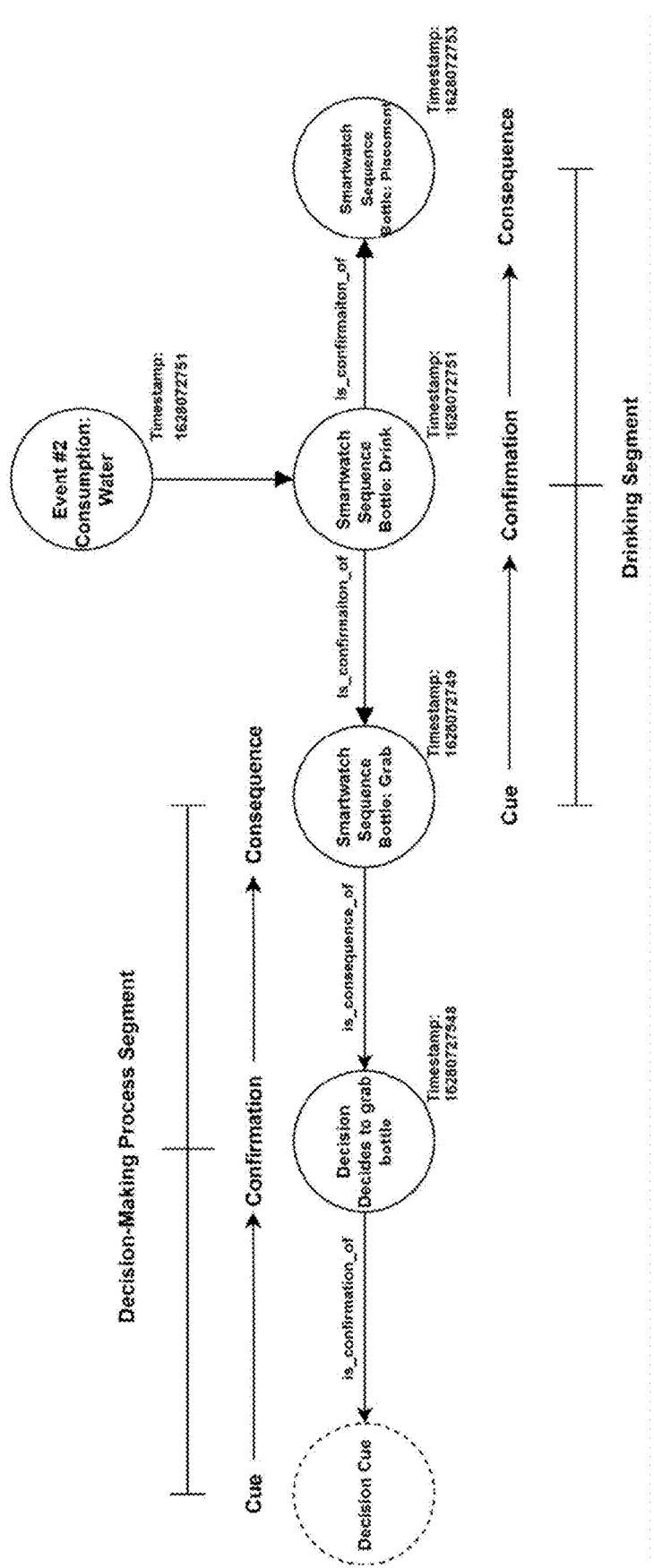
FIG. 27 is a diagram illustrating an example of operation of an exemplary embodiment.

Referring now to FIG. 27, the figure illustrates how indicators for identifying events related to the user drinking from a smart bottle may be identified by using the temporal and/or sequential event segment from the confirmation node. The confirmation node is represented by two directed or, targeted relationships, which further illustrate how the confirmation node's indicators, events or sequences may serve as a temporal and/or sequential reference point to a smartwatch segment cue and consequence node. Further, the cue smartwatch sequence representing bottle: grab, which would identify when a user is grabbing the water bottle, is assumed to have happened before the confirmation, whereas the consequence smartwatch sequence, which would indicate where the user is leaving the water bottle device, or object within the environment would signify where the bottle is left within the environment the user is present such as the environment within a situation. However, although the bottle smartwatch sequence for bottle grab would serve as cue for the user drinking from the smartwatch bottle, the smart watch sequence for bottle: grab would at the same time serve as a consequence indicator for the actual decision, as the decision to drink takes place before the physical action of grabbing the bottle, and the second-order consequence, which would be the actual consumption from the bottle.

Thus, the system may then use relevant baselines as well as indicators from other known decisions both in and not in the particular situation currently occurring in order to identify the decision. For instance, the system may use the baseline time between known decision to drink water and the physical action of grabbing the bottle (identified with the smartwatch sequence) as well as the drinking in order to identify the event or event sequence that would show how the decision was made in the current situation or active situation segment. In turn further decision indicators may then be identified.

In summary, the forgoing discussion related to FIG. 26 and FIG. 27 discloses a method for calibration of indicators for situation or decision indicators. The process illustrates how of autonomous and continuous improvement of indicator accuracy can be achieved, for instance by using highly reliable indicators as reference to train, change, remove or tweak indicators present during the same segment which has been detected to be inaccurate during the same segment (e.g., since an indicator is signifying a different path, trajectory, situation, decision, strength, polarity, time etc., than several reliable indicators).

Figure 28:
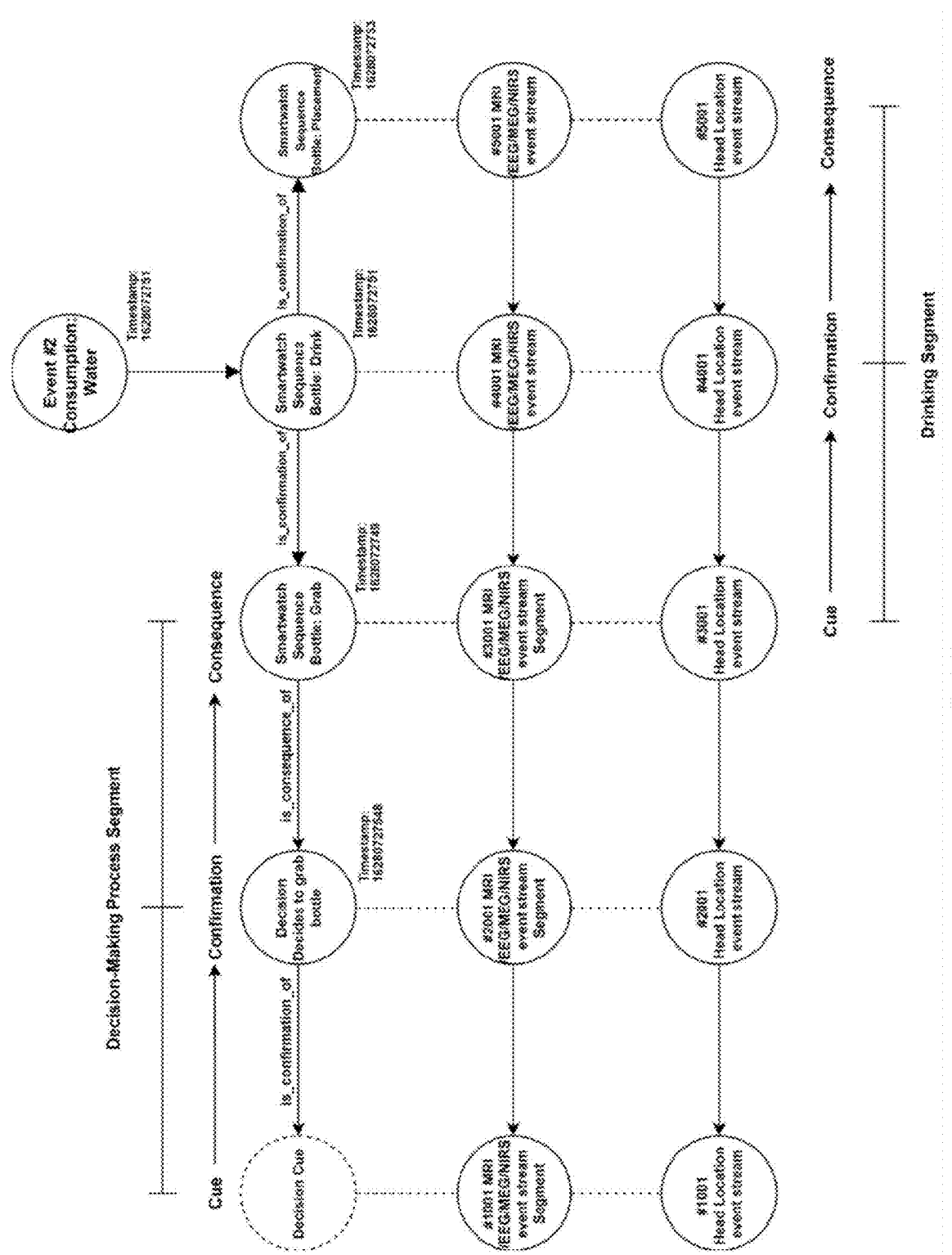
FIG. 28 is a diagram illustrating an example of operation of an exemplary embodiment.

Referring now to FIG. 28, the figure illustrates the water consumption example, but with additional event data of neurotechnological event data of a user. The figure is a simplified illustration of how neurotechnological data such as MRI, MEG, EEG, NIRS that would be logged through connecting the neurotechnological user devices to the system 150. Further, the figure illustrates how nanotechnological devices such as invasive and none-invasive headsets as well as implants also would have data related to motion events of the location it would be worn (e.g., head location, provided by motion data such as accelerometer, gyroscope, gravity, haptic motion etc.) Head location events could then be synced by their timestamps within segments such as a decision segment illustrated in FIG. 28.

Figure 29:
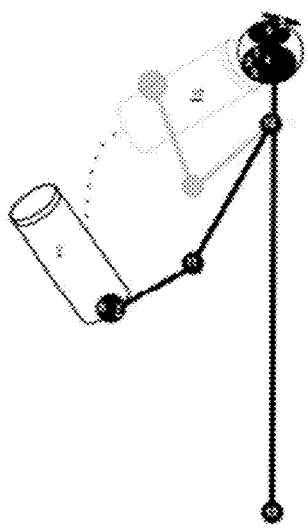
FIG. 29 is a diagram illustrating an example of operation of an exemplary embodiment.

Referring now to FIG. 29, the figure illustrates how indicators may be used to sense a multidimensional environment in real-time. As shown in FIG. 25, the physical properties and dimensions of environmental objects (such as a real-world three-dimensional object) may be sensed in situations 410. Further, the same method may be used to combine indicators into real-time 3D environmental models, for instance, 1 (eyes), 2 (nose), 3 (mouth), 4 (ears), is detected based on the attention 752 of the user identified (e.g., through brain data and interaction on devices). Brain location and data (5) e.g., MRI, MEG, EEG, NIRS may be detected by an environmental object or device, such as neurotechnological devices (6).

Further a smartwatch device (7), may be used to locate the user's hand (8) within a situational environment based on data from hand, arm and finger motion, movement, trajectory (e.g., from gyroscopic events, accelerometer etc.). An object or smart water bottle device (9) and its physical properties and motion may be identified as explained from FIG. 25. The user's elbow (11) and shoulder (12) may be identified by a ratio calculation based on data which may relate to the distance between neurotechnological headset location 6, and arm location 8, from smartwatch 7. The elbow (11) to shoulder (12) ratio may also be synced with data such as baselines and thresholds for attention 752. Other environmental objects such as the smart water bottle (9) may also be used to identify the users body parts such as 1 (eyes), 2 (nose), 3 (mouth), 4 (ears), for instance the height of the user's hand during a drinking event may be used as this may signify the environmental placement for the smart water bottle 9. The user's hand placement while holding the water bottle (9) may then be used to identify the user's 1 (eyes), 2 (nose), 3 (mouth), 4 (ears), the water being consumed through the user's mouth. Further, is gravity data from the smartwatch identifying the ground level or feet (13) of the user, this may be synced with motion sensors on from headsets (6) and other wearables (13). Additionally, the dimensions sensed in the foregoing discussion may also further be synced with walking speed, sitting or standing events from devices such as phones, headsets, smartwatch etc. which further would be used to identify a plurality of other points not illustrated in FIG. 29.

Figure 30:
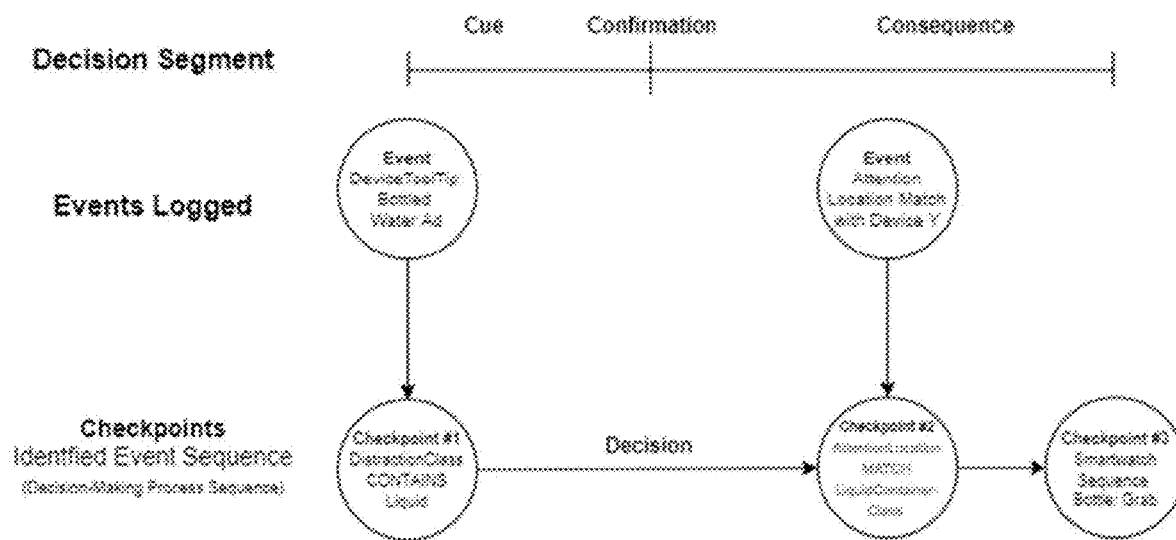
FIG. 30 is a diagram illustrating an example of operation of an exemplary embodiment.

Referring now to FIG. 30, the figure illustrates how checkpoints may identify the construct of a decision through first segmenting the Decision-Making Process sequence, then the decision segment. As shown Checkpoint #1 which is a cue and initiated when any DistractionClass. Checkpoint #1 refers to an entire class or subclass, not a specific instance within the class. In this case, the checkpoint may be validated by the system by any instance of a specified or unspecified class. For instance Checkpoint #1 may be passed if an event is logged which has or is identified to belong to an advertisement class entity, which further contains liquid such as an advertisement about bottled water. Checkpoint #2 confirms the cue (Checkpoint #1) when the location of the attention of the user (attentionLocation) matches any instance of a liquidContainerClass (e.g., a smart water bottle device or environmental object). Checkpoint #3 may serve as an additional reference for a consequence of both the cue and/or confirmation reference. In this case, if a user grabs their smart water bottle, and the event sequence of grabbing the bottle is registered by the system 150, the event sequence of grabbing the bottle, may serve as a consequence for the prior reference points, such as a cue or a confirmation. Lastly between the cue and consequence, a decision segment may be identified.

Figure 31:
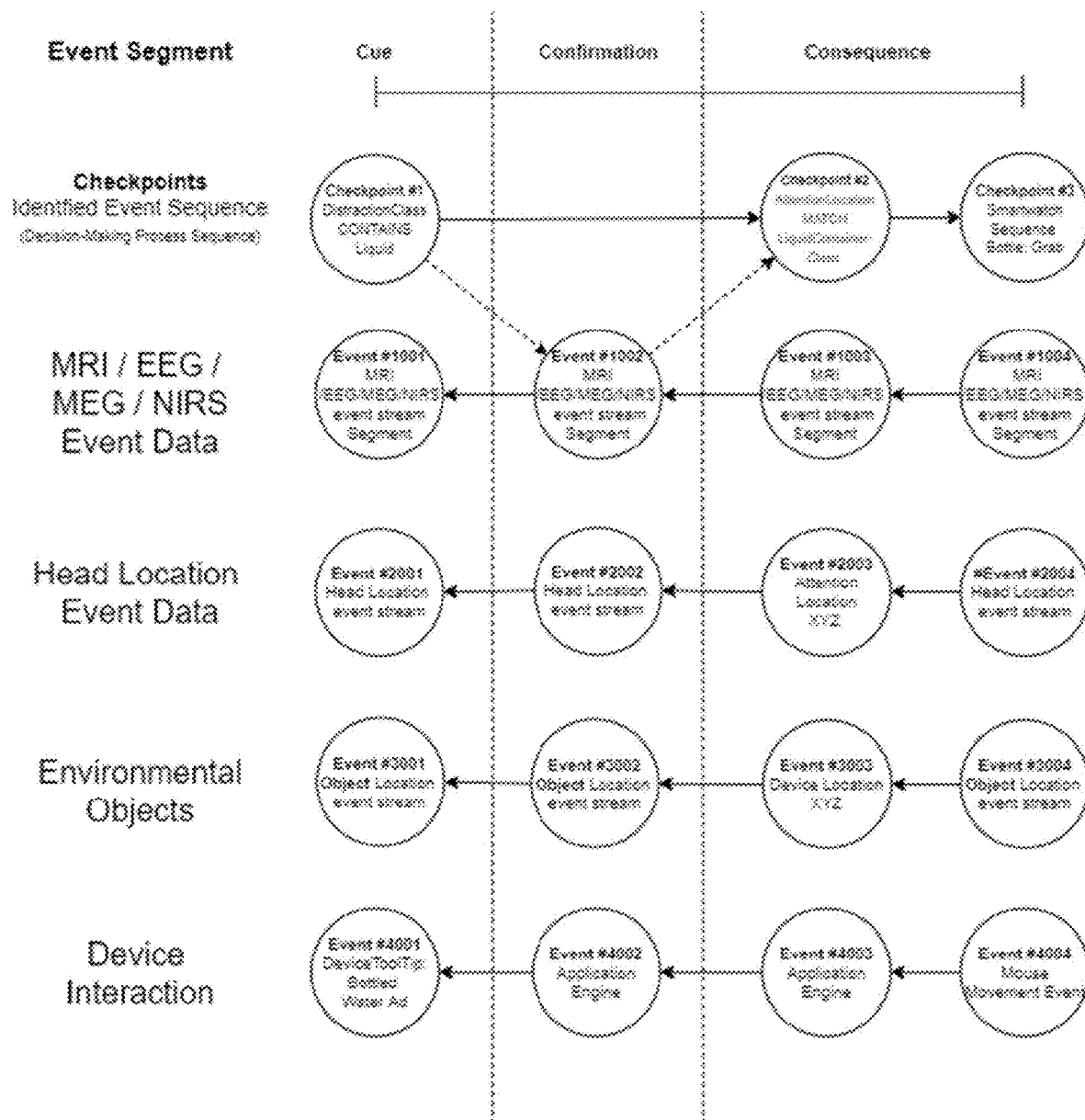
FIG. 31 is a diagram illustrating an example of operation of an exemplary embodiment.

Referring now to FIG. 31, the figure illustrates how occurrences may be identified through the sequence of events logged in a computer system, such as a decision 732. FIG. 31 also includes one checkpoint layer and four event layers. The checkpoint layer is the same as illustrated in the FIG. 30 example. Additionally, four more event layers are included. The first layer is a neurotechnology event data layer, included with events numbered #1001-#1004, a second layer is the head location event data layer, (#2001-#2004), third layer is environmental objects (#3001-#3004), fourth layer is device interaction which may be logged by the application engine (event #4001-#4004). As shown, when Checkpoint #1 is passed its timestamp serves as a cue to identify the decision between the cue (Checkpoint #1) confirmation (Checkpoint #2). Thus also illustrating how a decision may be identified from different perspectives such as the user's brain through MRI/EEG/MEG/NIRS event data, or attention identified by a combination of device interaction, environmental objects and head location.

FIG. 30. shows how a Event #4001 DeviceToolTip: Bottled Water Ad is initiating the Checkpoint sequence. A tooltip is information that is a cursor or similar on a device, this may for instance be attention tracked by eye movement on a virtual/Augmented/Extended/Mixed reality headset, a cursor on a computer or a finger on touch device. It is also shown how the Event #2003 Attention Location XYZ and Event #3003 Device Location XYZ is corresponding to each other, this may be through identifying the user's attention in correspondence to their head location, whereas the 3-dimensional coordinates is identified with a plurality of indicators such as explained in FIG. 29. In turn a decision may be identified between the cue and confirmation. Furthermore, as a decision is a universal mechanism and situations 410 are continuously being sensed, segmented and stored by the system 150, patterns universal to certain or any situations 410 may be uncovered. Hence, the identification of decision shown with MRI/EEG/MEG/NIRS event data in this example, may not be exclusive to this situation 410 or checkpoint.

Figure 32:
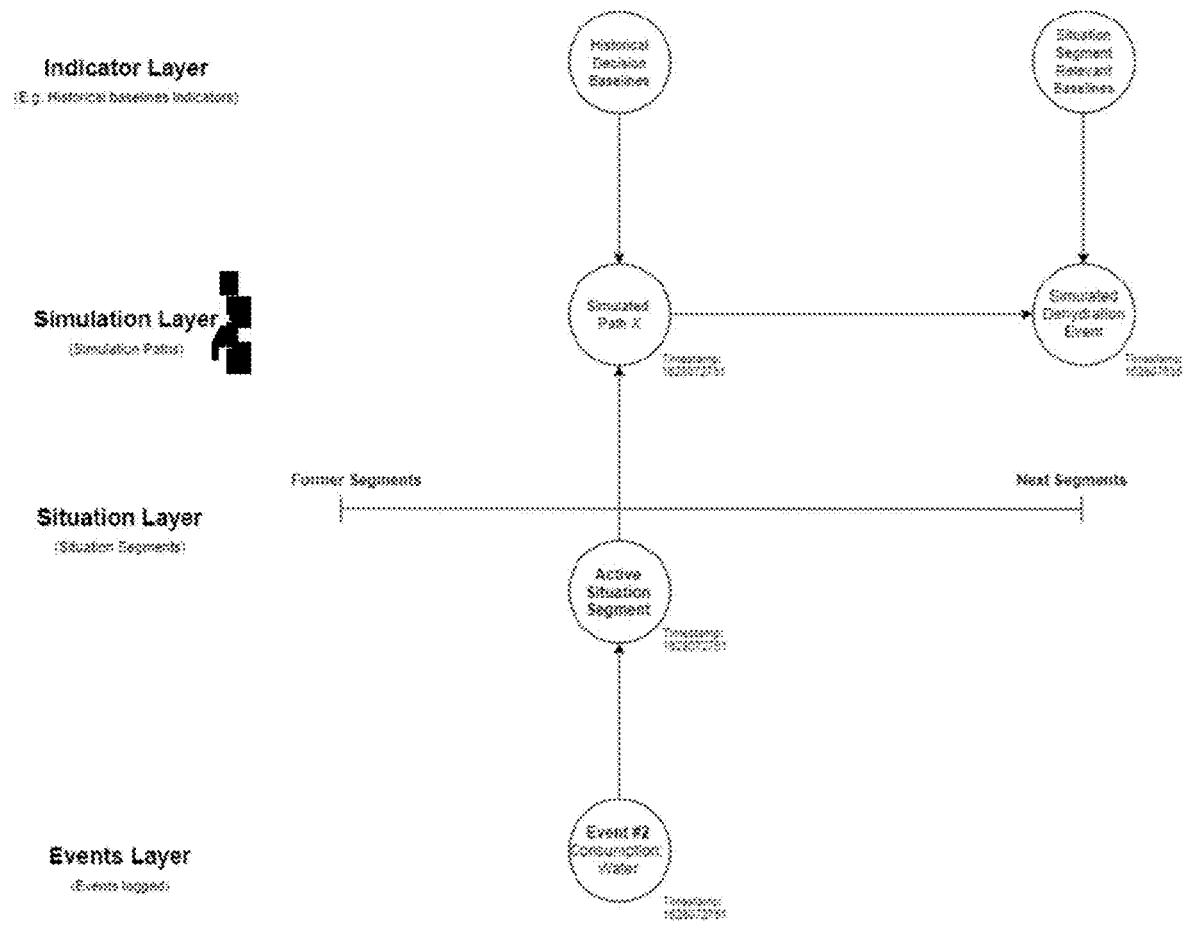
FIG. 32 is a diagram illustrating an example of operation of an exemplary embodiment.

Referring now to FIG. 32, the figure illustrates how simulation logic may be applied in real-time to simulate different paths or scenarios side-by-side the active situation segment. For instance, the user may be in an active situation segment where the system 150 has identified that the user is likely to experience a dehydration event within an hour (illustrated by the timestamp 1628076351). By way of example, a simulated path X may be simulated when Event #2 is logged, in turn the simulated path X may continuously simulated the alternative scenario where the user would not have consumed water (Event #2) and instead experienced a dehydration event within an hour. This simulated path may use historical decision baselines in accordance with how the active situation segments develops to identify how a user may have reacted the ongoing situation 410, but without consuming water (Event #2) and gradually become more dehydrated (dehydration event) within the active situation segment.

Model Training to Determine Environmental Objects

Device events may relate to events logged, streamed or generated by objects such as events obtained or accessed by the system 150. Device events may comprise events related to data at rest (e.g., data and/or logs stored on a device, on a network or service the device has access to). Further, device events may also comprise data in transit or motion, such as data synced to the device. Additionally, device events may comprise data in use, for instance events relating to device and/or application interaction data, data obtained through connected devices, sensor events or device events log, which may be generated or key logged by the application engine 192.

Upon connecting a new device 201, 202 or data source 2010 to the system 150, the prediction machine learning network 130 may initiate one or more processes in a data mining engine 1110 and/or Deep Learning Modules 640, where additional entities and/or indicator(s) 630 may be generated. In this example, the entities and/or indicator(s) may identify commands, functions, properties or other data related to a device (such as information available in developer documentation or references, SDK (software, development kit) and/or application programming interfaces. The system may autonomously or automatically label and/or classify new data and object information to entities internally in the system 150. The system may then generate a classification or object type for the new device. In this example, the new device may be an environmental object such as an electronic device.

By applying the cue, confirmation, consequence segmentation the machine learning models may be trained by identifying repeated event sequences as checkpoints within the segments. High performing checkpoints e.g., a conditional checkpoint where the conditions have a high rate of being passed, may be used to trigger internal commands that are tested around the same time as the cue, confirmation or consequence event or checkpoint is expected to be passed. This logic was further illustrated and explained in FIG. 24A and FIG. 24B, where it was shown how the Checkpoint #3 had three particular conditions which further discloses several ways the system 140 self-improves, more specifically how a plurality of machine learning models are trained in the Prediction engine network 130. The Checkpoint #2 passed event was also serving as an indicator to an unidentified event sequence by the system 140 (viewed smart watch screen). As with checkpoint #2 the missed call from Person X also was a condition for checkpoint #3 to pass, in other words, this shows how native device events (such as a missed call) are used in checkpoints to segment and/or connect events internally generated by the system 140 to events from User Device 201, 202. In other words, a device event may serve as a reliable indicator to train the accuracy of internally generated indicator values and/or relationships. Additionally, reliable indicators may also serve as a reference point for alignment of event sequences temporal aspect, the reliable indicator event timestamp may be used to sync or align latency or inaccuracy of events generated, for example, from predictions, calculations, interpretations, indicators, and/or simulations. For instance Checkpoint #2 was passed 5 seconds before the missed call event, which in turn may signify an accurate latency between these two events.

Figure 33:
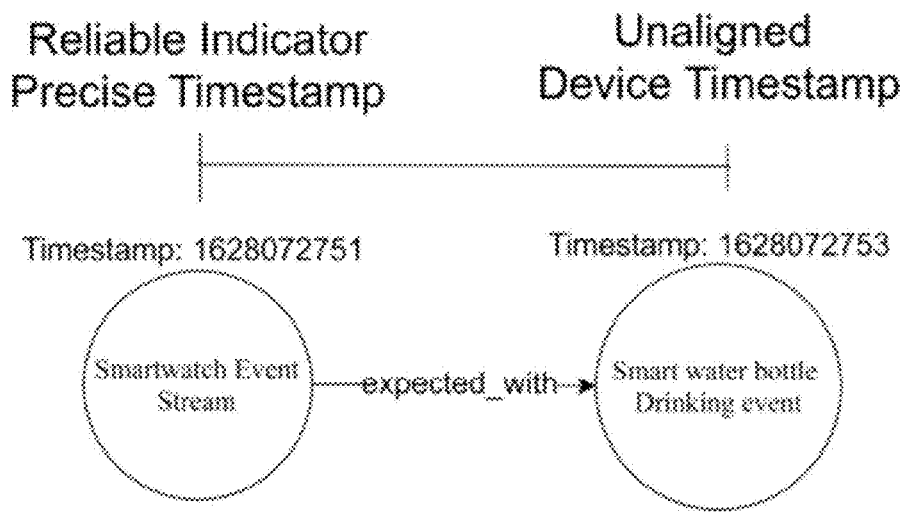
FIG. 33 is a diagram illustrating an example of operation of an exemplary embodiment.

Referring now to FIG. 33, the figure illustrates two nodes where a smartwatch event stream represents an reliable indicator for a precise time an event occurred outside the system, and a smart water bottle drinking event that illustrates an unaligned device timestamp. An reliable indicator event for timestamp alignment would be indicators which are logged from devices which have an accurate capture timestamp on the events it logs, this may be devices which are passively tracking the user, such as an keylogging event or an event stream from a wearable. The prediction machine learning network 130, would be trained to identify reliable indicators by initiating several mechanisms on several devices at the same time where a timestamp logged by the system 150 may be used to identify which and when device events have precise or imprecise timestamps. For instance, a smart bottle device may not have millisecond or second precision, however, an event stream from a smartwatch or smart ring may comprise a precise timestamping mechanism. In other words, a reliable indicator for identifying the real occurrence, for example, of a user drinking from a smart water bottle, may be identified from the smartwatch device, not the smart bottle device.

The smart water bottle device timestamped the water drinking event with 1628072753, which indicates that the event has an inaccuracy of 2 seconds compared to the precise timestamped event from the smartwatch (1628072751). As inaccuracies between device timestamps become identified (e.g., by failing to pass the same time-based checkpoint conditions). Reliable indicators for precise timestamping may then serve as a reference point for what parameters to use when identifying and aligning device timestamps. It may be noted that the inaccurate device time-stamps, may not be changed, rather internal functions may be assigned to identify and interpret the timestamps differently. Reliable indicators for precise timestamps may be identified, for example, from passing checkpoints and/or the prediction machine learning network 130 detection mechanism initially mentioned in the description of FIG. 33.

Another important element that can be seen in the missed call event from FIG. 24A and FIG. 24B is that it is connected to a confirmation node, where its relationship to a cue event incoming call can be identified by an NID. In turn, it is disclosed how the missed call event together with the NID, not only has segmented all mentioned entities or nodes in the foregoing discussion from FIG. 24A and FIG. 24B, but also identified how the entitles, their sequence as well as connections may relate, which again would train the system 140 and its machine learning models.

Reliable Indicator Usage

Reliable indicators may comprise events or checkpoints containing event(s) that also serve as an indicator for a cue's, confirmations and/or consequence segment. Reliable indicator segments may comprise events related to a transition such as entering a an object 744 that is stationary (building, identified by device location, Wi-Fi connection or Wi-Fi sensing device 201, 202, device interaction 754 identified by application engine 193) or none-stationary (car, identified by user device 201, 202, e.g., through application engine 193 installed or communicating with the car 201, 202, an service, or an object 744 that is connected or installed on the car 744), reversal, decision, selection, determination, the start or opening of something such as a new situation 410, the occurrence of something such as an person, the end or closure of something such as a thought process.

Figure 34:
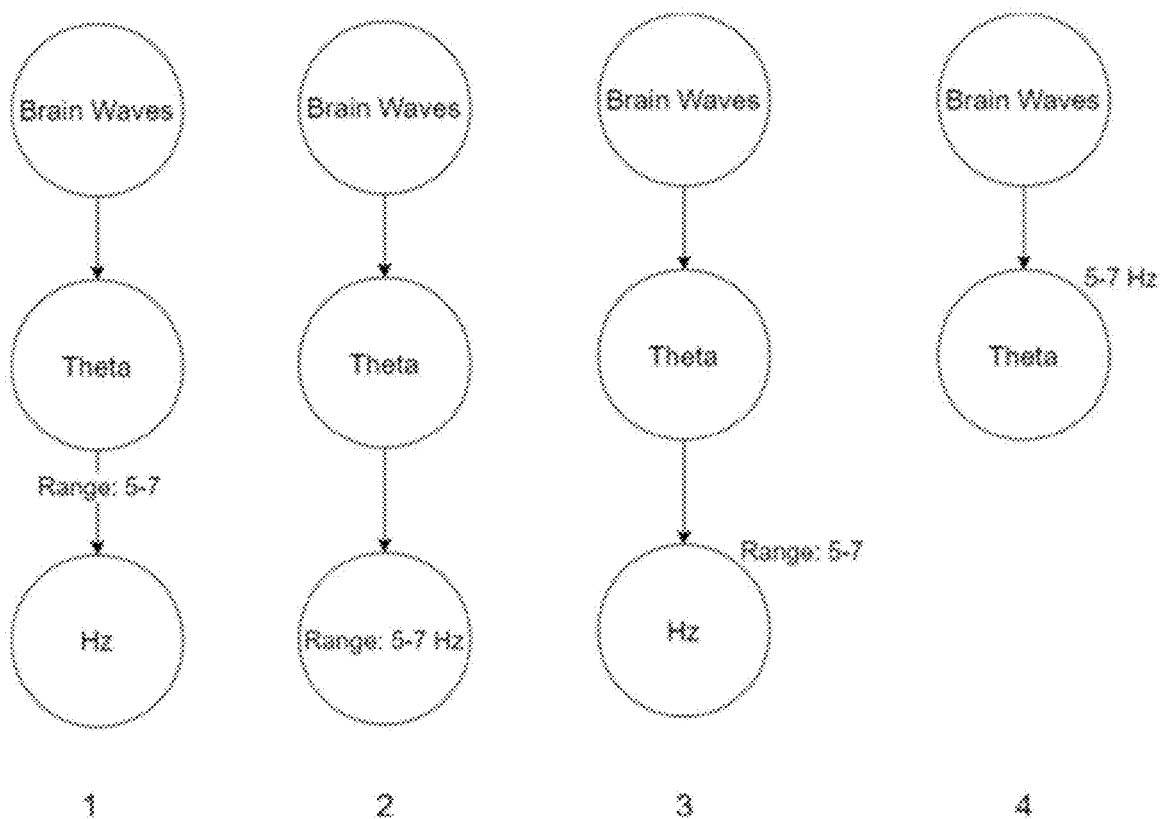
FIG. 34 is a diagram illustrating an example of operation of an exemplary embodiment.

When entities and/or relationships are assigned a directional, unidirectional and/or bidirectional indicator-based weight with a high strength (e.g., 0.93 where the highest possible value is 1), the entity may be used as a reliable indicator. On the other hand, if the entities and/or relationships are assigned a weight to signify a value, it may be seen as a logical dimension that may be applied in different locations of the system 140. The system 140 may be operating in an autonomous process, accordingly it should be noted that processes such as entity classification, labeling and/or logic may be fully and/or partly computer-generated process, hence not be understandable/readable for humans, contrary to what is presented in the illustrative examples of this disclosure. FIG. 34 illustrates four ways values may be stored in the system 140 autonomously, where each example includes a brain wave entity or node with a relationship to a Theta entity. Further in the first example from the left, the range (5-7) is assigned within the relationship from the Theta entity to the Hz entity (representing the unit of the range), in the second example the value is assigned in the Range: 5-7 Hz node, where the unit is included within the node. In the third example a Hz node with a 5-7 range value in its properties has a relationship to a theta node. In the fourth example it is shown how a Theta node includes both the unit (Hz) and its value range (5-7) within the properties of the theta node.

Internal logic, such as assigned values may be used to improve the accuracy of indicators and in turn turning them into reliable indicators. In one embodiment the system 140 may use reliable indicators together with pre-identified internal logic to improve functional aspects of the system 140, such as internal stored checkpoints, functions, labeling and classification.

One or more machine learning models may calculate, user specific and/or prediction machine learning network 130 wide baselines for the baseline development of situations and/or decision sequences. For instance, a baseline may be based on indicator values present at the start (e.g., starting at a cue), in the middle (e.g., starting at a confirmation confirmation) and/or (e.g., starting at a consequence) segment. There may be baselines that may be queried in real-time modularly, purely based on using timestamps. In other words, the start of the baseline calculation is based on the first timestamp, consequences are based on the last timestamp, while confirmation may be the median time between cue and consequence.

Filtering Indicators

Furthermore, baselines that filter indicators may also be used by the system. For instance, a relevant indicator baseline may be calculated by the system for each situation segment (event after the segment is finished) where only indicators with a certain weight is included. The same principle may be applied to generate perspectives 620, for example, a perspective may be generated of a situation 410 where only indicators and/or events from certain devices are used, thereby providing the option to review former situation segments the situation another view or perspective 620 event after the situation has been segmented.

The two mentioned methods, querying situation segments with more granular segmentations within the occurrence of the situation 410, and filtering the queries based on desired calculation, may as formerly noted both be applied in real-time (active situation segments) as well as historical situation segments (former situation segments). In turn the same method may also be applied to simulations.

Simulation

One way simulation may be done in the system, is to utilize baselines of decisions, situations and/or users. First, as every situation segment is connected with both the former and next situation segment, the system may generate simulations based on historical situation segment sequences. Furthermore, decision sequences within these situations may also be simulated in the same manner or, in conjunction with the situation, meaning the decision sequences and/or situation sequences simulated may be simulated as separate paths or sequences that may impact each other inside the simulation. The complexity of the simulation result would be based on the desired inclusion of the amount of data collected during historical segments as illustrated on FIG. 17. Moreover, the calculation and/or simulation may be purely based on a prediction machine learning network 130 data and/or the user 101, 102. In the case the user 101, 102 would be a part of the simulation in addition to the situation 410 and/or decision sequence simulated, the user data 530 would be used. Accordingly, it shows how the disclosed simulation method is modular, as a simulation may include the user data 530 from historical situation segments 510, while, for example, the decisions may be based in part of user data 530 and based in part on data from the prediction machine learning network 130.

Sensing Replica

In one embodiment, the system may determine a situational perspective (e.g., a Sensing Replica) of a user. The system may provide a trained machine learning model configured to determine a situational perspective of a user. The system may receive a plurality of event data related to the user. Based on the received plurality of event data, determining a situational perspective of the user, the situation perspective configured to simulate how the user would react to future situations, the future situations determined by evaluating subsequent event data related to the user.

As previously discussed in FIG. 7, situational perspectives 620 may be generated with indicators 630. A Sensing Replica may be an example of a situational perspective 620 generated by the system. A Sensing Replica may comprise indicators 630 and/or indicator combinations which are used to sense the user(s) 101, 102 likely perception in a situation 410. The following discussion further describes how the system may determine one or more sensing replicas of a user. As previously explained, indicators may be utilized by the system to sense a multidimensional environment in real-time (described in FIG. 25, FIG. 26, FIG. 27, FIG. 28 and FIG. 29), and may also be utilized by the system for determination of simulations. Furthermore, as previously discussed, the Decision Support Platform 208 may comprise an augmented intuition module 166 component which further encompass aspects of metacognition, self-actualization, and algorithmic decision-making. Also, as previously mentioned, metacognition aspects of the Decision Support Platform 208 may relate to an individual user's 101, 102 memory, spatial reasoning, and problem-solving skills, also an Augmented Intuition Module 166 may encompass a data mining engine 1110.

It may further be noted that the augmented intuition module 166 may be used together with the prediction machine learning network 130 and/or the augmented subconsciousness 350 to grow and/or evolve one or more Sensing Replicas of the user 101, 102, where the one or more Sensing Replicas may have modular applicability anywhere in the system 150 and/or prediction engine network 130.

In some embodiments, one or more Sensing Replica may be used by the prediction machine learning network 130 to simulate how the user would react to future situations. The Sensing Replica may continuously self-assemble and/or grow into a more accurate version of the user 101, 102, every single time new data is added. For instance, objects and/or data types that can be used to generate situational sensing indicators, such as explained in FIG. 29 may be stored inside the prediction machine learning network 130. Further, the prediction machine learning network 130, as indicators or entity relationships become reliable and/or entities are assigned values (e.g., energy connected to consumption of a meal or an initiated motion) a plurality of entity networks may be used and distributed and/or accessed by all user's 101, 102. This further allows the user's Sensing Replica to include indicator layers which have not been generated by any of the user's 101, 102, devices 201, 202.

Additionally, the augmented intuition module 166 may be a part of the decision support platform 208, the result from the Sensing Replicas reaction in a simulation of a future event, may be used to provide and/or generate decision support interventions and/or interference with the user. Thus, the augmented intuition module 166, may communicate and/or alter both simulated events and/or real-world events.

Decision Support Interventions

Decision support interventions may be generated based on the indicators 630, decisions 732, situations 410, user data 530, such as. inner user data 532 and/or outer user data 534. For instance, former situation segments may be used to identify trends, baselines and/or thresholds within event sequences that are logged in situations 410. Moreover, data mining engine 1110 may identify a user's genome as indicators 630 that are matched with identified data in real-time to develop correlating patterns in the current data. The data mining engine may further generate decision support interventions from indicators 630, mined in the data mining engine 1110. The indicator(s) 630 mined, may for instance be indicators for and when to mitigate a tendency, caused by a predisposition, which may occur in a situation 410, further, may make the user 101, 102 prone to make a certain decision 742.

Method for Distributed Indicators Identification and Generation with Augmented Intuition Module The Prediction Machine Learning Network 130 may utilize a plurality of ways to generate indicators and/or entities such as (e.g., modular checkpoints generated by a neural pathway training module 164), modular queries (e.g., NID's generated by a trained machine learning model in a Prediction Machine Learning Network 130), segments (e.g., cue, confirmation, consequence indicators segments generated by a data mining engine 1110).

The Augmented Intuition Module 166 may initiate generation and/or optimization initiatives in the System 150 and/or prediction machine learning network 130. As the Augmented Intuition Module 166 is a communicating with a of a user-oriented Decision Support Platform 208 and a data mining engine 1110 inside a centralized prediction machine learning network 130, the augmented intuition module 166 may comprise one or more Deep Learning Modules 640 which are used to identify patterns in object classes and/or device events 910. This allows the Augmented Intuition Module 166 to identify events 910 and/or combinations of events 910 from devices 201, 202, which are not currently used by the system or a part of any entity class for a certain device. For instance, the Augmented Intuition Module 166 may have identified certain devices 201, 202, grants the application engine 192 the same type of access permission (e.g., admin, and/or root access to the entire device operating system), whenever installed as a keylogger. In such cases, the Augmented Intuition Module 166 may utilize pre-identified entity or indicator combinations in the prediction machine learning network 130, which correspond to an entirely different object, but with the same permissions, cloud ecosystem, operating system or other identified similarities. In other words, the entity or indicator combinations, for example, the situational sensing indicators explained in FIG. 29, may be assigned from and/or distributed to, the prediction machine learning network 130, from the very moment a new object or device is added to the system. An object may be added to the system in a plurality of ways, for instance when assigning a data source 2010 and/or when an installation running the application engine 192.

Pre-Identifying Reliable Indicators

In one embodiment, the system may determine reliable indicators. The system may receive a plurality of event data related to one or more users. The event data, for example, may include event values and/or event sequences of the event data. By evaluating the received event data, the system may determine those event values and/or events sequences within entity classes and instances which also have a broad (e.g., universal or general) applicability to one or more users. The determined event values and/or event sequences may include instances of one or more pre-identified classes of reliable indicators. The system may identify and/or improve the accuracy of the mentioned class of reliable indicators. For example, the reliable indicators may include one or more events or checkpoints comprising event(s) that also serve as an indicator for a cue's, confirmations and/or consequence segments.

The prediction machine learning network 130 may comprise one or more machine learning models trained to identify universal event values and/or events sequences within entity classes and instances which also have a broad and/or universal applicability to most user's 101, 102. Such universal event values and/or event sequences may be one or more of pre-identified classes of reliable indicators 690. A data mining engine 1110 may be used to identify and/or improve the accuracy of the mentioned class of reliable indicators 690. Reliable indicators 690 may comprise one or more event or checkpoints containing event(s) that also serve as an indicator for a cue's, confirmations and/or consequence segment. An pre-identified universal reliable indicator 690 for situation segments 510 may for example be events related to a transition such as entering a location 544 (e.g., building, identified by device location, Wi-Fi connection or Wi-Fi sensing device 201, 202, device interaction 754 identified by application engine 193).

Another universal reliable indicator for situation segmentation that may be pre-identified is entity instances relating to the user 101, 102 entering a vehicle. Entrance into a vehicle may be identified by events logged that relate to vehicle applications installed on user devices 201, 202. For instance, a user 101, 102, may initiate a command to be picked up by their autonomous vehicle from their brain computer interface device 201, 202, where the application engine 192 would be installed to log events on the brain computer interface device 201, 202. Furthermore, as illustrated in FIG. 19 and FIG. 20 the prediction machine learning network 130 may comprise one or more machine learning models that may be trained to auto-classify and/or auto-label entities inside the prediction machine learning network 130. In turn, the vehicle command on the BCI device, could be identified as a vehicle-related event 910 in real-time with no former classification information (e.g., based on event source (application name), event content (command and/or notification on brain computer interface 201, 202)). Further, events 910 or event sequences may be assigned baselines and/or identified as segments, or consequences (e.g., expected change in situational setting 540 based on destination property in an autonomous vehicle event), even before similar events 910 are logged for the first time. Other potential pre-identified reliable indicators relating to situations 410 and/or decisions 732 may be to assign thresholds and/or baselines to inner user data 530 and outer user data 534.

Accordingly, it is illustrated how a prediction machine learning network 130 may apply one or more machine learning models (auto classification 2025 and data mining 1110) use events 910 to identify situations 410 and/or situational consequences 820, even in cases where there is limited or no pre-existing user data available. Moreover, it has been shown how data provided by different machine learning models inside the prediction machine learning network 130 may be combined together in a modular manner could enhance the prediction accuracy of the system. It has also formerly been disclosed how cue, confirmation and consequence may be a method for event segmentation with any objective, for example to identify decisions 732 as discussed in FIG. 26, FIG. 27 and FIG. 28. Additionally, several ways the system may autonomously identify, generate, test and improve indicators was shown in FIG. 16, FIG. 24, FIG. 31 and FIG. 33. Thus, reliable indicators may be some initial mechanisms applied to train machine learning models to identify and/or generate new entities in a database or network.

Decision Support Determination

In some embodiments, the system may use a trained machine learning model to provide decision support for a user. For example, a trained machine learning model may be provided that determines a decision for a user. As discussed with regard to FIG. 7, the system may use a plurality of system generated perspectives 620 to determine decision support for a user in real-time. The system may use perspectives 620 to determine a situation 410 in real-time as illustrated in FIG. 29. Furthermore, as discussed with regard to FIGS. 27 and 28 cue, confirmation and consequence segments may be used by the system to identify event 910 sequences such as decisions 732 or situations 410. Accordingly, the system may continuously segment and generate interconnections between situations 410 or situation segments 510 and user data 530, while identifying how the situation 410 and user data 530 event 910 interrelate to the event sequence.

In other words, whether one or more events 910 may be a cue, a confirmation and/or a consequence for one or more other event 910. Accordingly, the system may identify how an event 910 relates to when something occurred (cue, confirmation, consequence segments), what occurred (checkpoints 940, 950), where it occurred (situational setting 540), why it occurred (decisions 732 identified within situations 410), how who was involved may have impacted the development of a situation 410 (situation segment 510), as well as how the situation 410 may have impacted who was involved (user data 530).

The system may train the prediction machine learning network 130 using every event 910 logged (as explained with regards to FIGS. 11 and 12). Additionally, the system may generate decision support intervention. For instance, the system may identify baselines in user data 530 and how a baseline corresponds to consequences of situations 410 and/or decisions 732. As explained with regard to FIG. 24A and FIG. 24B, the system may use cue, confirmation and consequence segments, to initiate internal predictions that are logged within cue segments, but before the segment ends, or the confirmation event, and/or event sequence is logged, in order to train the prediction machine learning network 130 to both identify thresholds, baselines, and/or latency of events logged. Moreover, FIG. 24A and FIG. 24B also illustrate one of many ways the prediction machine learning network 130 and/or the system 140 may identify the how events 910 logged in a Cloud Based System 206, relates to the occurrence of a decision 732 in the real world, as well as the occurrence of the user's 101, 102, current need 1210 for Real-time Decision Support 1350 in relations to the user's 101, 102 next response 1220. In other words, events 910 such as situations 410 and/or decisions 732, that have yet to occur in the real world. FIG. 24A and FIG. 24B also illustrate a method for identifying relationships between real world events 910 outside the system (e.g., decision 732 to ignore call), which occurs on real world environmental objects 744, both physically, (e.g., real world physical keycap press on a keyboard object 744) and digitally (e.g., keylogging keycap press as letter "A" on device 201, 202).

Furthermore, how real-world events 910 occur on environmental objects 744 outside the system (e.g., incoming call event 910 logged by decision support platform 208 installed on the user's 101, 102 phone), relates events 910 occurring outside the system in real world situations 410. For instance, the real-world event 910 of the user 101, 102 determining to mute the sound on their smartwatch 201, 202 may be logged into the Cloud Based System 206 as a sound muted event by the decision support platform 208 installed and/or connected to their smartwatch device 201, 202. Thus, the centralization of the user data 530, from user devices 201, 202, into a cloud based system 206, which further communicates with centralized artificial intelligence network such as a Prediction Machine Learning Network 130, may utilize real world objects 744, to determine (i.e., sense) situations 410 in real-time, from different situational perspectives 620 both digitally (keylogging decision support platform), time (timestamping module) and/or space (distributed sensing explained with regard to FIG. 29 through environmental objects).

Decision Support Intervention Generation

A machine learning model may be trained to determine and/or generate decision support intervention based on the user's input in a decision model for instance a checkpoint 940, 950 created in a neural pathway scenario 1200. A neural pathway may comprise a decision deviation threshold and/or an interference behavior component. The decision deviation threshold may be an optional setting the user may add in a neural pathway 920. A user may set a decision deviation threshold with data or entities 1010, which further is used by the system as a reference point in a situation 410 that simultaneously be used by the system to initiate a confirmation segment of the events that occur in real-time. As the autonomous real-time Decision Support 1350 may be provided by the system, the user 101, 102 may further set an interference behavior 1820. The interference behavior would be the form of interference or consequence, the user would want to occur after decision deviation is detected. The prediction machine learning network 130 may then be trained on identifying what data which may be logged as events 910, that would reflect the user's view of decision deviation and desired interference behavior. When the user may set decision deviation and/or interference behavior the prediction machine learning network 130 may simultaneously be trained to identify the components of decision support and decision support interventions. Furthermore, as decision deviation and/or interference behavior may have a connection to a situation 410 the prediction machine learning network 130 may also be trained to generate decision support interventions. The Prediction Machine Learning Network 130 may use cue, confirmation and/or consequence segments to identify sequences of situations 410, situational consequences 820 and/or decisions. Decision support interventions may be generated by the system based on baselines identified sequences of situations 410. For instance, thresholds may be set by the system to identify trend reversals in user data inner user data 532 and/or outer user data 534.

Events classified as inner user data 532 may for instance receive thresholds which may have been set by a data mining engine 1110 in a centralized prediction machine learning network 130. The data mining engine 1110 may have set pre-identifiable threshold values from data mining values for user data which further would correspond with quantifiable measures in a situation 410. For example, the user 101, 102, may wear a user device 201, 202, such as a smart ring which measures blood pressure and/or finger temperatures, which further generates events 910 logged into the system by the decision support platform, where threshold and baseline values have been set by the data mining engine 1110. The thresholds values may be set by following global standards for the event and/or indicator that is data mined. Decision support interventions may further be identified by identifying the baseline and/or thresholds values in cue, confirmation and consequence segments that relate an event and/or indicator, as well the mentioned decision deviation and interference behavior.

Figure 35:
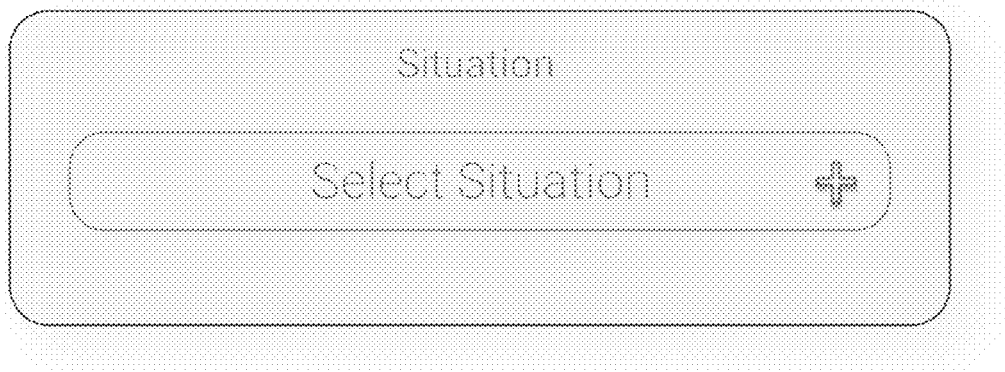
FIG. 35 is a diagram illustrating an example of operation of an exemplary embodiment.

Referring to FIG. 35, the system generates and displays to a user 101, 102 a user interface where the user 101, 102 may select a situation 410 with the selection button. Upon interacting with the situation selection button, the system may respond by presenting the user 101, 102 with one or more situations 410 which are queried from a database through a Cloud Based System 206.

Figure 36:
FIG. 36 is a diagram illustrating an example of operation of an exemplary embodiment.

Referring to FIG. 36, the system may generate a graphical user interface that includes a selected situation 410 is disclosed. Upon selecting a situation 410 by the user 101, 102, the system may display situations 410 generated by the user 101, 102 and/or display situations 410 generated by a machine learning model. Once a situation 410 is selected, one or more situational conditions 520 (i.e., simply referred to as conditions) may be added. Situational conditions 520 may be specific conditions that the user 101, 102, may evaluate and/or set which further help the user distinguish one situation from another. A situation 410 may for example be investment meetings.

Figure 37:
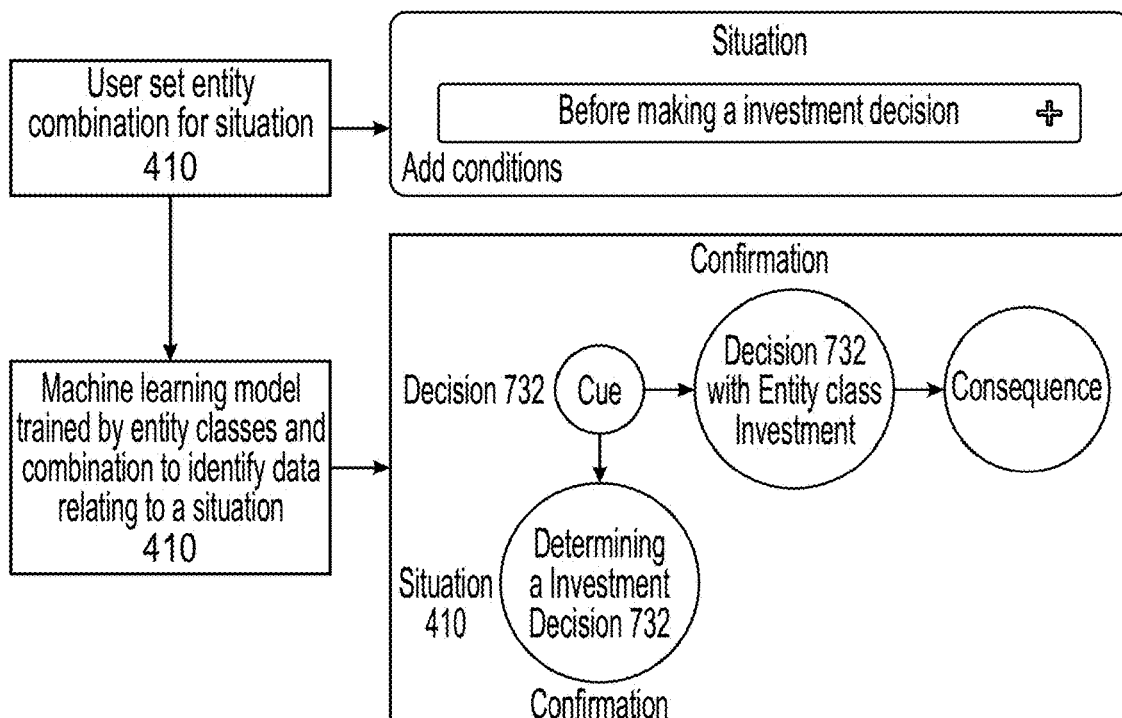
FIG. 37 is a diagram illustrating an example of operation of an exemplary embodiment.

Referring to FIG. 37, the system may generate a graphical user interface that displays the selected situation. The flow chart illustrates the system processing and display of the user interface. The figure illustrates a flow diagram which depicting how a machine learning model may be trained by utilizing a temporal segmentation with an pre-identified event 910, and/or event sequence representing a decision 732 and/or situation 410. A user 101, 102 first selects one or more entities as an input on a situation 410 selection interface. The entity combination and/or entity selected may further train a machine learning model based on the selection. A machine learning model may be trained to identify data relating to a situation 410 by receiving the user selection, and furthermore what data the user perceives to be a situation 410.

The figure also illustrates how cue, confirmation and/or consequence segments may be used together in order to identify a situation 410 and/or decision 732. As illustrated in FIG. 37 a situation 410 selected by a user 101, 102, may be before making an investment decision, a decision cue segment may then be used to confirm the user's selected situation 410 as the cue segment of the decision 732 would occur before the decision is made. When the user-selected entity combination is an event and/or event sequence at a later time, the system may further be trained to identify what data that may be logged by the user according to the user's 101, 102 perception of a situation 410. The user selected entity combination may further serve as a reference point for a cue, confirmation and/or a consequence segment.

Figure 38:
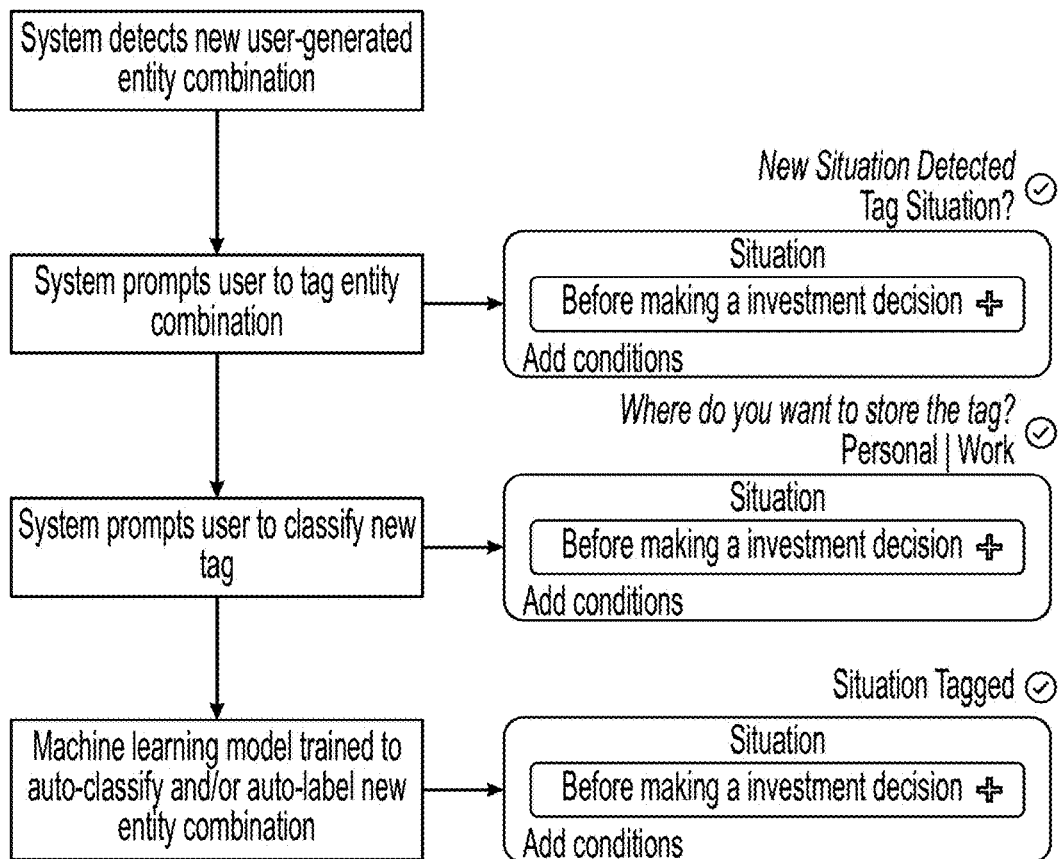
FIG. 38 is a diagram illustrating an example of operation of an exemplary embodiment.

Referring to FIG. 38, the system may generate a graphical user interface that may receive a user-generated entity combination as an input on a situation 410 selection component. The flow chart illustrates the system processing and display of the user interface. The received entity combination may be detected as a new combination by a cloud-based system, which further may prompt the user to tag (i.e., label) the situation 410 selection. A user may further comply with the system generated prompt, the system may then follow to prompt the user to classify the newly created tag. As an illustrative example two classes or categories are displayed in figure FIG. 38 as Personal class and Work class, such classes may represent entities that are generated by the user and/or the system. The user may proceed to interact with a widget that may store the newly tagged situation in the user's personal knowledge base, which further is an input into an database received by a cloud based system in communication with a user device 201, 202. The received data may further train a machine learning model to auto classify and/or auto-label new entity combinations.

Figure 39:
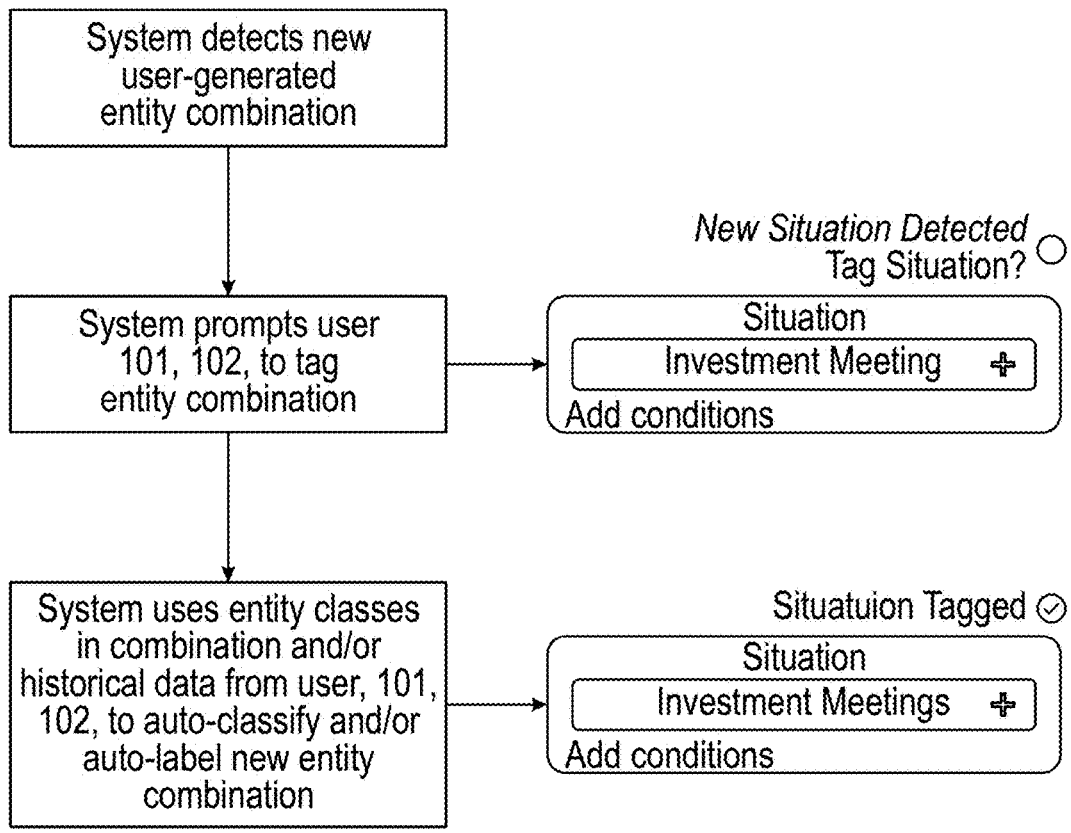
FIG. 39 is a diagram illustrating an example of operation of an exemplary embodiment.

Referring to FIG. 39, the system may generate a graphical user interface to receive a user-generated entity combination as an input on a situation 410 selection component. The flow chart illustrates the system processing and display of the user interface. The received entity combination may be detected as a new combination by a cloud-based system, which further may prompt the user to tag the situation 410 selection. Based on the entity classes within the combination and/or historical data from the user 101, 102, the system may detect the situation class automatically and further proceed to store the newly tagged situation in the user's personal knowledge base, which further is an input into an database received by a cloud based system in communication with a user device 201, 202. In the instances the auto classified and/or auto-labeled situation is or is not changed by the user, a machine learning model may be trained.

Figure 40:
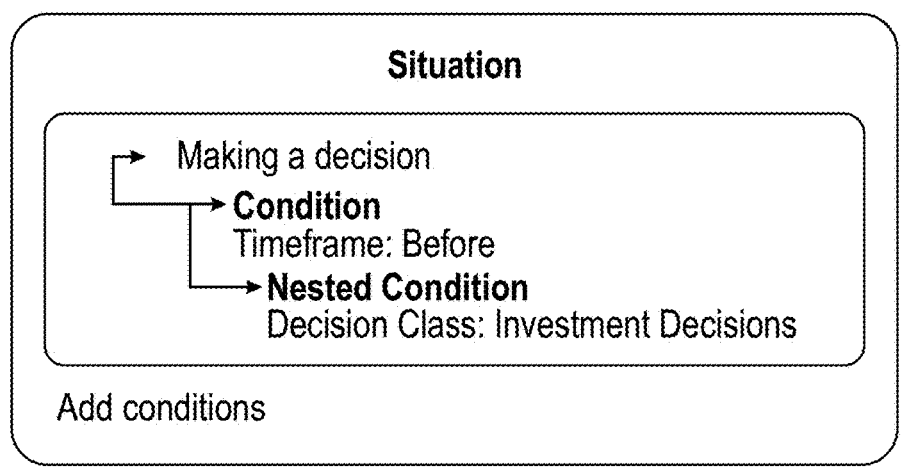
FIG. 40 is a diagram illustrating an example of operation of an exemplary embodiment.

Referring to FIG. 40, where the system may generate a graphical user interface receiving input from situation 410 selection from a user 101, 102. A user may set conditions, nested conditions and interference behavior for a situation 410. The system may receive input on a graphical user interface from a user where a user has labeled a situation 410 as making a decision. A user may further have selected a condition for the situation to occur which can be seen including a timeframe before, which represents a condition for when a situation 410 may occur. Further a nested condition has been selected which includes a decision class, investment decisions. Accordingly, the user selection received into a cloud based system from a graphical user interface includes a situation 410 where a situation is selected with conditions as well as nested conditions. The system may determine the occurrence of a condition and then evaluate events to determine whether a nested condition has occurred.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method comprising the operations of:
   providing one or more trained machine learning models that have been trained to evaluate input data and determine an occurrence of a situation, wherein:
      the situation is a situation node of one of the one or more machine learning models, the situation node is generated based on a situation segment,
the situation segment is determined by evaluating a sequence of the events,
the situation segment represents a specific occurrence of a situation,
the situation is defined as a set of events that situates an entity relative to a time or a location;
receiving data related to one or more computing devices, the data comprising at least a first series of one or more events of the computing devices;
inputting the data into the one or more trained machine learning models; and
determining, by the one or more trained machine learning models, the occurrence of the situation where a first set of event values meet the criteria for one or more situation indicators.

2. The computer-implemented method of claim 1, further comprising the operations of:
determining, by the one or more machine learning models, the occurrence of a decision, wherein a second set of event values meet the criteria for one or more decision indicators;
wherein the one or more machine learning models are trained to determine an occurrence of the decision with respect to the determined situation, the decision being a decision node of the one or more machine learning models, and the decision being defined as a set of events that occur before one or more actions is performed by an entity.

3. The computer-implemented method of claim 2, wherein the situation node interconnects with a former situation segment node and an active situation segment node.

4. The computer-implemented method of claim 3, wherein the decision node interconnects with the former situation segment node and the active situation segment node.

5. The computer-implemented method of claim 1, wherein the situation is determined by the operations of:
evaluating one or more situation indicators; and
determining a situation segment based on the one or more evaluated situation indicators.

6. The computer-implemented method of claim 1, further comprising the operations of:
determining one or more situational consequences, wherein the situational consequences represent a sequential relationship between the data within or across the situation.

7. The computer-implemented method of claim 2, wherein the action comprises an action node indicating activity, the action having a relationship with the decision node.

8. The computer-implemented method of claim 2, wherein the one or more machine learning models comprise historic decision nodes based on historic event data and decision simulation nodes interconnected to the historic decision nodes, the simulation nodes predicting one or more events.

9. The computer-implemented method of claim 1, further comprising the operations of:
providing for display, a user interface, configured to allow a selection of the situation; and
receiving, via the user interface, one or more primary situational conditions that the one or more trained machine learning models use to evaluate the occurrence of the situation.

10. The computer-implemented method of claim 9, further comprising the operations of:
receiving, via the user interface, one or more additional situation conditions that are nested within the one or more primary situational conditions.

11. The computer-implemented method of claim 2, wherein the decision is determined by the operations of:
evaluating the one more events by one or more check point nodes, wherein each of the check point nodes have been completed, then determining that the decision has occurred.

12. A system comprising one or more processors, and a non-transitory computer-readable medium including one or more sequences of instructions that, when executed by the one or more processors, cause the system to perform operations comprising:
providing one or more trained machine learning models that have been trained to evaluate input data and determine an occurrence of a situation, wherein:
the situation is a situation node of one of the one or more machine learning models,
the situation node is generated based on a situation segment,
the situation segment is determined by evaluating a sequence of the events,
the situation segment represents a specific occurrence of a situation,
the situation is defined as a set of events that situates an entity relative to a time or a location;
receiving data related to one or more computing devices, the data comprising at least a first series of one or more events of the computing devices;
inputting the data into the one or more trained machine learning models; and
determining, by the one or more trained machine learning models, the occurrence of the situation where a first set of event values meet the criteria for one or more situation indicators.

13. The system of claim 12, further comprising the operations of:
determining, by the one or more machine learning models, the occurrence of a decision, wherein a second set of event values meet the criteria for one or more decision indicators;
wherein the one or more machine learning models are trained to determine an occurrence of the decision with respect to the determined situation, the decision being a decision node of the one or more machine learning models, and the decision being defined as a set of events that occur before one or more actions is performed by an entity.

14. The system of claim 13, wherein the situation node interconnects with a former situation segment node and an active situation segment node.

15. The system of claim 14, wherein the decision node interconnects with the former situation segment node and the active situation segment node.

16. The system of claim 12, wherein the situation is determined by the operations of:
evaluating one or more situation indicators; and
determining a situation segment based on the one or more evaluated situation indicators.

17. The system of claim 12, further comprising the operations of:

determining one or more situational consequences, wherein the situational consequences represent a sequential relationship between the data within or across the situation.

18. The system of claim 13, wherein the action comprises an action node indicating activity, the action having a relationship with the decision node.

19. The system of claim 13, wherein the one or more machine learning models comprise historic decision nodes based on historic event data and decision simulation nodes interconnected to the historic decision nodes, the simulation nodes predicting one or more events.

20. The system of claim 12, further comprising the operations of:
   providing for display, a user interface, configured to allow a selection of the situation; and
   receiving, via the user interface, one or more primary situational conditions that the one or more trained machine learning models use to evaluate the occurrence of the situation.

21. The system of claim 20, further comprising the operations of:
   receiving, via the user interface, one or more additional situation conditions that are nested within the one or more primary situational conditions.

22. The system of claim 13, wherein the decision is determined by the operations of:
   evaluating the one more events by one or more check point nodes, wherein each of the check point nodes have been completed, then determining that the decision has occurred.

\* \* \* \* \*